US 11,551,304 B2

(12) United States Patent
Givot

(10) Patent No.: US 11,551,304 B2
(45) Date of Patent: *Jan. 10, 2023

(54) FEE/REBATE CONTINGENT ORDER MATCHING SYSTEM AND METHOD

(71) Applicant: NYSE Chicago, Inc., Chicago, IL (US)

(72) Inventor: Steven I. Givot, Chicago, IL (US)

(73) Assignee: NYSE Chicago, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,404

(22) Filed: May 3, 2022

(65) Prior Publication Data

US 2022/0327617 A1 Oct. 13, 2022

Related U.S. Application Data

(60) Continuation of application No. 17/307,190, filed on May 4, 2021, now Pat. No. 11,354,742, which is a division of application No. 13/290,206, filed on Nov. 7, 2011, now Pat. No. 11,068,979.

(51) Int. Cl.
*G06Q 40/04* (2012.01)
(52) U.S. Cl.
CPC .................. *G06Q 40/04* (2013.01)
(58) Field of Classification Search
CPC ........ G06Q 40/04; G06Q 40/00; G06Q 40/06; G06Q 30/08
USPC .................. 705/35, 36 R, 37, 26.1
See application file for complete search history.

(56) References Cited

U.S. PATENT DOCUMENTS

| 6,157,918 A * | 12/2000 | Shepherd ............... G06Q 30/08 705/35 |
| 6,622,130 B1 * | 9/2003 | Shepherd ............... G06Q 30/08 705/35 |
| 6,829,589 B1 | 12/2004 | Saliba |
| 7,392,218 B2 | 6/2008 | Saliba |

(Continued)

FOREIGN PATENT DOCUMENTS

| AU | 2004250322 A1 * | 12/2004 | ............. G06Q 40/04 |
| AU | 2004250322 A1 | 12/2004 | |

(Continued)

OTHER PUBLICATIONS

T. Hendershott, "Electronic trading in financial markets," Jul.-Aug. 2003, IT Professional, vol. 5, No. 4, pp. 10-14 (Year: 2003).*

*Primary Examiner* — Kelly S. Campen
(74) *Attorney, Agent, or Firm* — DLA Piper LLP (US)

(57) ABSTRACT

A specialized computer matching system programmed to match orders for financial instruments of any type; where orders are matched at a price equal to the best available price or within the best available prices in the market; where priority of matching orders is ranked by price; where orders at the same price may be further ranked based on other attributes; where orders may optionally specify that the order sender is willing to pay a fee to (or receive a rebate by) an Order Matching Entity (i.e., a fee/rebate contingency (FRC)); where an order's optional FRC must be met in order to match the order; and where an order which cannot be matched solely because its FRC rate prevents it from matching with another order temporarily yields priority—other than price priority—to other orders ranked below to permit those orders to be matched.

14 Claims, 37 Drawing Sheets

(56) References Cited

U.S. PATENT DOCUMENTS

| | | | |
|---|---|---|---|
| 7,617,147 B2* | 11/2009 | Shepherd | G06Q 30/08 |
| | | | 705/35 |
| 7,624,062 B1 | 11/2009 | Kelly et al. | |
| 7,660,762 B1 | 2/2010 | Mellina | |
| 7,725,381 B2 | 5/2010 | Olsson et al. | |
| 7,742,972 B2* | 6/2010 | Lange | H01L 21/28061 |
| | | | 705/37 |
| 7,908,213 B2* | 3/2011 | Monroe | G06Q 20/10 |
| | | | 705/39 |
| 7,912,779 B2 | 3/2011 | Saliba | |
| 7,953,755 B2* | 5/2011 | Keith | G06F 40/30 |
| | | | 707/790 |
| 8,229,817 B2* | 7/2012 | Shepherd | G06Q 40/00 |
| | | | 705/35 |
| 8,719,144 B2 | 5/2014 | Reed | |
| 2004/0111358 A1* | 6/2004 | Lange | H01L 21/28061 |
| | | | 705/37 |
| 2005/0125329 A1* | 6/2005 | Gerhart | G06Q 40/04 |
| | | | 705/37 |
| 2005/0171890 A1* | 8/2005 | Daley | G06Q 30/08 |
| | | | 705/37 |
| 2006/0253379 A1* | 11/2006 | Adcock | G06Q 40/04 |
| | | | 705/37 |
| 2008/0015974 A1* | 1/2008 | Balabon | G06Q 40/04 |
| | | | 705/37 |
| 2009/0138368 A1* | 5/2009 | Weiss | G06Q 40/04 |
| | | | 705/26.1 |
| 2009/0240714 A1* | 9/2009 | Keith | G06F 40/30 |
| 2009/0276348 A1* | 11/2009 | Kessler | G06Q 40/06 |
| | | | 705/37 |
| 2010/0049649 A1* | 2/2010 | Shepherd | G06Q 30/08 |
| | | | 705/37 |
| 2011/0087580 A1* | 4/2011 | Patterson | G06Q 40/04 |
| | | | 705/37 |
| 2013/0198054 A1* | 8/2013 | Studnitzer | G06Q 40/04 |
| | | | 705/37 |
| 2014/0006243 A1* | 1/2014 | Boudreault | G06Q 40/04 |
| | | | 705/37 |

FOREIGN PATENT DOCUMENTS

| | | | | |
|---|---|---|---|---|
| WO | WO-0152166 A1 * | 7/2001 | | G06Q 40/04 |
| WO | 0152166 A1 | 7/2022 | | |

* cited by examiner

Fig. 2A

Legend:

| Fig __ |  A figure containing logic which is invoked from only one point.

| Fig __ |  A figure containing logic which is invoked from multiple points.

◄──────► Connects two figures when control is passed from the logic in one figure to another and control is returned to the invoking logic.

──────► Connects two figures when control is passed from the logic in one figure to another and control is not returned to the invoking logic.

Receipt of a New Inbound Order

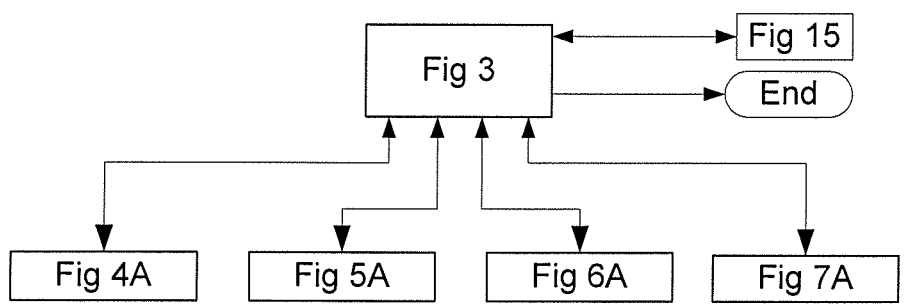

Fig. 2B

Legend:

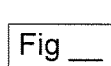  A figure containing logic which is invoked from only one point.

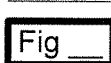  A figure containing logic which is invoked from multiple points.

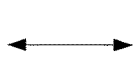  Connects two figures when control is passed from the logic in one figure to another and control is returned to the invoking logic.

  Connects two figures when control is passed from the logic in one figure to another and control is not returned to the invoking logic.

Attempt to Match An Inbound Order with Resting Orders

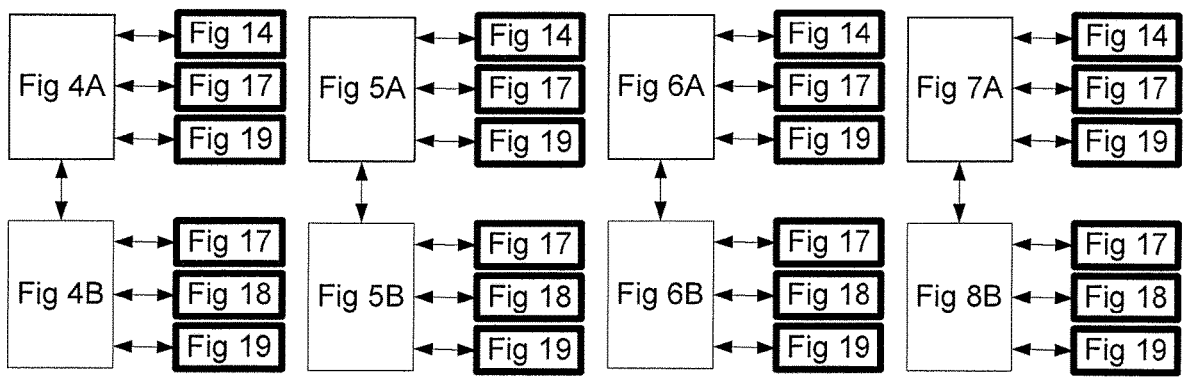

Fig. 2C

Legend:

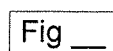 A figure containing logic which is invoked from only one point.

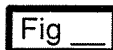 A figure containing logic which is invoked from multiple points.

 Connects two figures when control is passed from the logic in one figure to another and control is returned to the invoking logic.

 Connects two figures when control is passed from the logic in one figure to another and control is not returned to the invoking logic.

Attempt to Match A Resting Order with Another Resting Orders

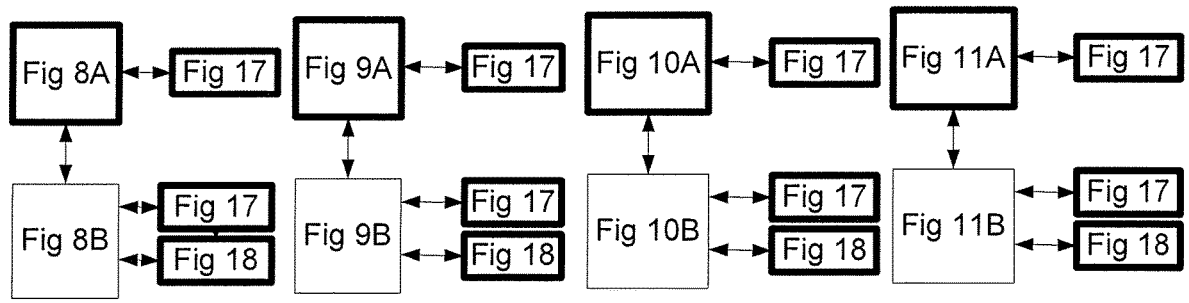

Fig. 2D

Legend:

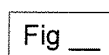 A figure containing logic which is invoked from only one point.

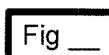 A figure containing logic which is invoked from multiple points.

◄──► Connects two figures when control is passed from the logic in one figure to another and control is returned to the invoking logic.

──► Connects two figures when control is passed from the logic in one figure to another and control is not returned to the invoking logic.

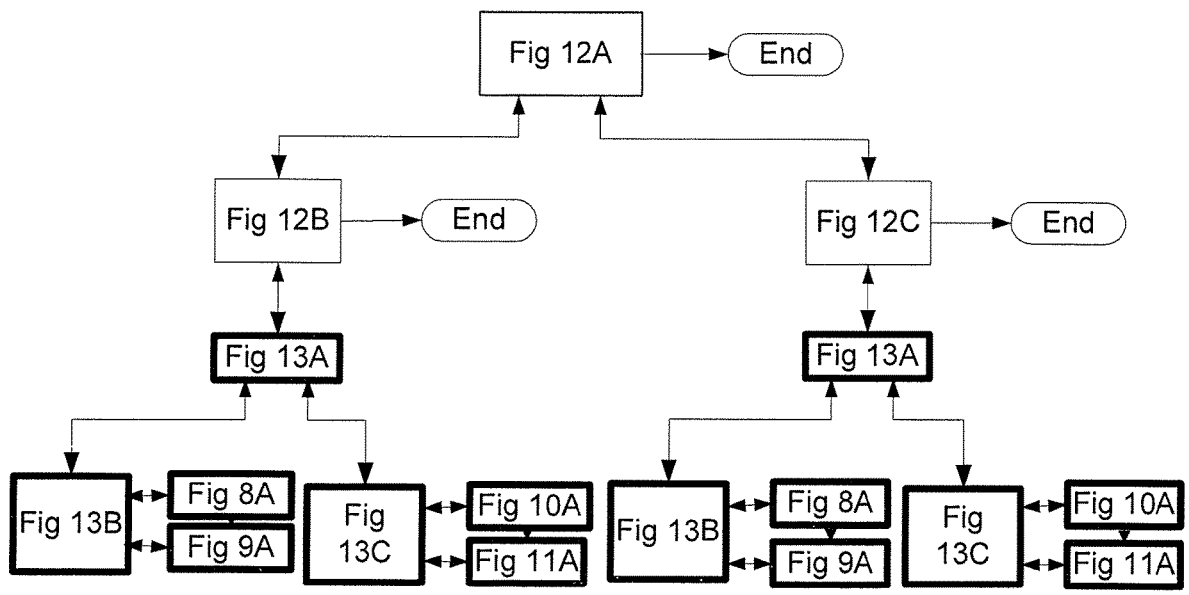

Process a Quote Change

Fig. 2E

Legend:

| Fig __ |  A Figure containing logic which is invoked from only one point.

| Fig __ |  A Figure containing logic which is invoked from multiple points.

◄─────► Connects two figures when control is passed from the logic in one Figure to another and control is returned to the invoking logic.

─────► Connects two figures when control is passed from the logic in one Figure to another and control is not returned to the invoking logic.

Calculate FRC Rate for a Resting Order

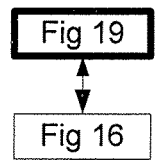

Fig. 20

The following conditions must be met in setting the Order Matching Entity's Standard Matching Rate (SMR), setting Minimum Matching Rate (MMR), calculating Maximum Rebate Rate (MRR), and validating the optional FRC Rate submitted as part of an inbound order:

Condition #1: FRCRate ≤ SMR

Condition #2: FRCRate ≥ MMR − SMR

Note: MRR = MMR − SMR

EXAMPLE #1: For the purpose of illustration, this example assumes that these fees are applicable to trading in futures contracts and are based on the number of futures contracts matched:

| Parameter | Value | Conditions |
|---|---|---|
| Standard Matching Rate (SMR) | 0.0030 / contract | - |
| Minimum Matching Rate (MMR) | 0.0005 / contract | - |
| Maximum FRC Rate (maximum fee = SMF) | 0.0030 / contract | 1 |
| Minimum FRC Rate (maximum rebate = MRR) | -0.0025 / contract | 2 |

EXAMPLE #2: For the purpose of illustration, this example assumes that these fees are applicable to trading in stocks priced below $1.00 per share and are based on the dollar value of shares matched:

| Parameter | Value | Conditions |
|---|---|---|
| Standard Matching Rate (SMR) | 0.0030% | - |
| Minimum Matching Rate (MMR) | 0.0005% | - |
| Maximum FRC Rate (maximum fee = SMF) | 0.0030% | 1 |
| Minimum FRC Rate (maximum rebate = MRR) | -0.0025% | 2 |

Fig. 21

The following symbols are used in the figures:

| | | |
|---|---|---|
| == | as in A == B | TRUE if A and B are equal, otherwise FALSE |
| != | as in A != B | TRUE if A and B are not equal, otherwise FALSE |
| < | as in A < B | TRUE if A is less than B, otherwise FALSE |
| ≤ | as in A ≤ B | TRUE if A is less than or equal to B, otherwise FALSE |
| > | as in A > B | TRUE if A is greater than B, otherwise FALSE |
| ≥ | as in A ≥ B | TRUE if A is greater than or equal to B, otherwise FALSE |
| AND | as in A AND B | TRUE if both A and B are TRUE, otherwise FALSE |
| OR | as in A OR B | TRUE if either A or B are TRUE, otherwise FALSE |

FEE/REBATE CONTINGENT ORDER MATCHING SYSTEM AND METHOD

CROSS REFERENCE TO RELATED APPLICATIONS

The present application is a continuation of U.S. patent application Ser. No. 17/307,190 entitled "Fee/Rebate Contingent Order Matching System and Method," filed on May 4, 2021, which is a divisional of U.S. patent application Ser. No. 13/290,206 filed on Nov. 7, 2011 (Now U.S. Pat. No. 11,068,979), the contents of which are fully incorporated herein.

BACKGROUND OF THE INVENTION

Field of the Invention

The present invention relates generally to a method and apparatus for matching orders to buy and sell financial instruments or other tradable interests at an exchange or other order matching entity.

Description of the Related Art

Financial instruments, such as securities, options, futures, debt instruments, and other tradable interests may be bought and sold through an exchange or other order matching entity. In the past, buy and sell orders were matched by open outcry at an exchange. Much of the current trading has moved to computerized exchanges or other order matching entities (OME), where computer systems receive the buy and sell orders and match those orders that are for the same tradable interest at a matching price. (Note: A glossary of terms is located at the end of this specification.)

Examples of order matching entities (OMEs) are securities exchanges (including options exchanges), securities associations, futures exchanges, futures associations, banks, interbank markets, brokerage firms, or any other entities which offer to match orders (or to execute cross transactions) sent to it by parties wishing to buy or sell (or to execute cross transactions) in any financial instrument. A cross transaction is one in which the buyer and seller have already reached an agreement on the terms of the transaction, but the cross transaction must be executed by an OME.

Order matching entities (OMEs) maintain a computerized book (or inventory) of resting (active, unexecuted) orders to buy or sell financial instruments for the purpose of attempting to eventually execute those orders using a specialized computer to match buy orders with sell orders—a matching system—which is specifically programmed for that purpose.

The matching system executes orders as a result of either (1) matching buy orders with sell orders, (2) executing a cross transaction ("crossing") when market conditions permit, (3) in certain circumstances, matching a portion of a cross transaction with resting buy or sell orders and crossing as much as possible of the unexecuted balance of the cross transaction, or (4) a change in market prices in one or more other marketplaces.

Currently existing matching algorithms do not permit an OME to handle orders efficiently in a variety of situations. This results in numerous negative consequences including a proliferation of exchanges; costly increases in message traffic including quotation data, new order messages, order modification messages, order cancellation messages, and order rejection messages; and requiring OMEs to reject orders rather than accept them. Existing matching algorithms do not allow an OME to—during trading hours—simultaneously hold in its resting order book unmatched orders to buy at a price which is greater than or equal to the price where the OME holds orders to sell. Such orders may exist if the OME accepted orders which cannot be executed because (1) the orders' fee/rebate contingencies (more on this later) prevent the orders from being matched and/or (2) matching the orders is prohibited due to rules or regulations which prevent matching orders at a price which would trade through a price available in another marketplace.

Consider an example in which an OME holds a resting order to buy 1000 units of product XYZ at a price of 45.50 which has a fee/rebate contingency which requires the OME to pay the order sender a rebate if the order is matched. The OME subsequently receives an order to sell 1000 units of XYZ also at a price of 45.50 which also has a fee/rebate contingency which requires the OME to pay the order sender a rebate if the order is matched. Based solely on the limit price of each order—45.50—the buy and sell orders could theoretically be matched for 1000 units of XYZ at a price of 45.50. However, if the OME matches these buy and sell orders, the OME would be obligated to pay both the buyer and the seller a rebate. It is not a viable business model for an OME to match buyers and sellers and lose money in the process. For this reason current computerized matching algorithms frequently reject orders when this situation arises to avoid matching them. The current state of the art does not permit an OME to simultaneously hold resting orders to buy and sell at the same price which cannot be matched solely for this reason.

One purpose of an order matching entity (OME) is to provide a facility whereby orders to buy or sell (or to execute a cross transaction in) a financial instrument or trading unit can be received by a specialized computer in order to match buyers with sellers (or to execute a cross transaction) at prices acceptable to both sides of a transaction. The term "product" is used in this document to refer to either an individual financial instrument or other tradable interest or to a trading unit.

A second purpose of an OME is to determine the market value of a product (i.e., price discovery).

A third purpose of an OME is to transfer the risk of price changes of a product by permitting one to increase, decrease, eliminate, or hedge a position in a financial instrument ("risk management").

An OME must conduct its business in a manner which minimizes fraud and manipulation. These activities typically occur under the regulatory oversight of both the OME and a government agency each of which establishes the rules and regulations governing how business is conducted.

The trading of products of all types takes place in two types of marketplaces: exchanges and over-the-counter markets. In this regard, exchanges are well understood by those in this field. Over-the-counter markets take various forms including dealer markets, broker markets, interbank markets, and associations. As technology has advanced, both exchanges and over-the-counter markets have introduced computerized methods for bringing buyers and sellers together (i.e., gathering their orders), disseminating information about buying and selling interest, matching buy and sell orders, executing cross transactions, disseminating information about matched trades, clearing trades, and providing adequate oversight to prevent or detect fraud and manipulation.

The evolution of technology adopted by exchanges for use in their trading businesses has included such major steps as the use of the telegraph, the teletype, the telephone, and currently electronic networks. Electronic networks are used by exchanges to enable order senders to transmit orders to trading floors or computerized markets. They are also used between certain exchanges to route orders among exchanges as they seek to execute orders placed with them. Today most exchanges have replaced printed orders with electronic orders which reside in some type of electronic matching system. Some exchanges retain a hybrid system with both a computerized marketplace and a parallel trading floor marketplace in which individuals can interact in person on a trading floor.

The evolution of technology adopted by over-the-counter markets varies among different types of financial instruments and from country to country. Some over-the-counter markets are still largely based on individual interaction, often by telephone. Other over-the-counter markets have adopted technology at a faster pace and are largely computerized.

There is every indication that technology will play an ever greater role in trading of financial instruments. Where new technology has been adopted, it brings with it major efficiencies including speed to market, ability to interact (to match trades) with far more counterparties quickly, with greater anonymity, to process "locked-in" trades (resulting in risk reduction), to provide an increased transparency of bids and offers without loss of anonymity, to provide improved margining (risk management), to eliminate counterparty credit risk (when central clearing and guarantee is available), pre-trade detection and prevention of rules violations, and increased oversight to detect fraudulent or manipulative trading practices. In most countries, there is strong government pressure for automation to play a greater role in trading for many of these reasons.

Considerable change has occurred as trading has moved from personal interaction on exchange trading floors or bank trading rooms to computers, whether operated by an exchange or an over-the-counter market.

Recent Evolution of the Us Equities Markets

Prior to the 1990s, US equities exchanges typically charged a transaction fee for transactions executed on an exchange. The transaction fee was an important component of revenues for most exchanges. In the 1990s, the US equities market witnessed the introduction of Electronic Communication Networks (ECNs)—equities markets which were not registered with the U. S. Securities and Exchange Commission (SEC) as exchanges. ECNs introduced a different fee paradigm to replace the historical transaction fee paradigm. Instead of charging comparable fees to the both the buyer and seller of a transaction—often with different rates for different types of market participants (e.g., specialists, market makers, brokers, institutional customers, and retail customers)—ECNs introduced a new fee paradigm, one which provided a more preferable fee and/or rebate to orders which provide or "make" liquidity while providing a less preferable fee and/or rebate to orders which remove or "take" liquidity.

The most successful fee structure initially adopted by ECNs paid a rebate to orders that made liquidity and charged a fee to orders which took liquidity. The fee rate typically exceeded the rebate rate. The difference between the fee received and the rebate paid by the ECN provided net revenue to the ECN for each transaction.

For a variety of reasons, many ECNs, which were successful operating with far less regulatory oversight than SEC-registered national securities exchanges, have opted to become SEC-registered national securities exchanges. Additionally, the only SEC-registered national securities association, NASDAQ, has opted to register as a national securities exchange. The make/take fee paradigm which the ECNs introduced has now been adopted by most US equities exchanges and even some US securities options exchanges, although the level of fees and rebate varies and, in some instances, the structure is inverted resulting in the order that makes liquidity paying an exchange fee and the order taking liquidity receiving an exchange rebate.

A typical fee structure calls for an exchange, which is, of course, an order matching entity (OME), to pay a rebate to matched orders which make liquidity. A typical rebate rate is about $0.0025 per matched share. To cover the cost of an OME paying this rebate and to provide net operating revenue for the OME, a matched order taking liquidity (the other side of the same matched trade) is typically charged about $0.0030 per matched share by the OME. The OME's profit margin is the difference between the take fee and the make rebate rates, or $0.0005 per share in this example. The profit margin which an exchange requires to match a buyer with a seller for a given product is the exchange's minimum matching rate (MMR) for that product or tradable interest.

This fee structure has led to a huge growth in trading volume by high frequency and algorithmic trading firms which attempt to capture OME rebates as income by making liquidity. At today's high trading volumes, many high frequency and algorithmic trading firms are quite profitable buying and selling shares all day in large quantities at the same price. As long as these firms are receiving rebates on a significant majority of the shares they trade, they can be very profitable. It is believed that a significant portion of all US equities trading volume is conducted for the purpose of earning rebates for making liquidity.

The electronic evolution of the US equities marketplace was a prerequisite for this to happen. In order for order senders to be profitable with a "rebate capture" strategy, they must be able to place and cancel orders quickly and to support a high speed electronic network connecting the order sender to multiple computerized OMEs as well as their own high speed computers to monitor the market and electronically manage their working orders, positions, and risk.

Several problems occur in the prior art systems.

Problem 1.) A first problem has to do with the enormous growth of price quotation message traffic that has resulted from the proliferation of exchanges. OMEs have discovered that order senders are not satisfied with a very limited choice of fee/rebate rates. At various instants of time, the same order sender may be willing to pay a fee of $0.0030 per matched share, be willing to pay a fee of $0.0015 per matched share, require receiving a rebate of $0.0025 per matched share, require receiving a rebate of $0.0015 per matched share, or be willing to trade without either paying a fee or receiving a rebate—all with regard to matching the same order to buy or sell the same quantity of the same product at the same price. The reasons for this are too diverse to explain in this document. The truth of this statement is apparent from the decision of many organizations (e.g., NYSE/EuroNext, BATS Exchange, DirectEdge, NASDAQ) to operate multiple exchanges (NYSE, ARCA, AMEX, BYX, BZX, EDGX, EDGZ, NASDAQ, BEX)—each using different fee structures to attract order flow trading the same products with virtually identical matching algorithms. The growth in market share of OMEs created for the purpose of offering different fee structures demonstrates that order senders want to be able to send a given order to a different OME based on the fee structure offered by the OME.

Demand for alternative fee structures has resulted in the proliferation of US equities exchanges in recent years. An unintended consequence of this has been a corresponding growth in the volume of published price quotations. The increase in price quotation message traffic has resulted in considerable increase in costs (1) to quote consolidators (organizations which gather quotes from each OME and publish a consolidated price quotation data feed), (2) to OMEs (which must monitor all published quotes from other exchanges to avoid trading through a protected quotation from a competing OME), (3) to organizations that redistribute price quotation data, and (4) to anyone who receives the consolidated price quotation data feed. Increased costs include increased network capacity to receive and send the data, additional hardware and improved software to process the data, and additional hardware and improved software to meet regulatory requirements. The addition of each new exchange increases the costs borne by organizations that use price quotation data provided by all exchanges.

Problem 2.) Another problem is the enormous growth of order and order cancellation message traffic that has resulted from the current state of order matching algorithms. One of the difficulties which arose as a result of this evolutionary process is that many of the orders sent to computerized OMEs today are submitted with a contingency which requires that the order can only be matched if it will earn the order sender a rebate. How an OME reacts to an order with such a contingency when it would otherwise immediately match with another order, paying a fee instead of earning a rebate, varies among OMEs and additional parameters which some OMEs permit to be associated with the order. In some instances the OME will reject such an order because it would take liquidity, thereby violating the order's rebate contingency. In other instances the OME will "work" the order at a more favorable (less competitive) price at which matching the order would earn a rebate.

One consequence of current state of the art matching systems handling orders with such contingencies is that each day an enormous number of orders are rejected by OMEs because their contingencies cannot be met and the order cannot be retained by the OME. The cost of these rejections is significant. When an order is rejected, the order sender's desire to buy or sell is not represented in the marketplace until the rejection message is received by the order sender and the order sender can resubmit the order at a price at which the OME will not reject the order. In a world of rapidly-changing price quotations, it may take several attempts before the order sender manages to get the order to an OME under circumstances in which the OME can accept the order with its contingency. The time passes as an order is being created and sent to an exchange and then rejected and returned to the order sender by the exchange to which it was sent. During this time, the order sender's order is not available in the marketplace for execution. This activity also causes an enormous volume of message traffic between order senders and OMEs. Order senders and OMEs each must increase the capacity of their networks and systems to handle enormous numbers of orders many of which are rejected—at considerable expense to both parties.

Problem 3.) A further problem is that the current order matching algorithms do not permit the OMEs to address these problems and others without causing a "deadly embrace". OMEs might consider accepting an inbound order under the circumstances described above rather than rejecting the order. However, doing so could result in an unacceptable consequence: deadly embrace. Deadly embrace is best illustrated by an example. We state seven assumptions for the purpose of this example:

Assumption 1: The OME (order matching entity) has the most common fee/rebate structure in place whereby orders which make liquidity are paid a rebate and orders which take liquidity pay a fee.

Assumption 2: The OME has a contingent order type called "post only" which requires that the order can only be matched if it will make liquidity and, thereby, earn a rebate. (Most US equities exchanges offer some variation of this order type.)

Assumption 3: Either the OME or its government regulator has a rule which requires that orders at a superior price must be executed before orders at an inferior price ("price priority"). This is a universal standard.

Assumption 4: Either the OME or its government regulator has a rule which requires that orders at the same price must be executed in the same sequence in which they were received (price/time priority or time priority). This is a common, but not universal, requirement of rules or regulations. In such a framework, executing identically-priced orders in a different sequence than they were received by the OME may constitute a trade ahead violation. Assumption 5: The trading activity of the product used in this example—XYZ does not affect how an OME matches trades. Either XYZ does not trade elsewhere or there is no price protection rule in effect between multiple OMEs trading XYZ.

Assumption 6: The OME has a matching system which handles XYZ orders sequentially. The matching system receives one inbound XYZ order at a time and does all it can to process that XYZ order before examining the next inbound XYZ order.

Assumption 7: The OME does not reject orders which would result in locking or crossing the matching system's resting order book. This is different from the behavior of matching systems in place today. The situation described in Assumption 7—allowing the OME which uses existing order matching methods to accept orders which would lock or cross its resting order book is what can lead to deadly embrace.

The OME begins with no orders in its book. The OME then receives the following four orders for XYZ in this sequence:

Order A: Buy 100 XYZ @ 20.10 Post Only contingency
Order B: Buy 10000 XYZ @ 20.10 No contingency
Order C: Sell 10000 XYZ @ 20.10 Post Only contingency
Order D: Sell 100 XYZ @ 20.10 No contingency The matching system processes these orders as follow:

Order A is processed by the matching system. There is no resting sell order to match with Order A. Therefore Order A is placed in the resting order book. Nothing else can be done by the matching system which now processes Order B.

Order B is processed by the matching system. There is no resting sell order to match with Order B. Therefore Order B is placed in the resting order book. Nothing else can be done by the matching system which now processes Order C.

Order C is processed by the matching system. There are two resting buy orders against which Order C might be matched. Order C cannot be matched against Order A because both orders are "post only" and, if matched, both orders would have to be paid a rebate. Order C could match against Order B based solely on price and contingency; however that match would result in a trade ahead violation (Order B trading ahead of Order A). Therefore Order C cannot be matched with Order B. Since Order C cannot be matched with any resting buy order, Order C is placed in the resting order book. (If Assumption #7 had not been made, Order C would be rejected as it would be today with current systems.) The OMEs resting order book is now locked—the best buy order's price is equal to the best sell order's price. Nothing else can be done by the matching system which now processes Order D.

Order D is received by the matching system. There are two resting buy orders against which Order D might be matched. Order D can be matched against either Order A or Order B based solely on price and contingency. However either match would result in a trade ahead violation (Order D trading ahead of Order C). So Order D cannot be matched. (If Assumption #7 had not been made, Order D would be rejected as it would be today.) Order D is placed in the resting order book. The book remains locked. Nothing else can be done.

This example demonstrates deadly embrace or deadlock. The book now holds buy and sell orders which make it impossible for any inbound order to match against any resting order without violating the time priority of another resting order and, therefore, cause a trade ahead violation. Matching any inbound order would result in the inbound order trading ahead of other orders at the same price on the same side of the book.

Allowing a state of the art matching system to accept orders with a fee/rebate contingency which may result in a locked or crossed resting order book in an environment in which execution priority rules (such as trade ahead rules) exist makes deadly embrace possible. A book, a market, or a quotation is locked if the highest bid price equals the lowest offer price. A book, market, or quotation is crossed if the highest bid price exceeds the lowest offer price. If an OME accepts orders which result in a locked resting order book, then deadly embrace can occur. If the matching system allows a locked resting order book to exist using current order matching algorithms, whether deadly embrace occurs is outside the control of the OME because the OME cannot control what orders arrive and in what sequence they arrive. Resolving deadly embrace once it occurs is also outside the control of the OME. The only way that deadly embrace can end once it occurs is for order senders to happen to cancel one or more orders which have led to deadly embrace.

No OME (order matching entity) wants to find its resting order book in deadly embrace, since its order matching service is of no value to order senders if orders cannot be matched. The OME would be shunned by order senders who would be unwilling to have their orders held by an OME that may become powerless to match them. However OMEs and their customers would be better served if orders need no longer be rejected to avoid deadly embrace. What is needed is a method to permit an OME to accept such orders without risking deadly embrace.

State of the art matching systems, coupled with existing regulatory rules, could frequently result in deadly embrace if an OME permits its resting order book to accept an inbound order with a fee/rebate contingency if the inbound order would lock its limit order book.

In the context of state of the art matching systems, deadly embrace is avoided by rejecting orders which would lock or cross the matching system's book. This, directly or indirectly, results in Problem 1.) and Problem 2.) described above.

SUMMARY OF THE INVENTION

The present invention provides a method and system for an Order Matching Entity (OME) which uses a specialized computer matching system that is programmed to match orders to buy or sell (or to cross transactions in) any financial instrument or other tradable interest including, but not limited to, securities, options, futures, debt instruments, foreign exchange, swaps, or any other financial instrument; which OME offers computerized order matching services to order senders wishing to buy, sell or cross financial instruments; where the OME permits limit orders to be submitted with an optional fee/rebate contingency (which is quantified with a fee/rebate contingency rate or FRC rate) instructing the OME that matching the order at a price no better than the order's limit price (if the order is a limit order) is contingent upon the order sender paying (or receiving) a specific fee (or rebate) to (or from) the OME.

The present invention, referred to here as a contingent order matching system (COMS), advances the state of the art of matching systems by addressing all three problems identified above. COMS includes a order matching algorithm which in a preferred embodiment (1) eliminates the need to establish multiple OMEs, multiple matching systems, or multiple resting order books to offer a wide range of FRC rates which allow order senders to select their desired FRC rate on an order-by-order basis while sending all such orders to the same OME thereby eliminating the need to create new exchanges to implement alternative fee structures, (2) eliminates the need to reject orders by allowing an OME to accept orders which are currently unmatchable and would lock (or cross) its resting order book thereby reducing order and order rejection message traffic, and (3) prevents deadly embrace which could otherwise occur if the OME accepted orders which would lock (or cross) its resting order book using existing order matching algorithms.

The method and system of the present invention includes is an order matching algorithm which addresses the problems which have occurred under the existing maker/taker OME fee paradigm. The COMS (contingent order matching system) is able to operate in full compliance with stringent order protection. It will provide significant cost savings and improved operational efficiency to OMEs, market participants, and others.

The foundational elements of the present invention are based on existing trading system components. The COMS of a preferred embodiment requires these components to operate properly. Existing technology includes computerized systems which gather orders from order senders; transmit orders from order senders to an OME; validate the contents of inbound orders (and reject an inbound order if its contents fail to meet the OME's requirements); route orders to a specialized computer matching system programmed by the OME to match orders to buy and sell (and execute cross transactions); route information from the matching system to the order sender regarding the status of the order (including execution reports and cancel confirmations); distribute the matching system's price quotation data to a quote consolidator or to subscribers to that price quotation data feed; gather consolidated price quotation data (if any) and provide it to the matching system; log all information to databases as required for operational or regulatory purposes; and perform any other actions required to support the matching system.

The present invention is a new order matching algorithm to be implemented within an OME's existing matching system. The COMS (contingent order matching system) is used within the matching system to match buyers and sellers (or execute cross transactions) in one or more products. The COMS allows an OME to provide a fast, fair, effective, and efficient way to maintain a resting limit order book which—at times—may be locked or crossed while continuing to be able to match orders without risk of deadly embrace.

State of the art order matching algorithms can, at most, accept an order which indicates that a standard (unquantified) fee/rebate contingency exists. The FRC (fee/rebate contingency) rate associated with the fee/rebate contingency is a fixed rate which is set by the OME for a given product or set of products. The order sender can only select that the fee/rebate contingency exists. The order sender cannot select a specific numerical FRC rate desired for the order. The FRC rate is set to a fixed value if the fee/rebate contingency exists.

For example, a "post only" contingency (described above) would require that an order could only be accepted and subsequently matched if it would be the liquidity maker in the matched trade. The order sender then pays or receives the FRC rate which the OME sets for all "post only" orders.

The method and system of a preferred embodiment allows an order sender to numerically state, for each order, the fee/rebate contingency (FRC) rate the order sender requires for that order. An FRC rate greater than zero indicates the fee that the order sender is willing to pay at that FRC rate for any portion of the order which is matched. An FRC rate less than zero indicates the rebate that the order sender must receive at that FRC rate for any portion of the order which is matched. An FRC rate of zero indicates that the order may be matched without payment of a fee or receipt of a rebate. There is no existing order matching algorithm which permits the order sender to provide a numerical FRC rate as a condition for matching an order.

The present invention also allows an order sender to implicitly select a numerical FRC rate by specifying the type of FRC rate desired. For example, for a given product, selection of a "post only" fee/rebate contingency is translated into a specific FRC rate for post only orders for that product. Similarly, the order sender may specify the maximum rebate rate (MRR) be applied to a given order. This assures the order sender that when the OME changes the post only or maximum rebate rate for a product, the order sender's orders will automatically be adjusted to require that rebate rate.

The method and system according to an embodiment of the present invention either rejects an order or overrides the FRC rate specified on an order under certain circumstances including:

Market orders. Market order can never specify an FRC rate. The present method and system normally assigns the standard matching rate (SMR) to all market orders. If a market order is submitted with an FRC rate, consistent with the current invention, the OME can either reject or override the FRC rate specified on the order with the standard matching rate (SMR).

Certain order types which are not permitted to specify an FRC rate during processing as an inbound order. The present invention overrides the FRC rate specified on the order during processing it as an inbound order.

The same order's specified FRC rate may be used if, after processing the order as an inbound order, the unexecuted balance of the order is placed in the OME's resting order book.

Certain order types which are not permitted specify an FRC rate once placed in the OME's resting order book. The specified FRC rate is applicable to the order when being processed as an inbound order. The same order's specified FRC rate may not be used if, after processing it as an inbound order, the unexecuted balance of the order is placed in the OME's resting order book. It is overridden with the standard matching rate (SMR) at that point.

A limit order which is matched at a price superior to the order's ActivePrice at the time it is matched. For the purpose of this document, this is referred as receiving "price improvement." The method and system of a preferred embodiment of the present invention overrides the FRC rate specified on the order with the standard matching rate (SMR) for any match which results in price improvement over the ActivePrice value of a the limit order.

The method and system according to embodiments of the present invention (1) retains existing order ranking methods whenever possible, overriding them only when the FRC (fee/rebate contingency) rates of two otherwise matchable orders prevent a match from taking place, (2) permits a locked (or crossed) limit order book when matches cannot be made solely because Fee/Rebate Contingencies (FRC) rates prevent locked or crossed orders from being matched or the match would take place at a price not permitted by rules or regulations, (3) provides a method for new inbound orders to match against previously unmatchable resting orders, (4) provides a method to match two or more resting orders when a NBBO (national best bid or offer) change permits a match which was previously not permitted, and (5) avoids deadly embrace.

There is no existing order matching method or system which does this.

The contingent order matching system (COMS) allows an order matching entity (OME) to accept orders with a fee/rebate contingency which would otherwise be rejected. The COMS properly recognizes that any order with a fee/rebate contingency is a contingent order.

In situations when an order with a fee/rebate contingency could be matched but for having an FRC rate which makes it temporarily unmatchable, the contingent order matching system (COMS) requires the contingent order to temporarily yield priority to allow lower ranked orders at the same price to be matched. This feature of COMS avoids deadly embrace.

Avoiding deadly embrace makes it possible for an OME to allow its resting order book to accept orders which lock or cross other orders in the OME's resting order book.

Accepting such orders into the resting order book eliminates the need to reject them.

Doing all of this in a single matching system avoids the need to set up new exchanges to offer alternative fee structures. Thus COMS addresses all three problems described above.

There are many examples of contingent orders which must yield priority to non-contingent orders if their contingency is not met and, therefore, they cannot be matched based on their normal rank. Among these are all-or-none orders, fill-or-kill orders, orders to sell short (if a price restriction is placed on the price at which a short sale can be made), and spread orders. When such an order's contingency cannot be met, the contingent order temporarily yields priority to other orders. When an order's contingency makes it impossible to match the order against another order, other orders are permitted to trade ahead of the contingent order.

The contingent order matching system (COMS) applies the same treatment to orders with a fee/rebate contingency (FRC). COMS retains each order's priority ranking. However if COMS is attempting to match an order—a "first order"—with a fee/rebate contingency with a resting order—a "second order"—which has a fee/rebate contingency and cannot match the two orders solely because the combined fee/rebate contingency rates of the orders prevent a match, the second resting order is temporarily unmatchable. For the purpose of achieving an immediate match, COMS causes the temporarily unmatchable second order to temporarily yield priority and thus create the opportunity for COMS to match the first order with other resting orders in the book at the same price but that are lower ranked than the temporarily unmatchable second order. The temporarily unmatchable second order yields priority to lower ranked orders at the same price only long enough to avoid deadly embrace.

The contingent order matching system (COMS) functionality is best shown by an example. In the deadly embrace example above, which had orders with a "post only" fee/rebate contingency, assume that the fee charged was $0.0030 per share for taking liquidity and the rebate paid was $0.0025 for making liquidity. The difference in costs to an order sender between making liquidity and taking liquidity is $0.0055 per share. That amount is 55% of the $0.0100 minimum price variation ("MPV") currently mandated by the SEC for the US equities market for quoting limit orders priced at or above $1.00 per share.

Using these values only as an example, an OME might permit a range of acceptable FRC rates between a maximum value of $0.0030 (a fee charged) and a minimum value of −0.0025 (the maximum rebate payable would be $0.0025) permitting values in increments of $0.0001. By comparison, today's matching systems would only accept an order as post only, which might require a rebate of $0.0025. The contingent order matching system's (COMS) fee/rebate contingency can be set by a value provided by the order sender (using an FRC rate) whereas today's fee/rebate contingencies are binary in nature as in the example above. Today the contingency is either in place or not in place. Today the contingency cannot be stated as a value by the order sender.

By allowing a large range of quantifiable FRC rates to be specified on an order-by-order basis and handled within a single matching system, the contingent order matching system (COMS) can help reduce the proliferation of OMEs to the extent that proliferation is a result of the desire to create a new OME to offer order senders more than one fee structure for the same product. COMS provides a broad choice of fee and rebate rates—56 in the example above, spanning a range of $0.0055 per share—all within the same matching system.

To address the current problem of order rejection and the resulting high levels of order and cancellation message traffic, COMS accepts orders that lock (or cross) the OME's resting order book. To do so, the preferred contingent order matching system (COMS) is designed to avoid deadly embrace when the OME holds buy and sell orders in a locked (or crossed) resting order book which are unmatchable using current order matching algorithms due solely to orders' FRC rates.

The contingent order matching system (COMS) avoids deadly embrace in all circumstances and is applicable to any order ranking (prioritization) system in which bids (or offers) at higher (or lower) prices have priority over bids (or offers) at lower (or higher) prices. For example, COMS is indifferent regarding secondary or tertiary ranking methods. COMS is also indifferent to prioritization models which prorate volume among multiple orders; for example, proration based on order size such as used by NASDAQ's PSX Exchange. The OME may continue to rank or prorate the orders it holds in its resting order book as it did before the introduction of COMS.

The value of the FRC rate submitted with a fee/rebate contingency order does not change how an order is ranked or prorated among other matchable orders. However it may determine whether the order is temporarily unmatchable and therefore temporarily yields priority to other orders at the same price. FRC rates only matter if there is an attempt to match one order which has an optional fee/rebate contingency (that has not been overridden, as described above) with another order which has an optional fee/rebate contingency (also not overridden, as described above) and matching those two orders would not result in the OME receiving the OME's minimum matching rate (MMR) which the OME requires to match a transaction (i.e., the OME's minimum profit margin). (See FIG. 20 for an explanation of the relationship between an OME's MMR and standard matching rate (SMR) for a given product.)

The new matching rate calculation is a component of the present invention. The matching rate is the sum or combination of the FRC rates for both orders COMS is attempting to match. Fee rates charged by the order matching entity OME are expressed as positive numbers; rebate rates paid by the OME are expressed as negative numbers. The match FRC rate is adjusted to the specific standard matching rate matching of buy and sell orders (and execution of cross orders) in one or more products.

The information contained in each COMS matching system will be comprised of all information required to match any order held by the COMS matching system for the products matched in that COMS matching system and all information about each product that is required for the COMS matching system to match trades in that product. Depending on the products traded in a COMS matching system, product information may include such information as market data for a COMS matching system's products (for example, if the product is also traded in another marketplace), Rules or parameters related to the trading of each product, or regulatory actions or restrictions relating to the matching system's products.

The order matching entity OME receives and sends all communications between order senders and matching systems related to orders through its electronic network which is connected to each order sender and each COMS matching system. Communications received by the COMS matching system include inbound (new) orders, order cancellation requests, order modification requests, and order status requests. Communications sent by the COMS matching system include acknowledge of receipt of new orders, order execution reports, responses to order cancellation requests, responses to order modification requests, and responses to order status requests.

The method and system of preferred embodiments of the present invention is applicable to any OME which operates a matching system that offers an order sender the ability to state a fee/rebate contingency—and, optionally, state the FRC rate associated with the contingency—while avoiding the need to reject orders solely because currently available matching methods do not permit the OME to retain orders in its book which may result in a locked or crossed book.

The present method and system of a preferred embodiment allows the fee charged or rebate paid by an OME (order matching entity) for a matched transaction to be calculated using an FRC (fee/rebate contingency) rate specified by the order sender. The OME can apply the FRC rate to the size of the matched transaction (e.g., shares, option contracts, futures contracts, etc.), the dollar amount of the matched transaction, the nominal dollar amount of the matched transaction (if different), or any other formula which the OME chooses to use to calculate transaction fees or rebates. The present method of the described example allows the order sender to select an FRC rate from a set of two or more acceptable FRC rates offered by the OME for each financial instrument. The present example allows an OME to offer a different set of FRC rates for each product or group of products.

For example, an OME matching orders in US equities may permit an order sender to select an FRC rate for an order in one equity security from the following options (0.0025, −0.0020, −0.0015, . . . , 0.0015, 0.0020, 0.0025, 0.0030) while the same OME may allow an order sender to select an FRC rate for an order in a different equity security from the following options (−0.0025, −0.0024, −0.0023, −0.0022, . . . , 0.0026, 0.0027, 0.0028, 0.0029, 0.0030).

DEFINITION OF TERMS

To more easily understand the present invention, the following definitions are offered:

The term "rules" may refer to either the OME's rules or government regulations which govern the operations of an OME.

The OME's best bid price and best offer price—together the OME's best bid and offer (BBO)—are the best (highest priced) bid and the best (lowest priced) offer published by the OME.

The national best bid (NBB) and national best offer (NBO)—together the national best bid and offer (NBBO)—are the best (highest priced) bid and the best (lowest priced) offer published by any marketplace whose quotes must be protected, excluding the BBO published by the OME using the present invention.

The current NBBO for a given product is the NBBO which exists for that product at the moment.

The prior NBBO is the NBBO for a given product which existed immediately before the last time the NBBO for the product changed in any regard (i.e., before either the NBB or the NBO changed in price).

An order is away from the market if the order is a limit buy (or sell) order with an ActivePrice below (or above) the NBB (or NBO) price.

An order is at the market if the order is a limit buy (or sell) order with an ActivePrice which equals the NBB (or NBO) price.

An order is inside the market if the order is a limit buy (or sell) order with an ActivePrice between, but not equal to either the NBO or NBB price.

An order is marketable if the order is a limit buy (or sell) order with an ActivePrice which equals the NBO (or NBB) price.

An order is hypermarketable if the order is either (1) a market order or (2) a limit buy (or sell) order with an ActivePrice which is greater (or less) than the NBO (or NBB) price.

A book (also referred to as a resting order book) is the ranked collection of all orders currently held by the matching system for a given product. For each product, the matching systems maintains one book with two sides, the buy side and the sell side. Each side holds resting orders which are ranked by price. Secondary, tertiary, and additional levels of ranking may exist depending on the rules.

A buy (or sell) order's ActivePrice indicates the highest (or lowest) price at which the order can currently be matched without regard to current rules restrictions on pricing (i.e., NBBO violation, short sale price restrictions, price collars or limits).

The ActivePrice of a simple limit order is the order's limit price.

The ActivePrice of a pegged order is the order's current (or pegged) price.

The ActivePrice value of a market buy order has no limit; it is therefore considered to be higher than the ActivePrice value of any order other than another market buy order.

The ActivePrice value of a market sell order is the lowest price at which a trade of any sort is permitted (e.g., 0.0001); it is therefore considered to be lower than the ActivePrice value of any order other than another market sell order.

An order's ActivePrice may vary over time (e.g., a pegged order). Orders are ranked in the resting order book by the ActivePrice value, not by the WorkingPrice value.

An order's WorkingPrice is the order's ActivePrice further constrained by rules (i.e., NBBO violation, short sale price restrictions, price collars or limits).

If orders in a given product cannot be matched at a price which would trade through the NBBO price, then a buy (or sell) order's WorkingPrice value is the lesser (or greater) of the order's ActivePrice value and the NBO (or NBB), If an order is a non-exempt short sale with a price restriction imposed by rules, then the order's WorkingPrice is the greater of the order's ActivePrice and the minimum price at which a short sale can be made.

If a product is subject to limit up or down prices (by price collars, for example, whether fixed or dynamic), then a buy (or sell) order's WorkingPrice is the lesser (or greater) of the order's ActivePrice and the limit up (or down) price, When more than one such constraint is applicable, a buy (or sell) order's WorkingPrice reflects the lowest (or highest) price restriction.

The OME's (order matching entity's) book is locked if the highest bid ActivePrice equals the lowest offer ActivePrice.

A price quotation or the NBBO is locked if the highest bid equals the lowest offer.

The OME's book is crossed if the highest bid ActivePrice exceeds the lowest offer ActivePrice.

A price quotation or the NBBO is crossed if the highest bid exceeds the lowest offer.

A resting order is any order which is retained in the matching system's resting order book subject to removal from the resting order book when the order is (1) fully executed, (2) cancelled upon directions from the order sender, or (3) cancelled upon expiration of the lifetime of the order as determined by the order sender within the parameters permitted by COMS (contingent order matching system).

An inbound order-related message is the order message for a given product that has most recently been received by COMS and is currently being processed by COMS. The inbound order-related message is retrieved from the FIFO (first in/first out) queue created by the matching system as order-related messages are received from the OME's electronic network. Four types of inbound order-related messages exist:

An inbound new order is a new order to be processed by the matching system. The text below relating to FIG. 3 through FIG. 7 describes how an inbound order is handled by the COMS (contingent order matching system).

An inbound order modification request message (sometimes called a cancel/replace message request), directs COMS to modify a previously sent order. These messages are handled as they are in state of the art matching systems.

An inbound order cancellation request, directs COMS to cancel any portion of a previously sent order which has not been matched. These are handled as they are in state of the art matching systems.

An inbound order status request, asks COMS to report the status of a previously sent order. These are handled as they are in state of the art matching systems.

When the COMS has completed any matching of an inbound order, the following possibilities exist:

The contingent order matching system (COMS) has rejected the order back to the order sender with an explanation of the reason for rejecting the order. COMS should significantly reduce the frequency of this happening because COMS can operate with a locked or crossed resting order book. This handling is described in the text below related to FIG. 3.

The COMS has completely matched the inbound order and reported the execution back to the order sender, in which case there is nothing more to do with it. This is no different than the current state of the art systems. This handling is described in the text below related to FIG. 14.

The COMS has cancelled any unexecuted portion of the inbound order and returned it to the order sender. This arises when the order sender has directed COMS to do so. This is no different than the current state of the art systems. This handling is described in the text below related to FIG. 14.

The COMS has either routed the unexecuted portion of the inbound order to another marketplace for immediate execution, the unexecuted portion of the inbound order has been placed in the resting order book, or portions of the unexecuted portion of the inbound order have been handled by each of these methods. This is no different than the current state of the art systems. However, how orders placed in the resting order book are subsequently matched is handled differently by COMS than state of the art matching systems. This handling is described in the text below related to FIG. 4 through FIG. 14, and FIG. 16.

The contingent order matching system (COMS) may calculate the FRC rate (FRCR) for an order multiple times:

FRCRin (fee/rebate contingency rate-in) is calculated when the order is initially received by the matching system, and the order is being handled as an inbound order. FRCRin is calculated only once for each order. This handling is described in the text below related to FIG. 15.

FRCRro (fee/rebate contingency rate-resting order) is calculated if and when the order is placed in the resting order book. FRCRro is calculated at most once for each order. This handling is described in the text below related to FIG. 16.

FRCRm (fee/rebate contingency rate-match) is calculated immediately before each match is attempted. FRCRm is calculated for both orders for each attempted match. Therefore FRCRm can be calculated multiple times for either an inbound order or a resting order. This handling is described in the text below related to FIG. 17.

The minimum price variation (MPV) for a given product defines the price increments at which matching buy and sell orders is permitted. (Certain midpoint matches and cross orders may be exceptions to this.) In some instances the MPV of a product is dependent on the product's price. For example, in US equities securities the MPV is $0.0001 per share for prices below $1.00 and it is $0.01 per share for prices at or above $1.00 per share.

A ranked priority system is a system which prioritizes the matching of resting orders first by price, and then by any number of other hierarchies within price ranking. If a product is currently traded with a ranked priority system using state of the current art matching algorithms, the contingent order matching system (COMS) can replace the current matching algorithms while continuing to rank resting orders in the same hierarchy. Other than a temporarily unmatchable order which temporarily yields priority to lower-ranked orders at the same price, buy and sell orders are executed in the sequence defined by rank.

A prorated priority system is a system which prioritizes the matching of resting orders first by price and, within price, prorates matching among resting orders at the same price. Proration-qualified orders include all resting orders at that price which are not temporarily unmatchable orders and therefore do not temporarily yield priority to orders at the same price. Proration of the quantity matched is typically, but not necessarily, based on the aggregate unexecuted quantity of all proration-qualified orders. For example, if an inbound buy order with 10,000 unexecuted shares is to be prorated among resting proration-qualified sell orders with a total of 20,000 shares unexecuted shares, each of the proration-qualified orders would typically be matched against the inbound order for 50% (10,000±20,000) of each sell order's unexecuted quantity. (Note: Rounding calculations and/or special handling of matches involving odd-lot orders or orders which would become odd-lot orders after a prorated match might produce a slightly different result.)

The contingent order matching system (COMS) of a preferred embodiment is compatible with other priority systems used to match orders. FIG. 4 through FIG. 7 and FIG. 8 through FIG. 11 show how COMS would operate in either a ranked priority system or a prorated priority system. The omission of any other priority system in the text or figures should not be taken to imply that COMS cannot match orders using that priority system.

BRIEF DESCRIPTION OF THE DRAWINGS

FIGS. 2A through 2E are schematic representations showing an overview of the relationship between the processes shown in FIG. 3 through FIG. 19.

FIG. 20 is a table showing sample values for standard matching rate (SMR), minimum matching rate (MMR), and the extreme values an order sender may specify as an order's FRC rate as dictated by SMR and MMR.

FIG. 21 is a table showing definitions of certain symbols used in the flowcharts of FIGS. 3 through 19.

DETAILED DESCRIPTION OF THE PREFERRED EMBODIMENTS

Figure 1:
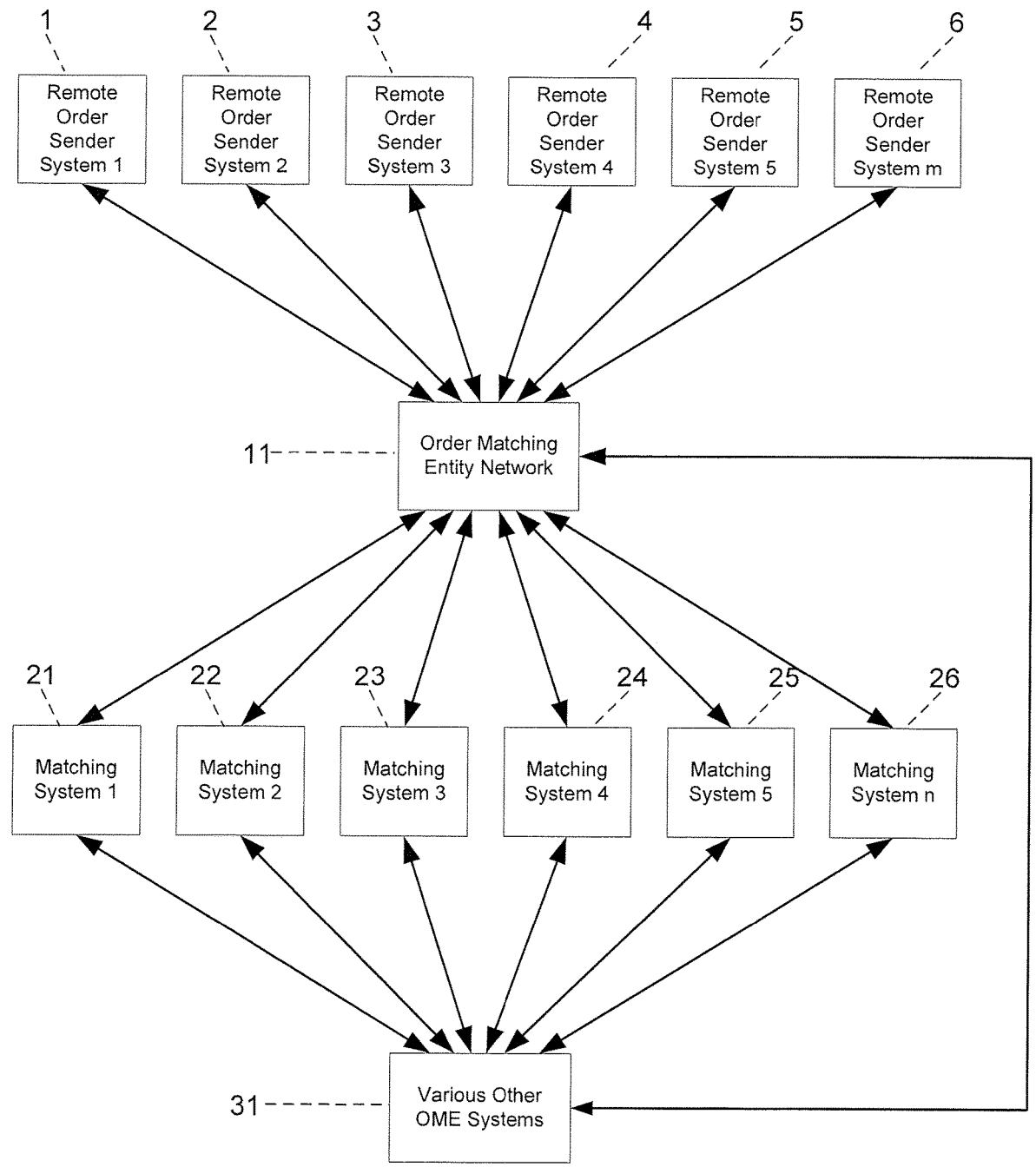
FIG. 1 is schematic representation showing an overview of the interaction between order senders, the order matching entity's (OME's) electronic network, and the OME's matching systems.

For the purpose of a detailed description of the contingent order matching system's (COMS') functionality, the following hold true:

Reference to the matching system implies reference to a matching system which employs the contingent order matching system (COMS) order matching method and system according to embodiments of the present invention.

Unless otherwise stated, reference to an "order" means an order to buy or to sell. Cross orders will always be referred to as cross orders.

The use of the term "product" refers to a financial instrument or trading unit or tradable interest and shall encompass any of these.

A market order is an order which does not have a price limit. Typically, a market order is to be executed at the best available price without limitation. However, in certain situations or certain regulatory regimens, the contingent order matching system (COMS) may not execute a market order immediately.

A limit order is a buy (or sell) order which has a maximum (or minimum) price at which it can be executed. That price is known as the limit order's limit price.

Under certain circumstances rules may prevent a market order or limit order from being executed even if there appears to be an order with which the order could be matched. One example of this would be a market order or a limit order to sell shares short if rules or regulations are in place which restrict the pricing of that order. Another example would be the existence of price collars or a price limits which constrain the price at which any matching may take place. For this reason, the contingent order matching system (COMS) assigns a WorkingPrice value for every market or limit order as described above.

The matching system of one embodiment can process only one inbound order-related message for a given product at a time. That message can be an inbound order, a request to cancel a resting order, a request to modify a resting order, or a request for the status of a resting order. The matching system completes all required matching system actions related to an inbound order-related message before handling the next inbound order-related message received by the matching system for the same product from the electronic network. The matching system always handles inbound order-related messages on a first in-first out (FIFO) basis. Other systems may allow processing of plural orders at a time, such as by parallel handling of orders, are within the scope of this invention.

Matching System Handling of Inbound Buy and Sell Orders

This section includes a discussion of the handling of inbound buy orders and sell orders. Handling of inbound cross orders (if accepted by an OME) is discussed elsewhere.

When an inbound order message to buy or sell is received by the OME's electronic network, it is routed to the matching system which is assigned to handle matching of orders in that product. If the matching system is currently processing another message for that product, the inbound order is queued for matching system processing on a FIFO basis.

An overview of the logic for handling inbound buy and sell orders is shown in FIG. 2A as "Receipt of a New Inbound Order." The details of the handling of inbound buy and sell orders is discussed in the descriptive text below relating to FIG. 3 through FIG. 7.

Matching System Handling of Inbound Cross Orders

This section includes a discussion of the handling of inbound cross orders. Handling of inbound buy and sell orders is discussed immediately above.

When an inbound cross order message is received by the OME's electronic network, it is routed to the matching system which is assigned to handle matching of orders in that product. If the matching system is currently processing another message for that product, the inbound cross order is queued for matching system processing on a FIFO basis.

An overview of the logic for handling inbound cross orders is shown in FIG. 2A as "Receipt of a New Inbound Order." The detail of handling inbound cross orders is discussed in the descriptive text below relating to FIG. 3.

Matching System Handling of Inbound Order Modification Messages

The handling of inbound order modification messages (buy and sell orders only) is consistent with the current state of the art systems. Therefore no further discussion of this message type is provided.

Matching System Handling of Inbound Order Cancellation Messages

The handling of inbound order cancellation messages is consistent with the current state of the art systems. Therefore no further discussion of this message type is provided.

Matching System Handling of Inbound Order Status Request Messages

The handling of inbound order status request messages is consistent with the current state of the art systems. Therefore no further discussion of this message type is provided.

Matching System Handling of Quotation Changes

Unlike current state of the art matching systems, the contingent order matching system (COMS) permits acceptance of orders which may lock or cross the matching system's resting order book. In products for which protected quotations in the same product (or instruments which comprise a product) exist, it is possible that a protected quotation at another OME may prevent COMS from matching two orders because the resulting match would trade through a protected price published by another OME. US equities products which trade under Regulation NMS are examples of such products. For products which have at least one instrument which has a protected quote, COMS must examine the contents of the resting order book each time the national best bid (NBB) changes to a lower price or the national best offer (NBO) rises to a higher price to determine whether the change in NBB or NBO permits two or more resting orders which were previously unmatchable to now be matched because the match price would no longer trade through a protected price in another marketplace.

The details of handling of a price quotation change are discussed in the descriptive text below relating to FIG. 12 through FIG. 14.

The present method and system builds on the art of matching systems. It relies on whatever implementation of functions and methods an OME has in place or will put in place to support the contingent order matching system (COMS).

Description of Functions Presented in the Figures

The figures refer to the following functions:

The function TOB( )—This function, not shown in the figures accompanying this document, returns the ORDER which is the highest ranked order (i.e., "Top Of Book") on one side of the OME's resting order book.

The function TOB(BUY) returns the highest ranked buy order in the resting order book.

The function TOB(SELL) returns the highest ranked sell order in the resting order book.

The function Prorate(ORDER, SELECTEDORDERS, MatchPrice)—This function, not shown in the figures accompanying this document, is the OME's state of the art match proration algorithm. Prior to calling the function Prorate(ORDER, SELECTEDORDERS, MatchPrice), COMS sets FRCRm for ORDER based on MatchPrice. COMS also sets FRCRm for each order in SELECTEDORDERS based on MatchPrice. Orders are selected into SELECTEDORDERS to assure that any existing fee/rebate contingency will be satisfied in a match between ORDER and any order included in SELECTEDORDERS at MatchPrice.

The function Prorate(ORDER, SELECTEDORDERS, MatchPrice) prorates by matching ORDER's UnexecutedQty among the UnexecutedQty of all orders comprising SELECTEDORDERS using the OME's proration algorithm at MatchPrice.

Referring first to FIG. 1 in which is shown an overview of how the matching system relates with other systems provided by order senders and the OME. A potentially unlimited number of remote order sender systems 1, 2, 3, 4, 5, and 6 are connected to the OME's network 11. Order senders transmit order related messages to the OME through these connections. These include new orders, cancel requests, order modification requests, and status requests. The OME uses the same connections to send order senders order update messages to order senders. These may include order acknowledgements, order rejections, cancellation confirmations, executions or partial executions, replacements, expirations, stop order elections, done for day, and other messages.

The OME's Network 11 routes each message from an order sender to the particular matching system 21,21, 23, 24, 25, and 26 which is assigned to handle the all matching activity for the specific product related to the order sender's message. These connections are also used by each matching system to route messages generated by the matching system to the order sender.

Each matching system 21, 21, 23, 24, 25, and 26 is connected to a number of auxiliary OME systems (shown collectively as 31). Each matching system sends these auxiliary systems information such as quotes to publish, matching activity (last sale reports), resting order book information, and post trade information (including clearing reports and information used for risk analysis and regulatory compliance. These systems send each matching system information about the current state of the market for each product which is not known to the matching system. This may include quotes and last sale reports from all external sources, the NBBO, and all messages that may affect trading (including trading halts, short sale price triggers, trading collar changes, etc.). The extent to which various types of data are sent over these connections may be dependent on the products handled by a given matching system. For example, a matching system which handles US equities products traded under SEC Regulation NMS will require the OME systems 31 to provide a complete set of quote data from other marketplaces so that the matching system can protect quotations in other markets as required under Regulation NMS. However a matching system which handles futures contracts for which there are no protected quotations on other exchanges will not require systems 31 to provide this data.

Additional connections (shown as a single connection for simplicity but comprising multiple connections in practice) link these other OME Systems 31 with the Order matching system's Network 11. These connections allow the OME to provide detailed or aggregated inventory information to order senders for one or more products.

In FIG. 2 is shown information about the interrelation among the various functions which are presented in FIG. 3 through FIG. 19. For example, the section "Receipt of New Inbound Order" indicates that FIG. 3 handles receipt of an inbound order by the matching system. A flowchart for the function ReceiptOfInboundOrder( ) is shown in FIG. 3. That function calls the function CalcInboundFRCRate( ) (FIG. 15)—and, as appropriate—calls either MatchInboundBuyOrderRanked( ) (FIG. 4), MatchInboundBuyOrderProrate( ) (FIG. 5), MatchInboundSellOrderRanked( ) (FIG. 6), or MatchInboundSellOrderProrate( ) (FIG. 7).

References to figures in a bold box in the drawing FIG. 2 indicate that the corresponding functions are called from more than one point in the process. References to figures in a standard box in FIG. 2 indicate that the corresponding functions are only called from one point in the process. Lines connecting references to figures contain either one or two arrows. Lines containing one arrow indicate that the flow of control is in one direction. Lines containing two arrows indicate that the flow of control is returned to the calling figure (function).

Figure 3:
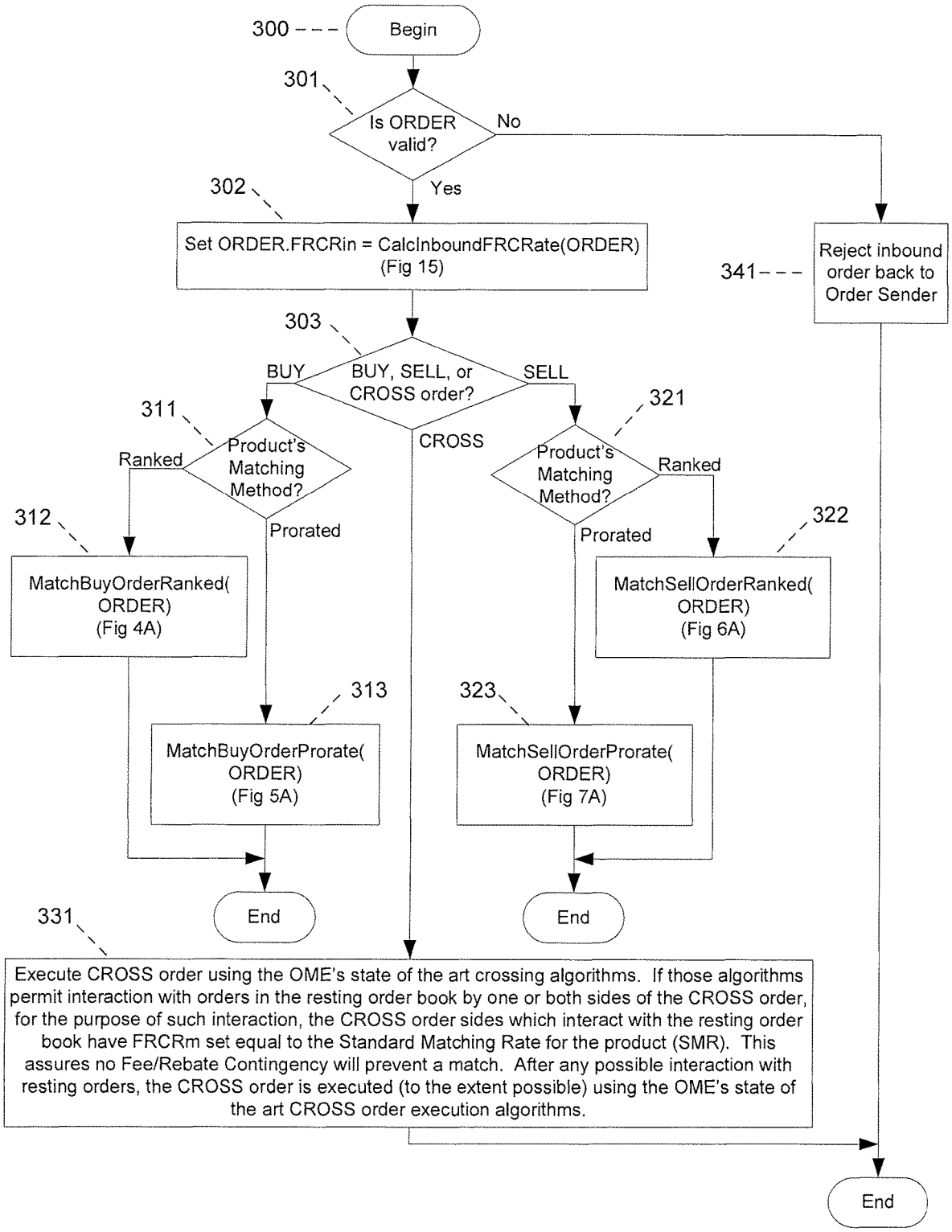
FIG. 3 is a flowchart showing the steps taken in handling an inbound order to buy, sell, or execute a cross transaction in a product. The associated function is called ReceiptOfInboundOrder( ).

Referring to FIG. 3, a flowchart shows the steps taken in handling a (new) inbound order to buy, sell, or execute a cross transaction in a product. The single parameter passed to the function ReceiptOfInboundOrder( ) is the new, inbound order ORDER. At step 300 processing begins when the inbound order is received by the matching system. At step 301 the matching system validates the order to assure that the order provides reasonable data and provides all information required to match the order. Most of the validation done is consistent with the current state of the art of matching systems. However, setting the order's fee/rebate contingency rate (FRCRorder) is a feature which is unique to the present invention.

If the order includes an explicit (numerical) FRCRorder parameter, the order validation must validate that the explicit FRC rate for the inbound order meets two conditions:

FRCRorder≤SMRproduct(standard matching rate for this product)

FRCRorder≥MRRproduct(maximum rebate rate for this product)

If the order ORDER includes an implicit (non-numerical) FRCRorder parameter, the matching system will translate that explicit FRCRorder into a numerical value. If order includes no FRCRorder parameter, the value FRCRorder is set to the value SMRproduct.

The values SMRproduct and MMRproduct are set by the OME for each product. (See the text related to FIG. 20 for a description of restrictions on how these values may be set.) If the value FRCRorder is provided as a parameter of the order, FRCRorder must meet both of these conditions. Otherwise the order is not valid. If the order is valid, processing continues at step 302. Otherwise processing continues at step 341, where the invalid order is rejected and sent back to the order sender.

At step 302 the value ORDER.FRCRin is set by calling the function CalcInboundFRCRate(ORDER). (see FIG. 15) The value ORDER.FRCRin is the presumed FRC (fee/rebate contingency) rate for matching the order when the order is an inbound order. The function ORDER.FRCRin may be overridden by the function CalcMatchFRCRate( ) during the inbound order matching process. (see FIG. 17) Processing continues at step 303.

In step 303 the order is either an order to buy, an order to sell, or an order to cross a financial instrument. This is tested in this step. If the order is a buy order, then processing continues at step 311. If the order is a sell order, then processing continues at step 321. If the order is a cross order, then processing continues at step 331.

In step 311 the order has been determined to be an inbound buy order. Various methods exist for prioritizing the sequence in which or the extent to which orders are matched. FIG. 3 shows two specific methods for prioritizing the sequence/extent to which orders are matched. One method is matching using "ranked priority." Typically this method involves ranking orders in price/time sequence. In ranked priority matching, orders to buy (or sell) at a higher (or lower) price have priority over orders at a lower (or higher) price. This assumes that time is the secondary ranking method for orders in the resting order book. Other secondary ranking criteria may be used instead. Within the set of orders indicating that the order sender is willing to buy or sell at a given price point, a secondary prioritization is established to give orders time priority—ranking orders that were electronically time stamped first ahead of orders that were time stamped subsequently. (In some markets, displayed size is ranked ahead of non-displayed size at each price point.) When using a ranked priority system, the contingent order matching system (COMS) requires that the primary priority level to be ranked is price point. COMS is indifferent as to secondary or tertiary ranking bases.

Another method for matching is matching using "proration." As with matching using "ranked priority," the contingent order matching system (COMS) requires that there must be a primary ranking by price point for a proration method. With a proration method of matching, resting orders at a given price point may—through an algorithm determined by the OME—share in the matching against an inbound order without requiring that any one order stands ahead of all other orders until that one order is fully executed.

Additional methods of order matching may be applicable with COMS. The only requirement which COMS has is that orders at a superior price point must be ranked and, therefore, executed ahead of orders which are ranked an inferior price point (i.e., price priority).

For simplicity in presenting the figures, only two (of many) possible matching methods are shown: the ranked priority method and the proration method. The contingent order matching system (COMS) can be applied to other matching methods which are based on price priority as the primary ranking for matching. If the product associated with the order is a product where matching is done using a ranked priority method, processing continues at step 312. If the product is matched using a proration method, processing continues at step 313.

In step 312, the function MatchInboundBuyOrderRanked (ORDER) is called to complete processing the order. (see FIG. 4A) One parameter passed to the function MatchInboundBuyOrderRanked( ) is the inbound order. When control is returned from the function MatchInboundBuyOrderRanked( ) no further action is required.

In step 313 the function MatchInboundBuyOrderProrate (ORDER) is called to complete processing of the order. (see FIG. 5A) One parameter passed to the function MatchInboundBuyOrderProrate( ) is the inbound order. When control is returned from MatchInboundBuyOrderProrate( ) no further action is required.

In step 321, the order is an inbound sell order. If the product associated with the order is a product where matching is done using a ranked priority system, processing continues at step 322. Otherwise this product is matched using the proration method, and processing continues at step 323.

In step 322, the function MatchInboundSellOrderRanked (ORDER) is called to complete processing of the order. (see FIG. 6A) One parameter passed to the function MatchInboundSellOrderRanked( ) is the inbound order. When control is returned from MatchInboundSellOrderRanked( ) no further action is required.

In step 323, the function MatchInboundSellOrderProrate (ORDER) is called to complete processing order. (see FIG. 7A) One parameter passed to the function MatchInboundSellOrderProrate( ) is the inbound order. When control is returned from the function MatchInboundSellOrderProrate( ) no further action is required.

In step 331, if the inbound order is a cross order, an OME may permit an inbound cross order to interact with the resting order book. If this is the case, the buy and sell sides of the inbound cross order are handled as two separate inbound orders for this purpose, each being matched by the function ReceiptOfInboundOrder( ) beginning at step 300 as through that side of the cross order had been received separately from the cross order. After matching against resting orders, any unmatched balance of the buy and sell sides of the inbound cross order are then eligible to be crossed using the OME's current state of the art algorithms.

If the OME does not support a cross order interacting with the matching system's resting order book, then COMS does not alter the OME's current state of the art algorithm for executing a cross order. If the OME supports that interaction, the portions of the cross order which interact with the resting order book are treated as inbound orders with an inbound FRC rate (FRCRin) value of SMR.

In step 341, the order has been determined to be invalid. The order is rejected and is sent back to the order sender, and no further processing of this inbound order is done.

Figure 4A:
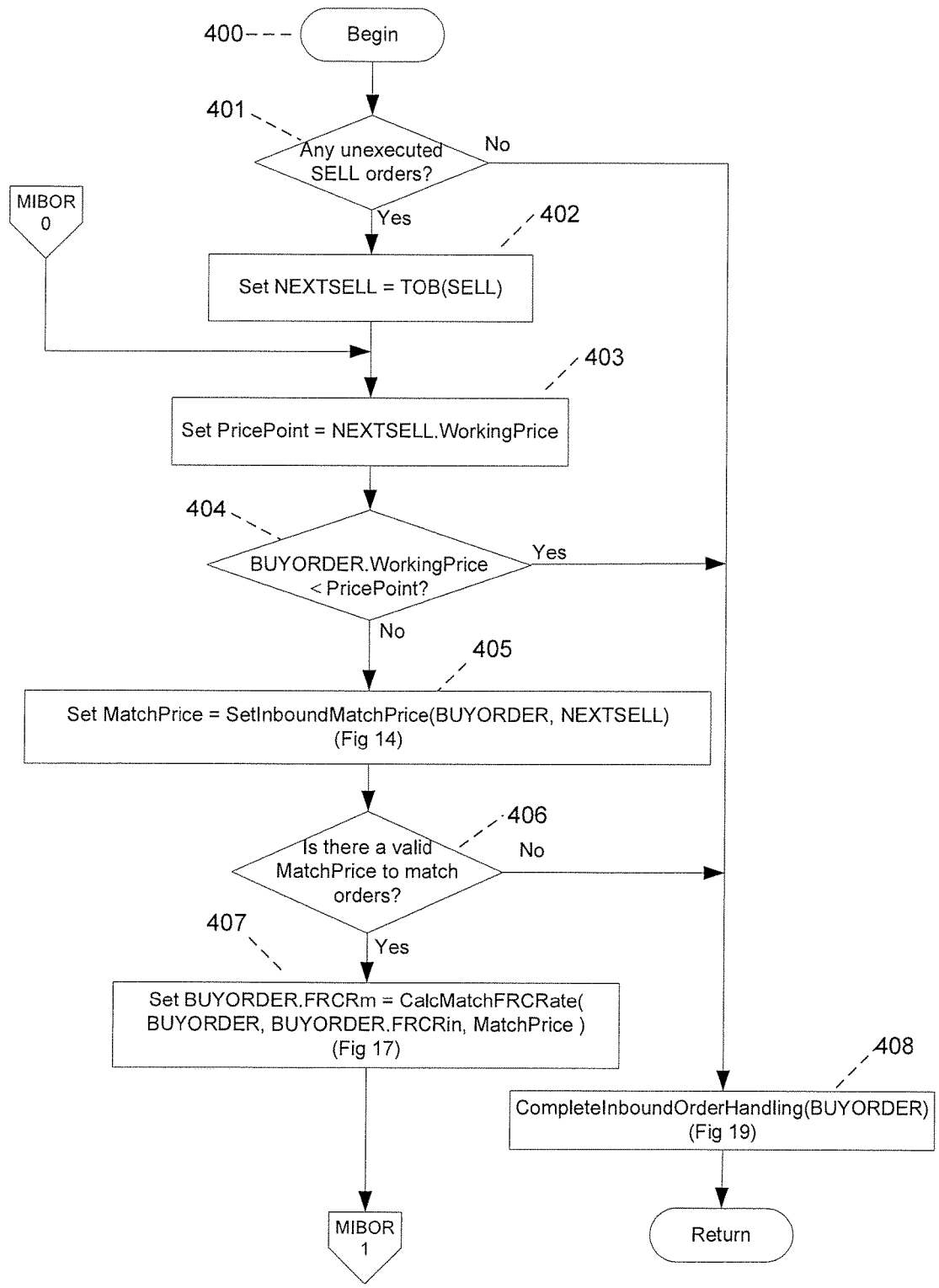
FIGS. 4A and 4B are flowcharts showing the handling of an inbound buy order in a product using a ranked priority system. The associated function is called MatchInboundBuyOrderRanked( ).
Figure 4B:
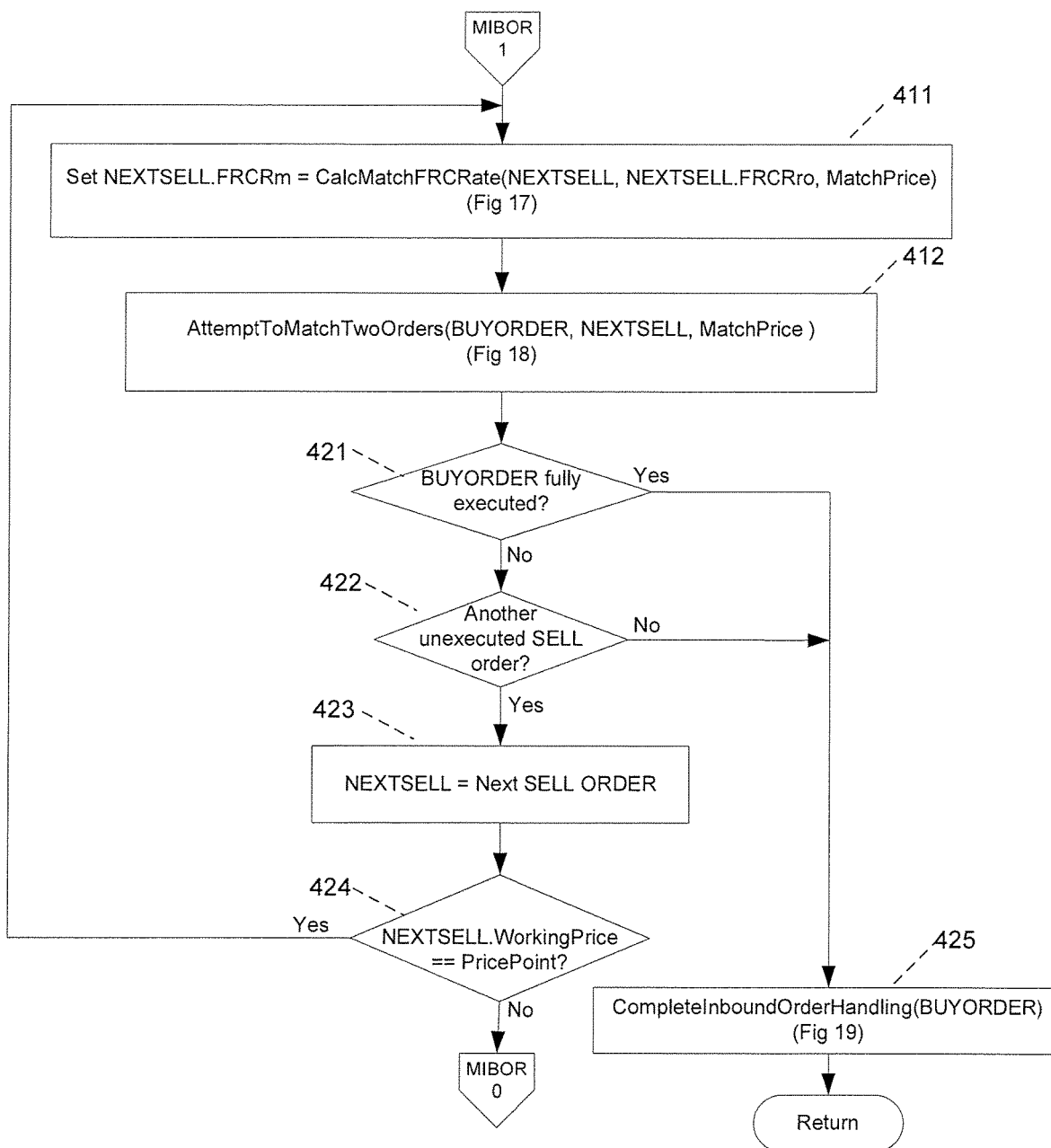

FIGS. 4A and 4B comprise a flowchart showing how the matching system handles an inbound buy order in a product where matching is done using a ranked priority method. Processing begins at step 400. One parameter is passed to the function MatchInboundBuyOrderRanked( ) the buy order BUYORDER. Processing continues at step 401.

In step 401, if there are no unexecuted sell orders, it is impossible to match the order BUYORDER, and processing continues at step 408. Otherwise a match is possible, and processing continues at step 402. In step 402, the order NEXTSELL is set to the highest ranked (TOB means "Top of Book") sell order in the resting order book—TOB(SELL), and processing continues at step 403. In step 403, the value of the current PricePoint is set to be the value WorkingPrice of the next sell order in the resting order book, and processing continues at step 404. In step 404, if the order BUYORDER's WorkingPrice is less than PricePoint, no match is possible, and processing continues at step 408. Otherwise a match is possible, and processing continues at step 405.

In step 405, the variable MatchPrice for the next attempted match is set as the value returned by the function SetInboundMatchPrice( ). (see FIG. 14) SetInboundMatchPrice( ) is passed two parameters:

BUYORDER is passed as the inbound buy order to attempt to match

NEXTSELL is passed as the resting sell order to attempt to match

The function SetInboundMatchPrice( ) returns the value of the next MatchPrice, if one exists. If no match is possible, MatchPrice is set to indicate that there is no possible match. Processing continues at step 406. Referring to step 406, if the variable MatchPrice is a valid price at which to match, then processing continues at step 407. Otherwise no match is possible, and processing continues at step 408.

In step 407, at this point in the matching process, COMS has determined that BUYORDER and NEXTSELL have WorkingPrice values which are compatible for a match. Now COMS must determine whether the FRC rates of these orders—matched at MatchPrice—permit a match to be completed. The match-specific FRC rate (FRCRm) for BUYORDER must be determined. CalcMatchFRCRate( ) is called to set FRCRm for BUYORDER. (see FIG. 17) CalcMatchFRCRate( ) is called with three parameters: BUYORDER is passed as the order, BUYORDER.FRCRin is passed as BUYORDER's FRC rate prior to adjustment for this specific match, and MatchPrice is passed as the attempted match price. Processing continues at step 411 on FIG. 4B linked by MIBOR1.

In step 408, no additional matches can be made between BUYORDER and any sell order in the resting order book. The function CompleteInboundOrderHandling( ) is called to determine how to end the process of handling the inbound BUYORDER. (see FIG. 19) One parameter is passed to the function CompleteInboundOrderHandling( ) the inbound BUYORDER. After the function CompleteInboundOrderHandling( ) is called, handling BUYORDER as an inbound order is complete.

In step 411, the match-specific FRC rate (FRCRm) for NEXTSELL must be determined. The function CalcMatchFRCRate( ) is called to set the Match FRC rate for NEXTSELL. (see FIG. 17) It is called with the following parameters: NEXTSELL is passed as the order, NEXTSELL.FRCRo is passed as NEXTSELL's FRC rate prior to adjustment for this specific match, and MatchPrice is passed as the attempted match price. Processing continues at step 412.

In step 412, the function AttemptToMatchTwoOrders( ) is called to determine whether BUYORDER and NEXTSELL can be matched. If they can be matched, AttemptToMatchTwoOrders( ) executes the match. (see FIG. 18) AttemptToMatchTwoOrders( ) is called with three parameters: BUYORDER is passed as the buy order to attempt to match, NEXTSELL is passed as the sell order to attempt to match, and MatchPrice is passed as the attempted match price.

Since COMS causes an unmatchable NEXTSELL in the resting order book to temporarily yield priority if it cannot be matched, the remaining portion of this flowchart does not need to know whether a match takes place. Simply moving on to the next sell order, if any, results in this behavior. Processing continues at step 421.

In step 421, if the order BUYORDER has been fully executed, processing continues at step 425. Otherwise COMS attempts to execute the unexecuted balance of BUYORDER, and processing continues at step 422. In step 422, a determination is made as to whether there is another unexecuted sell order in the resting order book. If so, processing continues at step 423, otherwise no match is possible, and processing continues at step 425.

In step 423, there is another unexecuted sell order in the resting order book to attempt to match with BUYORDER. NEXTSELL is set to reference the next sell order, and processing continues at step 424. In step 424, the value of NEXTSELL's WorkingPrice is compared with the value of PricePoint set at step 403. If the values are the same, then there is no need to repeat steps 403 through 407, and processing continues at step 411. If the values are different, then matching at this PricePoint is complete, and processing continues at step 403 on FIG. 4A linked by MIBORO.

In step 425, a determination has been made as to whether there are further matches to be made. No additional matches can be made between BUYORDER and any sell order in the resting order book. The function CompleteInboundOrderHandling( ) is called to determine how to end the process of matching BUYORDER. (see FIG. 19) After the function CompleteInboundOrderHandling( ) is called, handling of BUYORDER as an inbound order is complete.

Figure 5A:
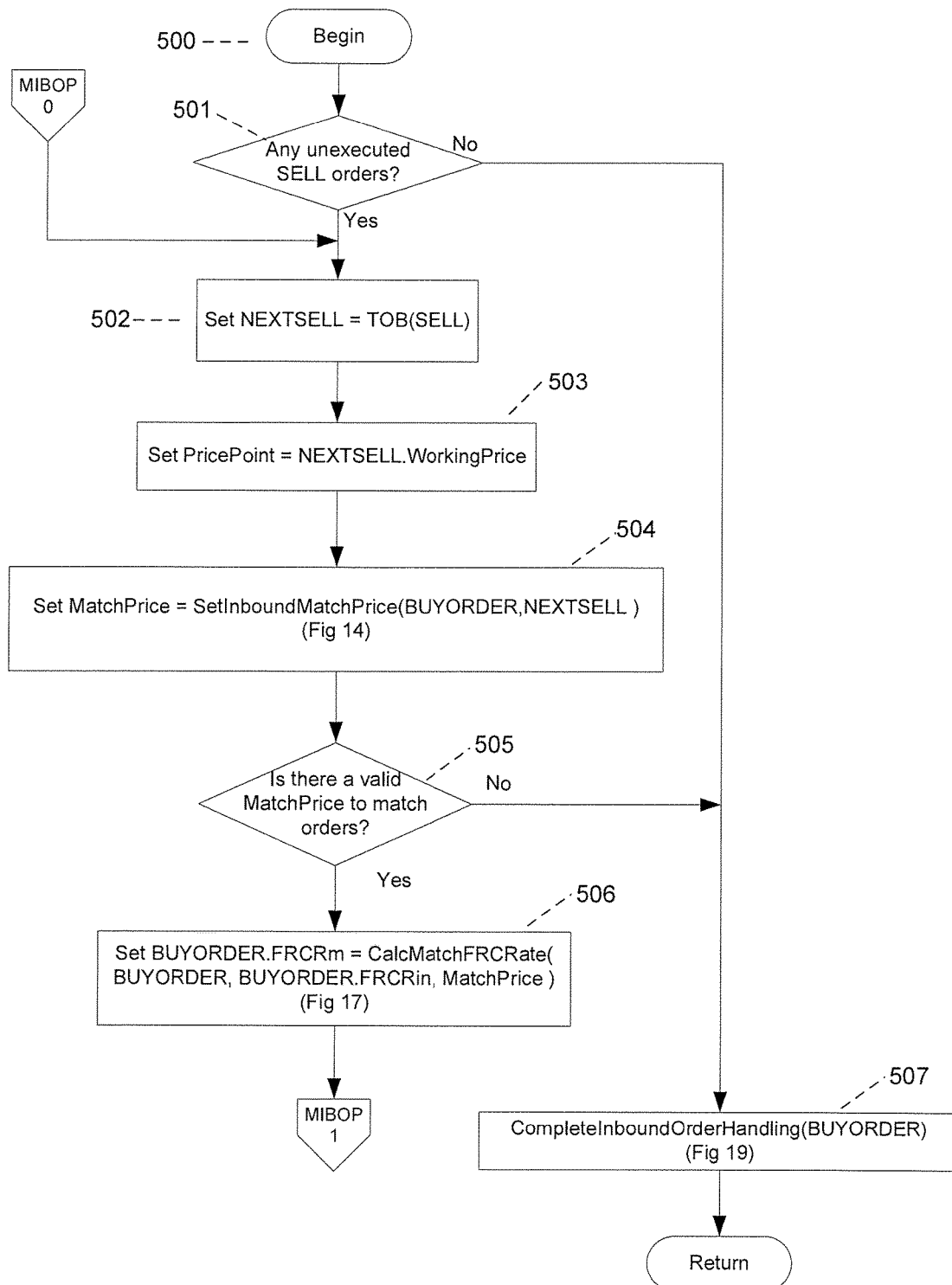
FIGS. 5A and 5B are flowcharts showing the handling of an inbound buy order in a product using a prorated priority system. The associated function is called MatchInboundBuyOrderProrate( ).
Figure 5B:
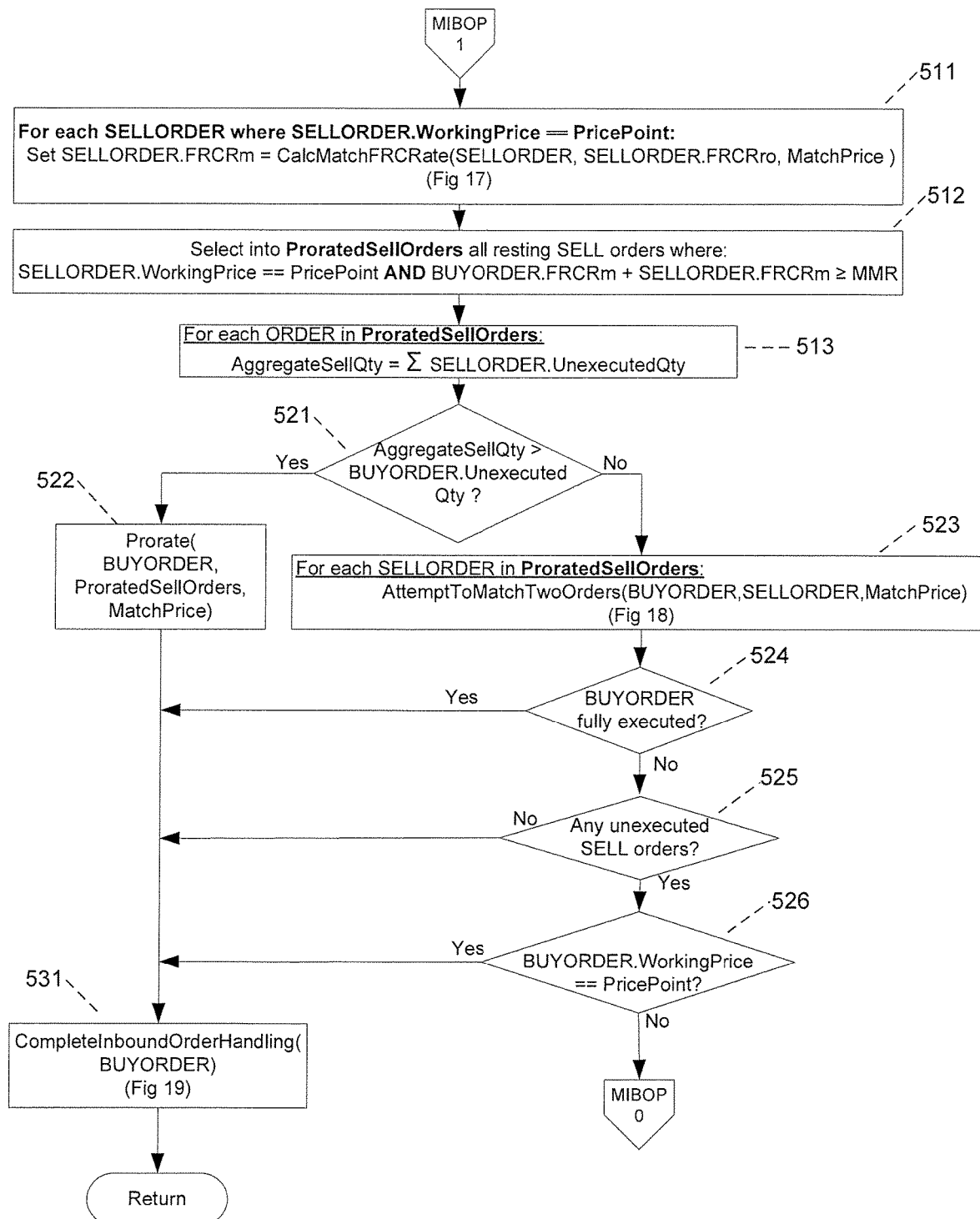

With reference now to FIGS. 5A and 5B, a flowchart showing how the matching system handles an inbound buy order in a product where matching is done using a prorated priority system is provided. In step 500, processing begins. One parameter is passed to MatchInboundBuyOrderProrate( ) the inbound buy order (BUYORDER). Processing continues at step 501. In step 501, if there are no unexecuted sell orders, it is not possible to match BUYORDER, and processing continues at step 507. Otherwise a match is possible, and processing continues at step 502.

In step 502, the order NEXTSELL is set to the highest ranked (TOB means "Top of Book") sell order in the resting order book—TOB(SELL), and processing continues at step 503. In step 503, the value of the current PricePoint is set to be the WorkingPrice of the next sell order in the resting order book, and processing continues at step 504. In step 504, the value MatchPrice for the next attempted match is set as the value returned by the function SetInboundMatchPrice( ). (see FIG. 14) SetInboundMatchPrice( ) is passed two parameters: BUYORDER is passed as the inbound buy order to attempt to match and NEXTSELL is passed as the resting sell order to attempt to match.

The function SetInboundMatchPrice( ) returns the value of the next MatchPrice, if one exists. If no match is possible, the value MatchPrice is set to indicate that there is no possible match. Processing continues at step 505. In step 505, if the value MatchPrice is a valid price at which to match, then processing continues at step 506. Otherwise no match is possible, and processing continues at step 507. In step 506, at this point in the matching process, COMS has determined that the order BUYORDER and the order NEXTSELL have WorkingPrice values which are compatible for a match. Now COMS must determine whether the FRC rates of the order BUYORDER and certain sell orders with a WorkingPrice value equal to PricePoint—matched at MatchPrice—permit one or more matches to be completed. First, the match-specific FRC rate (FRCRm) for BUYORDER must be determined. CalcMatchFRCRate( ) is called to set FRCRm for BUYORDER. (FIG. 17) It is called with three parameters: BUYORDER is passed as the order, BUYORDER.FRCRin is passed as BUYORDER's FRC rate prior to adjustment for this specific match, and MatchPrice is passed as the attempted match price. Processing continues at step 511 on FIG. 5B linked by MIBOP1.

In step 507, no additional matches can be made between BUYORDER and any sell order in the resting order book. The function CompleteInboundOrderHandling( ) is called to determine how to end the process of handling of inbound BUYORDER. (see FIG. 19) After CompleteInboundOrderHandling( ) is called, handling of BUYORDER as an inbound order is complete.

In step 511, the match-specific FRC rate (FRCRm) for each sell order with a WorkingPrice equal to PricePoint must be determined. CalcMatchFRCRate( ) is called to set the Match FRC rate for each such order. (see FIG. 17) It is called for each such SELLORDER with the following parameters: SELLORDER is passed as the order, SELLORDER.FRCRro is passed as SELLORDER's FRC rate prior to adjustment for this specific match, and MatchPrice is passed as the attempted match price. Processing continues at step 512.

In step 512, the COMS must now select from among each such SELLORDER, those orders where the FRC rates for BUYORDER and SELLORDER permit a match to be made. This is done by selecting into ProratedSellOrders only those orders where the sum of BUYORDER's FRCRm value and SELLORDER's FRCRm value is greater than or equal to MMR for this product. Each sell order which is selected into ProratedSellOrders meets all requirements to be matched against BUYORDER. Processing continues at step 513.

In step 513, the COMS now determines AggregateSellQty—the aggregate quantity available to match in ProratedSellOrders. Processing continues at step 521. In step 521 a determination is made as to whether the value AggregateSellQty—the aggregate quantity available to match in ProratedSellOrders—is greater than the unexecuted balance of BUYORDER which remains to be matched. If the aggregate quantity available for sale exceeds the unexecuted balance of BUYORDER, then a proration of the unexecuted balance of BUYORDER among the orders in ProratedSellOrders is required, and processing continues at 522. Otherwise, every order in ProratedSellOrders will be matched against BUYORDER, and processing continues at step 523.

In step 522, the function Prorate(BUYORDER, ProratedSellOrders, MatchPrice) is called to perform the proration using whatever proration technique the OME currently uses. The proration method implemented by this function is outside the scope of the present invention. Because the available size to match in ProratedSellOrders exceeds the unexecuted balance of BUYORDER, Prorate( ) will complete the matching of BUYORDER. Processing continues at step 531.

Figure 18:
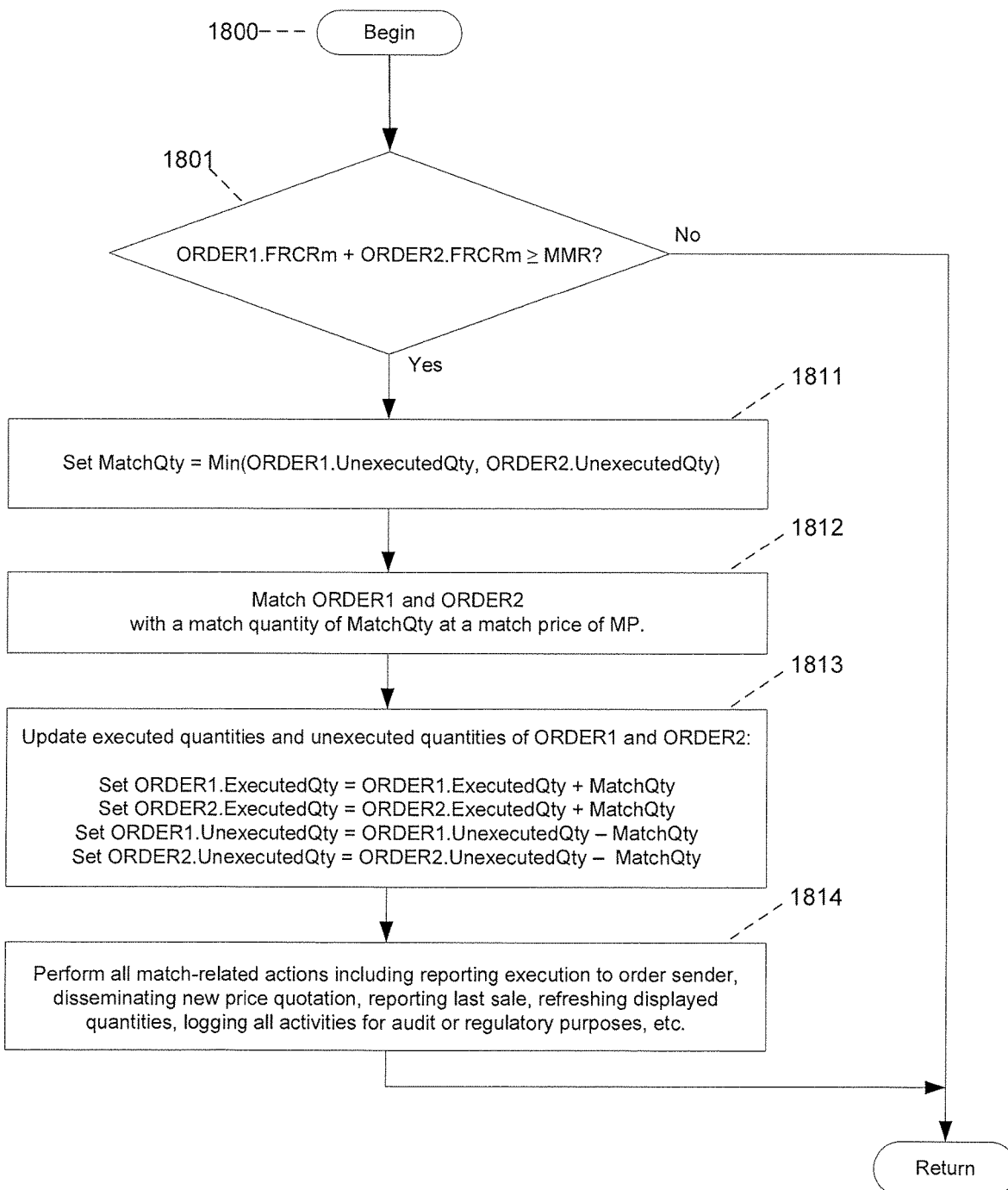
FIG. 18 is a flowchart showing how the contingent order matching system (COMS) determines whether two orders will be matched by defining the function AttemptToMatchTwoOrders( ).

Referring to step 523, because all orders in ProratedSellOrders will be completed as they are matched with BUYORDER, matching of these orders at the current PricePoint can proceed in any sequence without changing the outcome. The function AttemptToMatchTwoOrders (BUYORDER, SELLORDER, MatchPrice) is guaranteed to result in a match between BUYORDER and each sell order in ProratedSellOrders because the condition tested at step 1801 in FIG. 18 is assured to be true because of the selection criteria of step 512. When all orders in ProratedSellOrders have been matched, processing continues at step 524.

In step 524, the action in step 523 may have fully matched the unexecuted balance of BUYORDER. Alternatively BUYORDER may still have an unexecuted balance to attempt to match. If BUYORDER has been fully executed, processing continues at step 531. Otherwise BUYORDER continues to have an unexecuted balance, and processing continues at step 525.

In step 525, if there are no more unexecuted sell orders in the resting order book, then no additional matching is possible, and processing continues at step 531. Otherwise, additional matching may be possible, and processing continues at step 526.

In step 526, if the value of BUYORDER's WorkingPrice equals PricePoint, then COMS has already attempted to match BUYORDER at the highest price which BUYORDER can currently pay. If this is the case, then no additional matches are possible, and processing continues at 531. Otherwise processing continues at step 502 on FIG. 5A linked by MIBOP0.

In step 531, the function CompleteInboundOrderHandling( ) is called to complete handling of BUYORDER as an inbound order. This is the last step in attempting to match an inbound buy order using the prorated priority system.

Figure 6A:
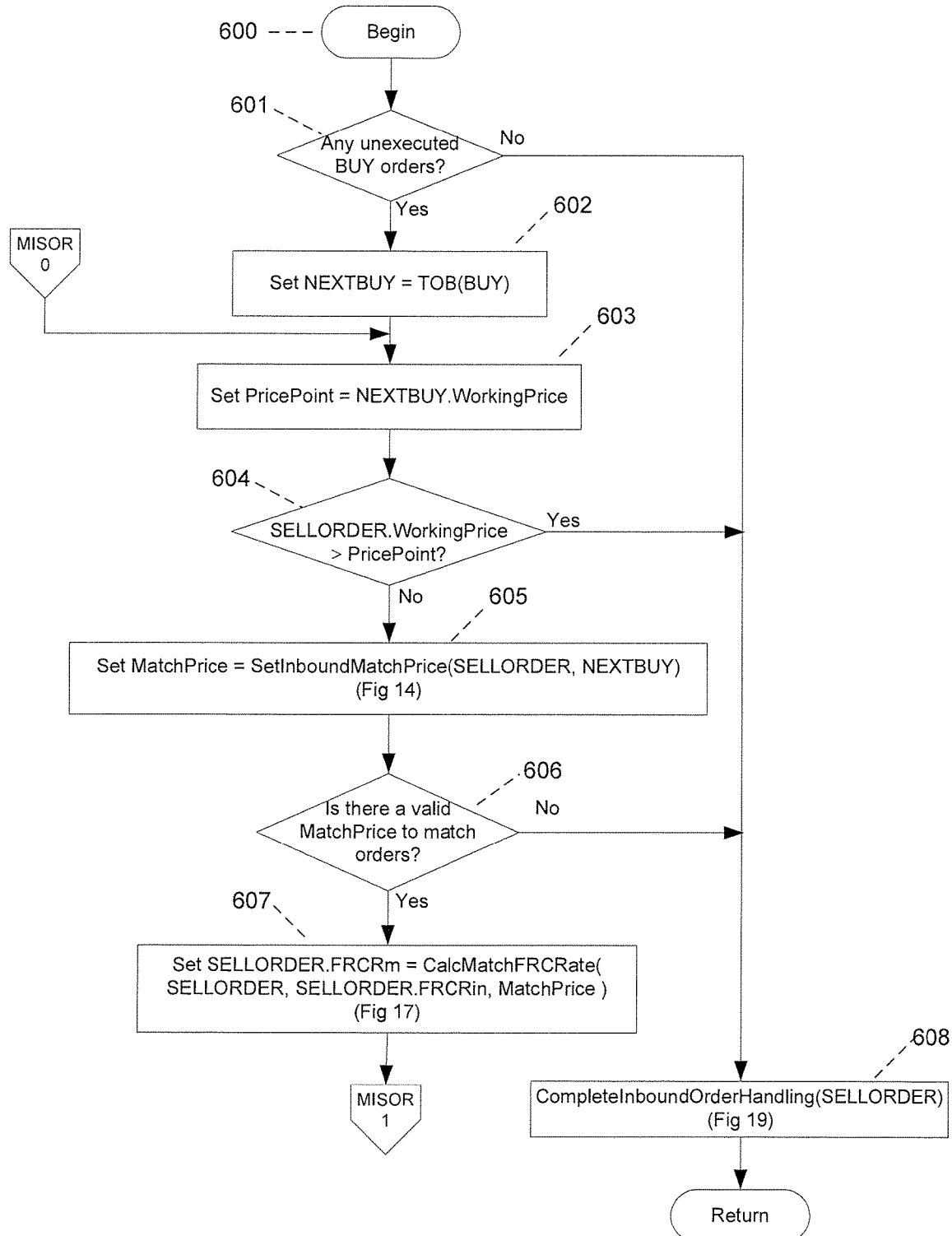
FIGS. 6A and 6B are flowcharts showing the handling of an inbound sell order in a product using a ranked priority system. The associated function is called MatchInboundSellOrderRanked( ).
Figure 6B:
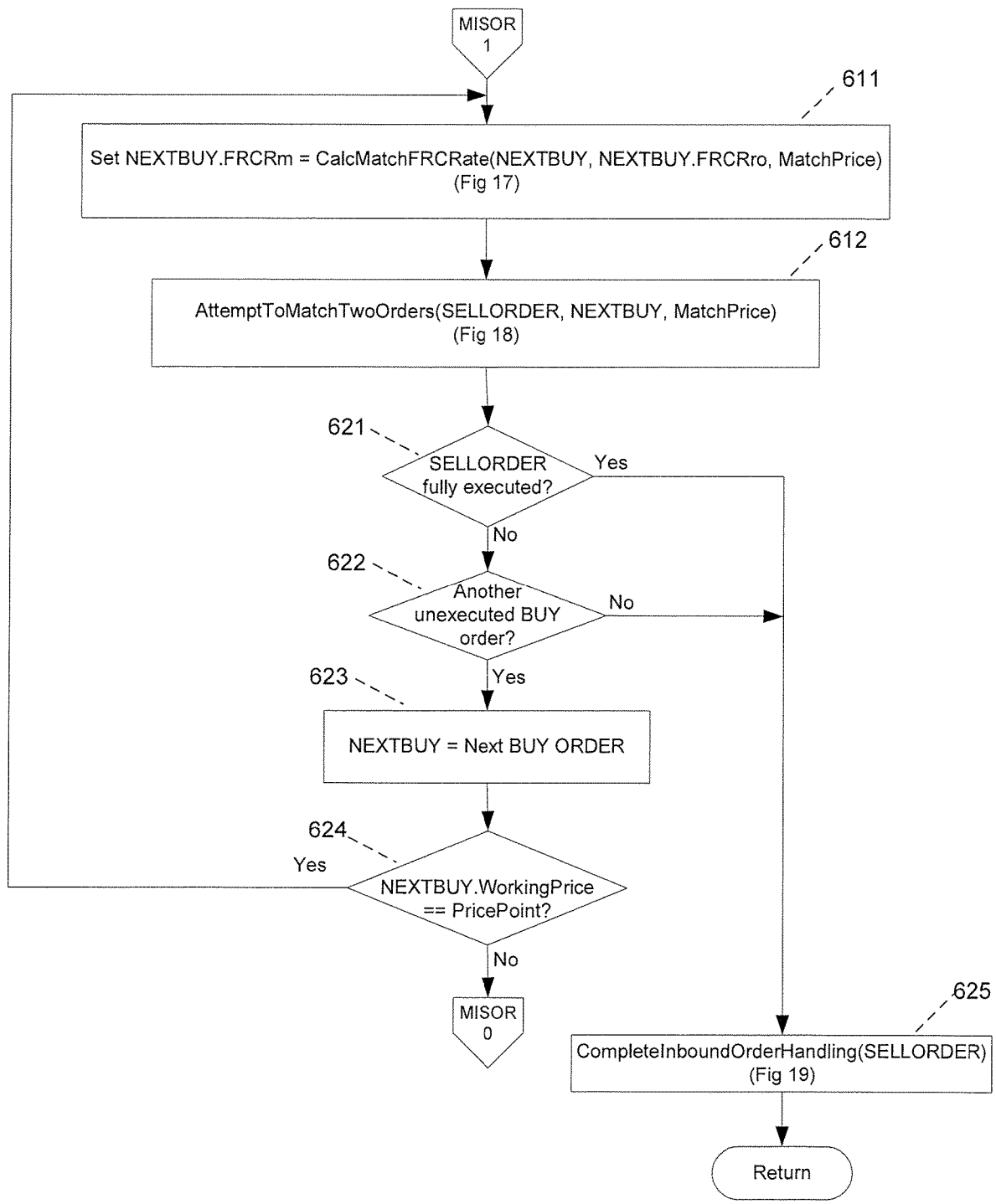

Turning now to FIGS. 6A and 6B, a flowchart is provided showing how the matching system handles an inbound sell order in a product where matching is done using a ranked priority system. In step 600 the processing begins. One parameter is passed to MatchInboundSellOrderRanked( ): the sell order (SELLORDER). Processing continues at step 601. In step 601, if there are no unexecuted buy orders, it is impossible to match SELLORDER, and processing continues at step 608. Otherwise a match is possible, and processing continues at step 602.

In step 602 the order NEXTBUY is set to the highest ranked (TOB means "Top of Book") buy order in the resting order book—TOB(BUY), and processing continues at step 603. In step 603, the value of the current PricePoint is set to be the WorkingPrice of the next buy order in the resting order book, and processing continues at step 604.

In step 604, if the value SELLORDER's WorkingPrice is greater than the value PricePoint, no match is possible, and processing continues at step 608. Otherwise a match is possible, and processing continues at step 605.

In step 605, the value MatchPrice for the next attempted match is set as the value returned by the function SetInboundMatchPrice( ). (see FIG. 14) SetInboundMatchPrice( ) is passed two parameters: SELLORDER is passed as the inbound sell order to attempt to match and NEXTBUY is passed as the resting buy order to attempt to match. SetInboundMatchPrice( ) returns the value of the next MatchPrice, if one exists. If no match is possible, MatchPrice is set to indicate that there is no possible match. Processing continues at step 606.

In step 606, if MatchPrice is a valid price at which to match, then processing continues at step 607. Otherwise no match is possible, and processing continues at step 608.

Referring to step 607, at this point in the matching process, COMS has determined that SELLORDER and NEXTBUY have WorkingPrice values which are compatible for a match. Now COMS must determine whether the FRC rates of these orders—matched at MatchPrice permit a match to be completed. The match-specific FRC rate (FRCRm) for SELLORDER must be determined. CalcMatchFRCRate( ) is called to set FRCRm for SELLORDER. (see FIG. 17) CalcMatchFRCRate( ) is called with three parameters: SELLORDER is passed as the order, SELLORDER.FRCRin is passed as SELLORDER's FRC rate prior to adjustment for this specific match, and MatchPrice is passed as the attempted match price. Processing continues at step 611 on FIG. 6B linked by MISOR1.

In step 608, no additional matches can be made between SELLORDER and any buy order in the resting order book. The function CompleteInboundOrderHandling( ) is called to determine how to end the process of handling the inbound SELLORDER. (see FIG. 19) After CompleteInboundOrderHandling( ) is called, matching of SELLORDER as an inbound order is complete.

In step 611, the match-specific FRC rate (FRCRm) for NEXTBUY must be determined. CalcMatchFRCRate( ) is called to set the value Match FRC rate for NEXTBUY. (see FIG. 17) It is called with the following parameters: NEXTBUY is passed as the order, NEXTBUY.FRCRro is passed as NEXTBUY's FRC rate prior to adjustment for this specific match, and MatchPrice is passed as the attempted match price. Processing continues at step 612.

In step 612, the function AttemptToMatchTwoOrders( ) is called to determine whether SELLORDER and NEXTBUY can be matched. If they can be matched, AttemptToMatchTwoOrders( ) executes the match. (FIG. 18) AttemptToMatchTwoOrders( ) is called with three parameters: SELLORDER is passed as the inbound sell order to attempt to match, NEXTBUY is passed as the resting buy order to attempt to match, and MatchPrice is passed as the attempted match price. Since COMS causes an unmatchable NEXTBUY in the resting order book to temporarily yield priority if it cannot be matched, the remaining portion of this flowchart does not need to know whether a match takes place. Simply moving on to the next buy order, if any, results in this behavior. Processing continues at step 621.

In step 621, if the SELLORDER has been fully executed, processing continues at step 625. Otherwise COMS attempts to execute the unexecuted balance of SELLORDER, and processing continues at step 622. In step 622, if there is another unexecuted buy order in the resting order book, processing continues at step 623. Otherwise no match is possible, and processing continues at step 625. In step 623, there is another buy order in the resting order book to attempt to match with SELLORDER. NEXTBUY is set to reference that order, and processing continues at step 624.

In step 624, the value NEXTBUY's WorkingPrice is compared with the value of PricePoint set at step 603. If they are the same, then there is no need to repeat steps 603 through 607, and processing continues at step 611. If they are different, then processing continues at step 603 on FIG. 6A linked by MISOR0.

In step 625, no additional matches can be made between the order SELLORDER and any buy order in the resting order book. The function CompleteInboundOrderHandling( ) is called to determine how to end the process of handling the order SELLORDER as an inbound order. (see FIG. 19) After the function CompleteInboundOrderHandling( ) is called, handling of the order SELLORDER as an inbound order is complete.

Figure 7A:
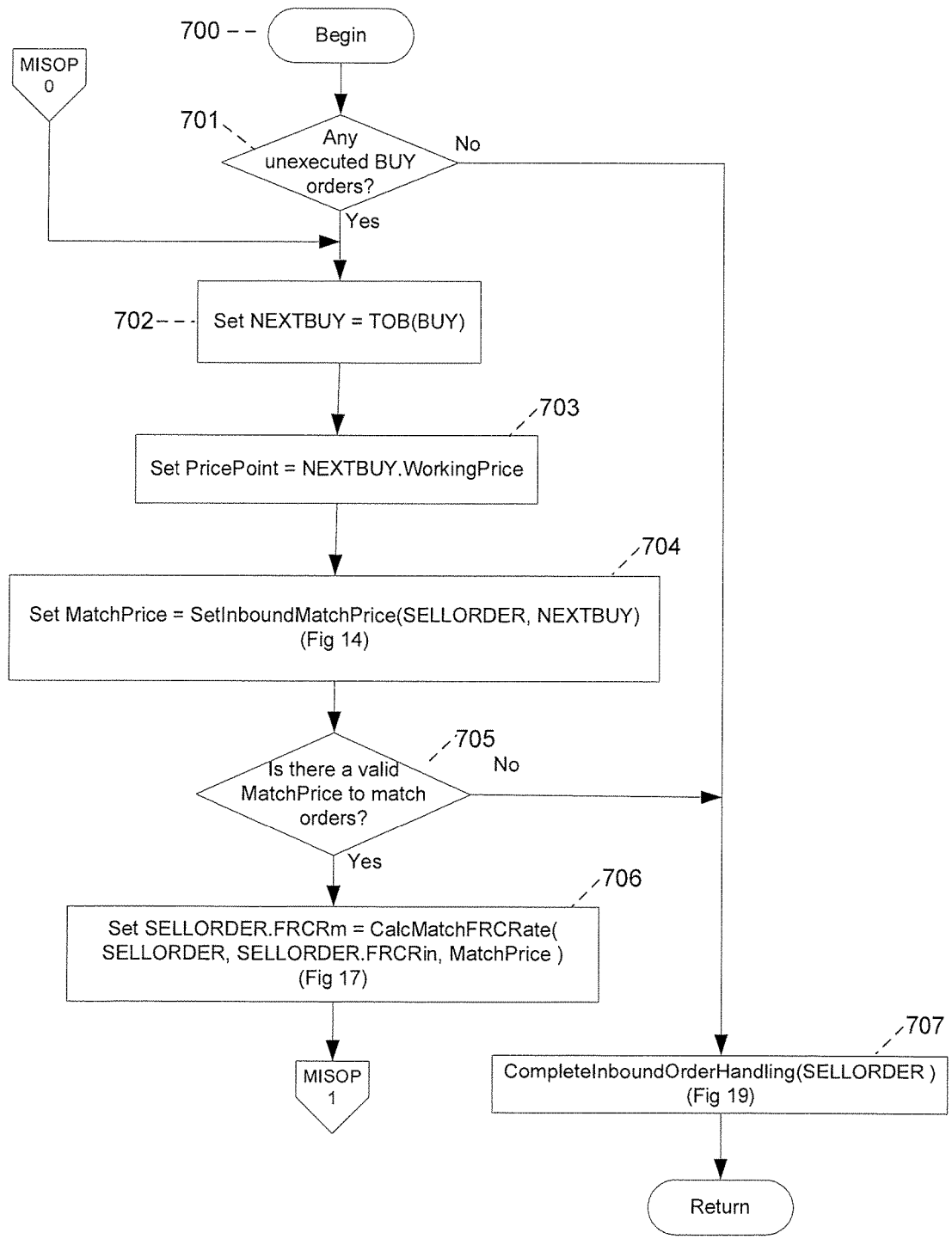
FIGS. 7A and 7B are flowcharts showing the handling of an inbound sell order in a product using a prorated priority system. The associated function is called MatchInboundSellOrderProrate( ).
Figure 7B:
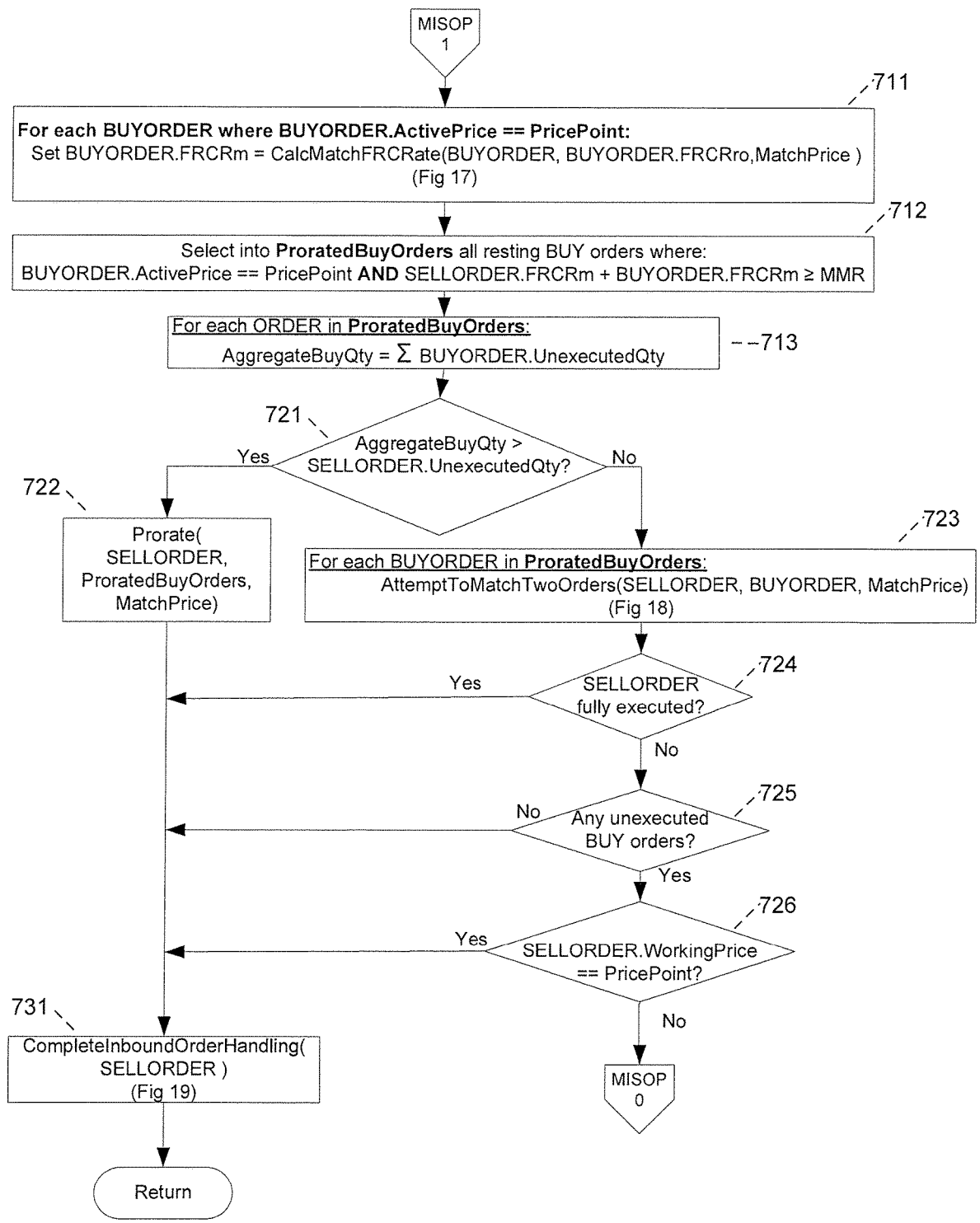

Turning now to FIGS. 7A and 7B, a flowchart shows how the matching system handles an inbound sell order in a product where matching is done using a prorated priority system. In step 700, processing begins. One parameter is passed to the function MatchSellOrderProrate( ): the sell order (SELLORDER). Processing continues at step 701. In step 701, if there are no unexecuted buy orders, it is not possible to match the order SELLORDER, and processing continues at step 707; otherwise a match is possible, and processing continues at step 702. In step 702, the order NEXTBUY is set to the highest ranked buy order in the resting order book and is designated TOB(BUY) (TOB means "Top of Book"). Processing continues at step 703.

In step 703, the current PricePoint value is set to be the WorkingPrice value of the next buy order in the resting order book. Processing continues at step 704. In step 704, the value MatchPrice for the next attempted match is set as the value returned by the function SetInboundMatchPrice( ).

(see FIG. 14) The function SetInboundMatchPrice( ) is passed three parameters: SELLORDER is passed as the inbound sell order to attempt to match and NEXTBUY is passed as the resting buy order to attempt to match. The function SetInboundMatchPrice( ) returns the value of the next MatchPrice, if one exists. If no match is possible, the value MatchPrice is set to indicate that there is no possible match. Processing continues at step 705.

In step 705, if the function SetInboundMatchPrice( ) returns a valid MatchPrice then processing continues at step 706; otherwise no match is possible, and processing continues at step 707. If the process goes to step 706, at this point in the matching process, the contingent order matching system (COMS) has determined that the order SELLORDER and order NEXTBUY have WorkingPrice values which are compatible for a match. Now the contingent order matching system (COMS) must determine whether the FRC (fee/rebate contingency) rates of the order SELLORDER and certain buy orders—matched at MatchPrice—permit one or more matches to be completed. The match-specific FRC rate (FRCRm) for the order SELLORDER must be determined. The function CalcMatchFRCRate( ) is called to set the value FRCRm for the order SELLORDER. (see FIG. 17) It is called with three parameters: SELLORDER is passed as the order, SELLORDER.FRCRin is passed as SELLORDER's FRC rate prior to adjustment for this specific match, and MatchPrice is passed as the attempted match price. Processing continues at step 711 on FIG. 7B linked by MISOP1.

In step 707, no additional matches can be made between the order SELLORDER and any buy order in the resting order book. The function CompleteInboundOrderHandling( ) is called to determine how to end the process of handling of the order SELLORDER as an inbound order. (see FIG. 19) After the function CompleteInboundOrderHandling( ) is called, matching of the order SELLORDER is complete.

In step 711, the match-specific FRC rate (FRCRm) for each buy order with a WorkingPrice value equal to the PricePoint value must be determined. The function CalcMatchFRCRate( ) is called to set the FRCRm rate for each such order. (see FIG. 17) This function is called for each such order BUYORDER with the following parameters: BUYORDER is passed as the order, BUYORDER.FRCRro is passed as BUYORDER's FRC rate prior to adjustment for this specific match, and MatchPrice is passed as the attempted match price.

Processing continues at step 712, wherein the contingent order matching system (COMS) must now select from among each such order BUYORDER, those orders where the FRC rates for the order BUYORDER and the order SELLORDER permit a match to be made. This is done by selecting into ProratedBuyOrders only those orders where the sum of BUYORDER's FRCRm value and SELLORDER's FRCRm value is greater than or equal to the minimum matching rate (MMR) for this product. Each buy order in ProratedBuyOrders meets all requirements to be matched against the order SELLORDER. Processing continues at step 713.

In step 713, the contingent order matching system (COMS) now determines AggregateBuyQty—the aggregate quantity available to match in ProratedBuyOrders. Processing continues at step 721. In step 721, if AggregateBuyQty—the aggregate quantity available to match in ProratedBuyOrders—is greater than the unexecuted balance of the order SELLORDER which remains to be matched, then a proration of the unexecuted balance of the order SELLORDER among the orders in ProratedBuyOrders is required, and processing continues at step 722. Otherwise, every order in ProratedBuyOrders will be completely matched against the order SELLORDER, and processing continues at step 723.

In step 722, the function Prorate(SELLORDER, ProratedBuyOrders, MatchPrice) is called to perform the proration using whatever proration technique the order matching entity (OME) currently uses. The proration method implemented in this function is known in the industry and is not described in further detail here. Because the available size to match in ProratedBuyOrders exceeds the unexecuted balance of the order SELLORDER, the function Prorate( ) will complete the matching of the order SELLORDER. Processing continues at step 731.

In step 723, because all orders in ProratedBuyOrders will be completed as they are matched with the order SELLORDER, the matching at the current PricePoint value can proceed in any sequence without changing the outcome. The function AttemptToMatchTwoOrders(SELLORDER, BUYORDER, MatchPrice) is guaranteed to result in a match between the order SELLORDER and each buy order in ProratedBuyOrders because the condition tested at step 1801 in FIG. 18 is assured to be true because of the selection criteria of step 712. When all orders in ProratedBuyOrders have been matched, processing continues at step 724. In step 724, the action in step 723 may have fully matched the unexecuted balance of the order SELLORDER. Alternatively, the order SELLORDER may still have an unexecuted balance to attempt to match. If the order SELLORDER has been fully executed, processing continues at step 731; otherwise the order SELLORDER continues to have an unexecuted balance, and processing continues at step 725.

In step 725, if there are no more unexecuted buy orders in the resting order book, then no additional matching is possible, and processing continues at step 731. Otherwise, additional matching may be possible, and processing continues at step 726. In step 726, if the value SELLORDER's WorkingPrice equals the value PricePoint, then the contingent order matching system (COMS) has already attempted to match the order SELLORDER at the lowest price which SELLORDER may be matched. If this is the case, then no additional matches are possible, and processing continues at step 731. Otherwise processing continues at step 702 on FIG. 7A linked by MISOP0.

In step 731, the function CompleteInboundOrderHandling( ) is called to complete the handling of the order SELLORDER as an inbound order. This is the last step in attempting to match a sell order using the prorated priority system.

Figure 8A:
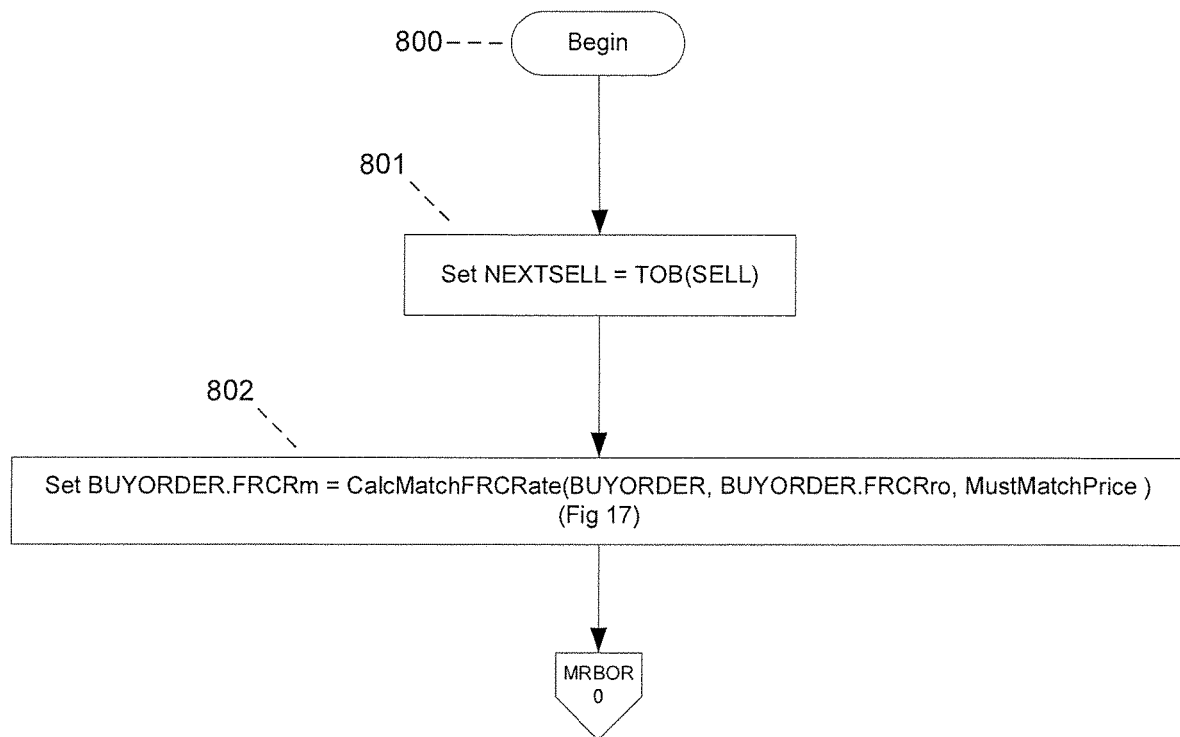
FIGS. 8A and 8B are flowcharts showing attempting to match a resting buy order in a product using a ranked priority system. The associated function is called MatchInboundBuyOrderRanked( ).
Figure 8B:
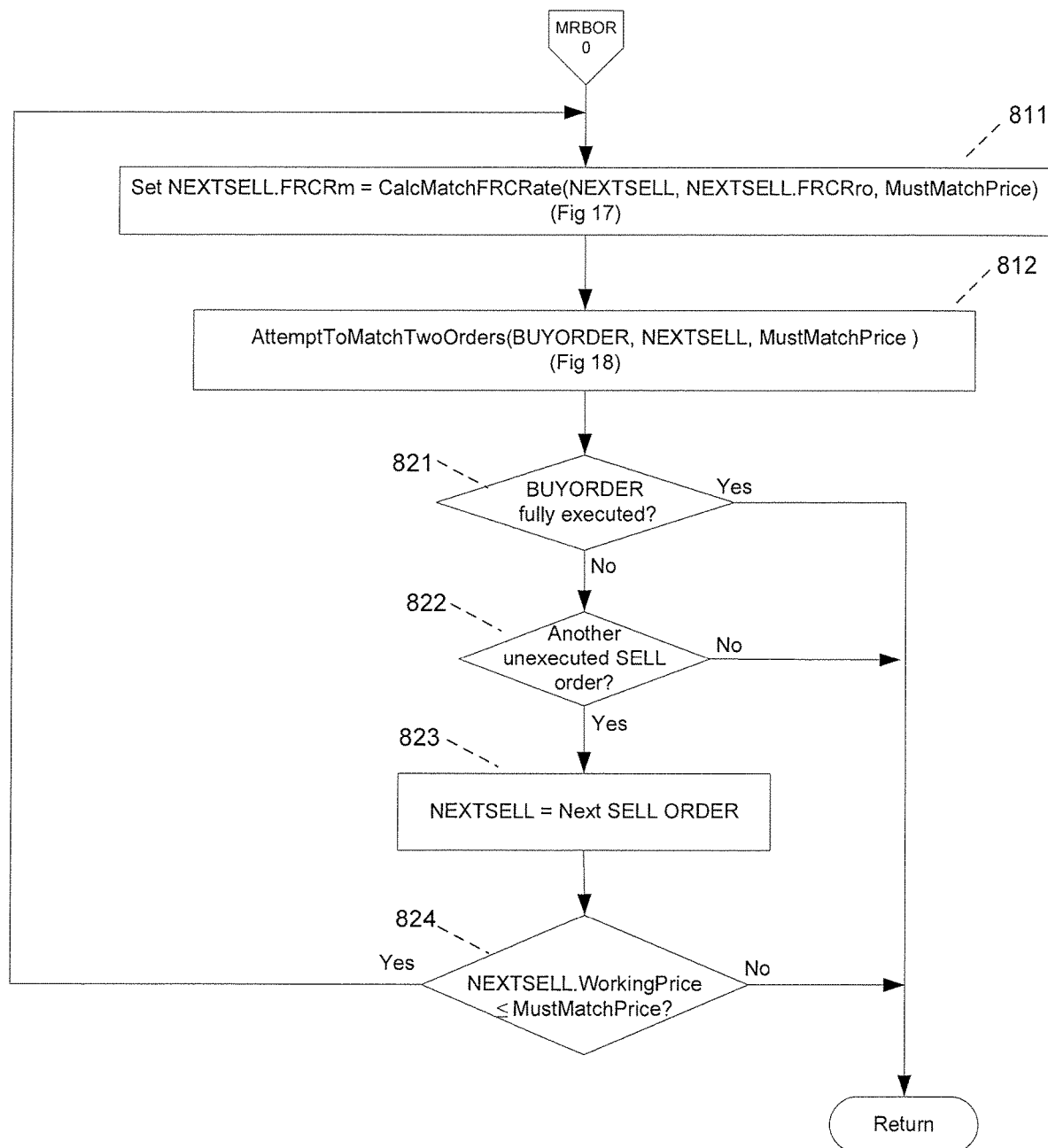

With reference to FIGS. 8A and 8B, a flowchart shows how the matching system attempts to match a resting buy order after a quote change in a product where matching is done using a ranked priority method. In step 800, processing begins. Two parameters are passed to the function MatchRestingBuyOrderRanked( ) the buy order (BUYORDER) and the only price at which a match should be attempted (MustMatchPrice). Processing continues at step 801. In step 801, the order NEXTSELL is set to the highest ranked (TOB means "Top of Book") sell order in the resting order book—TOB(SELL), and processing continues at step 802.

At step 802 in the matching process, the contingent order matching system (COMS) has already determined that the order BUYORDER and the order NEXTSELL have WorkingPrice values which are compatible for a match at the MustMatchPrice value at step 1303 (see FIG. 13). Now the contingent order matching system (COMS) must determine whether the fee/rebate contingency (FRC) rates of these orders (or possibly BUYORDER and additional sell orders with the same value for WorkingPrice)—if matched at the MustMatchPrice value—permit a match to be completed. The match-specific FRC rate (FRCRm) for the order BUYORDER must be determined. The function CalcMatchFRCRate( ) is called to set the value of the matching rate FRCRm for the order BUYORDER. (see FIG. 17) It is called with three parameters: BUYORDER is passed as the order, BUYORDER.FRCRro is passed as BUYORDER's FRC rate prior to adjustment for this specific match, and MustMatchPrice is passed as the attempted match price. Processing continues at step 811 on FIG. 8B linked by MRBOR0.

In step 811, the match-specific FRC rate (FRCRm) for the order NEXTSELL must be determined. The function CalcMatchFRCRate( ) is called to set the Match FRC rate for the order NEXTSELL. (see FIG. 17) It is called with the following parameters: NEXTSELL is passed as the order, NEXTSELL.FRCRro is passed as NEXTSELL's FRC rate prior to adjustment for this specific match, and MustMatchPrice is passed as the attempted match price. Processing continues at step 812.

In step 812, the function AttemptToMatchTwoOrders( ) is called to determine whether the orders BUYORDER and NEXTSELL can be matched. If they can be matched, the function AttemptToMatchTwoOrders( ) executes the match. (see FIG. 18) The function AttemptToMatchTwoOrders( ) is called with three parameters: BUYORDER is passed as the resting buy order to attempt to match, NEXTSELL is passed as the resting sell order to attempt to match, and MustMatchPrice is passed as the attempted match price. Since the contingent order matching system (COMS) causes an unmatchable order NEXTSELL in the resting order book to temporarily yield priority if it cannot be matched, the remaining portion of this flowchart does not depend on whether a match takes place. Simply moving on to the next sell order, if any, results in this behavior. Processing continues at step 821.

In step 821, if the order BUYORDER has been fully executed, processing is complete. Otherwise the contingent order matching system (COMS) attempts to execute the unexecuted balance of the order BUYORDER as processing continues at step 822. In step 822, if there is another unexecuted sell order in the resting order book, processing continues at the step 823. Otherwise no match is possible, and processing is complete. In step 823, there is another sell order in the resting order book to attempt to match with the order BUYORDER. The order NEXTSELL is set to reference the next order, and processing continues at step 824. In step 824, if NEXTSELL's WorkingPrice value is less than or equal to the MustMatchPrice value, then additional matches are possible, and processing continues at step 811. Otherwise no additional matches are possible at the MustMatchPrice value, and processing is complete.

Figure 9A:
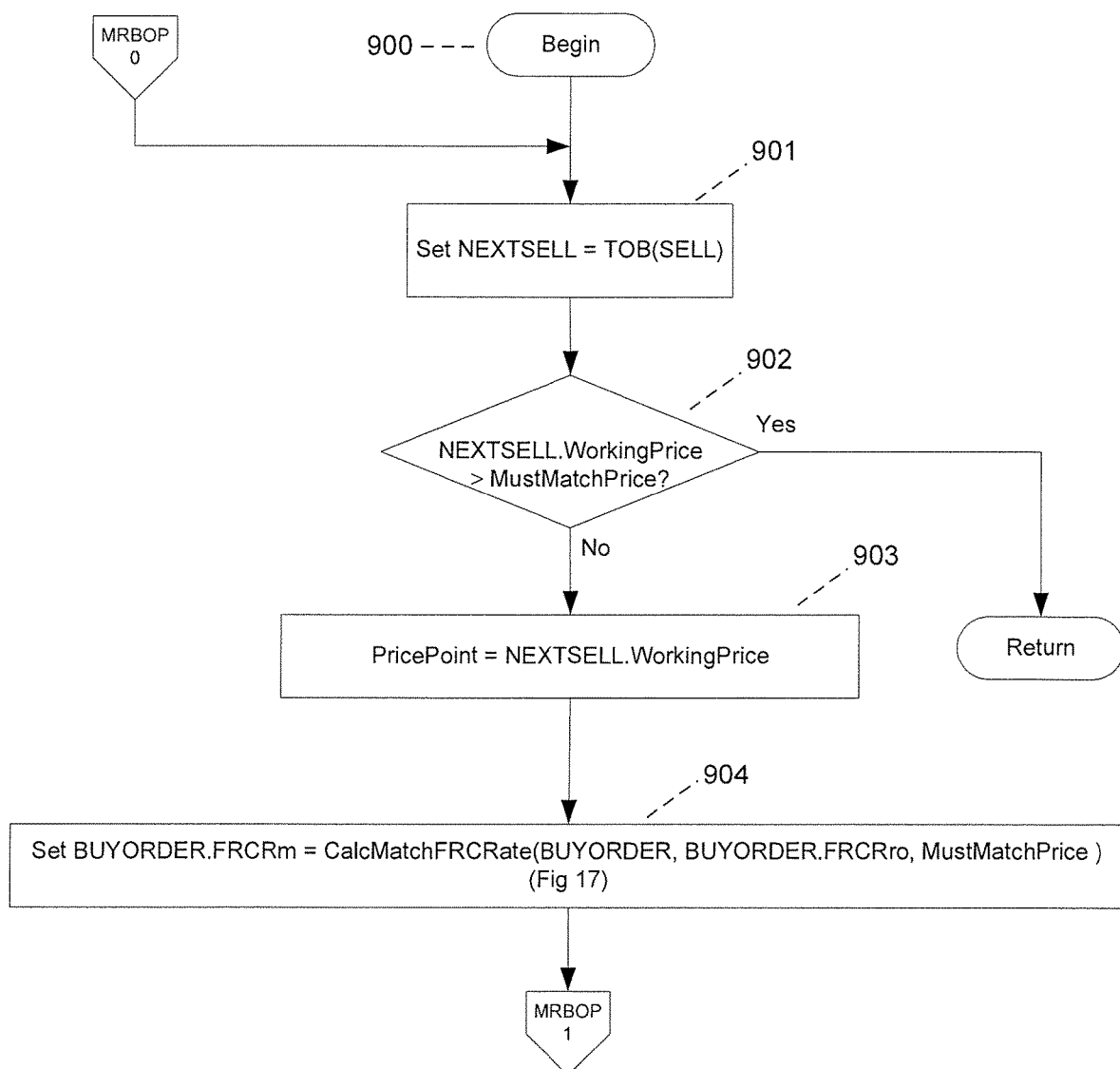
FIGS. 9A and 9B are flowcharts showing attempting to match a resting buy order in a product using a prorated priority system. The associated function is called MatchInboundBuyOrderProrate( ).
Figure 9B:
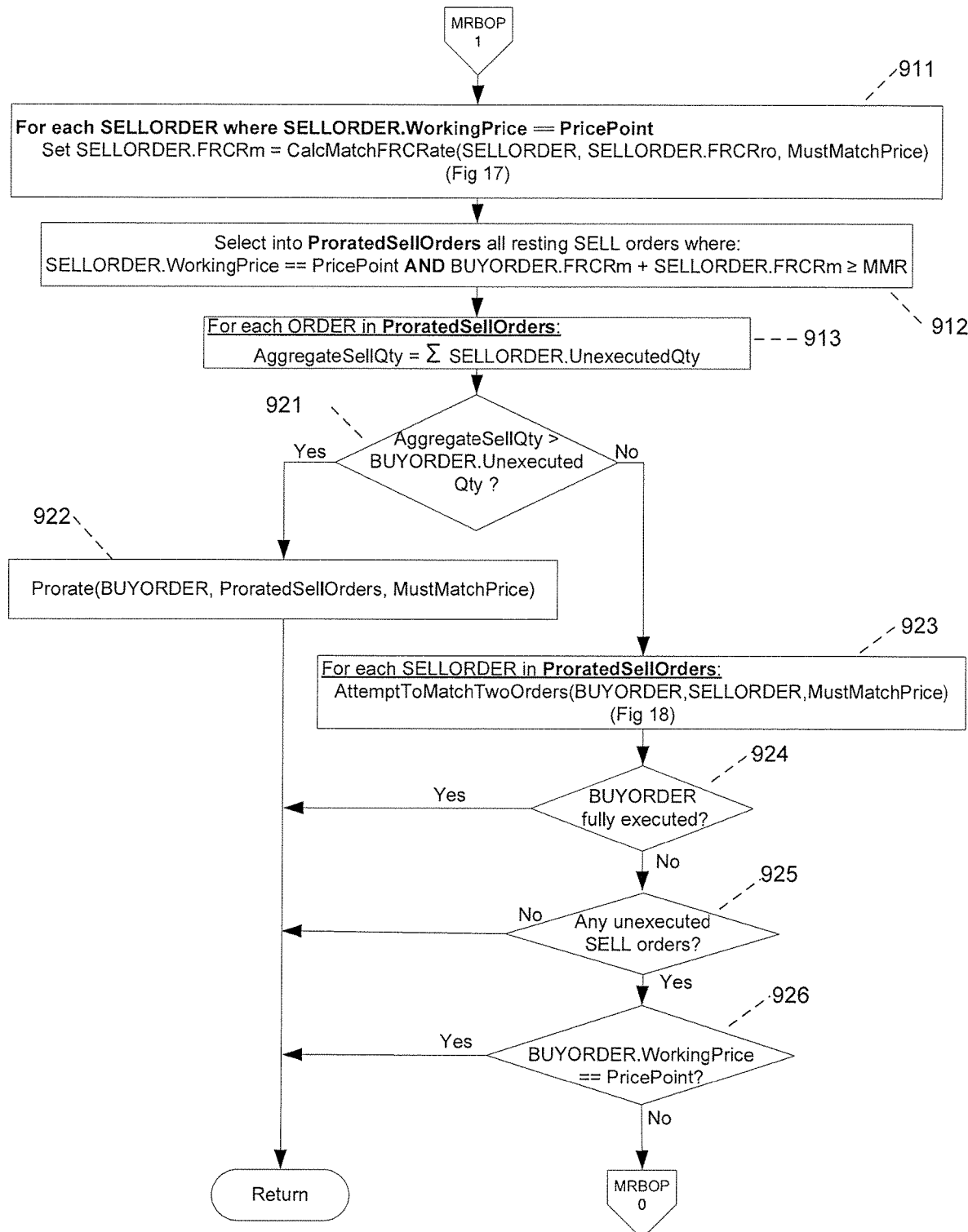

FIGS. 9A and 9B comprise a flowchart showing how the matching system attempts to match a resting buy order after a quote change in a product where matching is done using a prorated priority system. In step 900, processing begins. Two parameters are passed to the function MatchRestingBuyOrderProrate( ) the buy order (BUYORDER) and the only price at which a match should be attempted (MustMatchPrice). Processing continues at step 901. In step 901, the order NEXTSELL is set to the highest ranked (TOB means "Top of Book") sell order in the resting order book—TOB(SELL), and processing continues at step 902. In step 902, if the value NEXTSELL.WorkingPrice is greater than the value MustMatchPrice, then no match is possible, and processing is complete. Otherwise processing continues at step 903. In step 903, the value PricePoint is set to the value NEXTSELL's WorkingPrice. Processing continues at step 904.

At step 904 in the matching process, the contingent order matching system (COMS) has determined that the orders BUYORDER and NEXTSELL have WorkingPrice values which are compatible for a match. Now COMS must determine whether the fee/rebate contingency (FRC) rates of these orders—matched at the value MustMatchPrice—permit a match to be completed. The match-specific FRC rate (FRCRm) for the order BUYORDER must be determined. The function CalcMatchFRCRate( ) is called to set FRCRm for the order BUYORDER. (see FIG. 17) It is called with three parameters: BUYORDER is passed as the order, BUYORDER.FRCRro is passed as BUYORDER's FRC rate prior to adjustment for this specific match, and MustMatchPrice is passed as the attempted match price. Processing continues at step 911 on FIG. 9B linked by MRBOP1.

In step 911, the match-specific FRC rate (FRCRm) for each sell order with a WorkingPrice value equal to the PricePoint value must be determined. The function CalcMatchFRCRate( ) is called to set the Match FRC rate for each such order. (see FIG. 17) It is called for each such SELLORDER with the following parameters: SELLORDER is passed as the order, SELLORDER.FRCRro is passed as SELLORDER's FRC rate prior to adjustment for this specific match, and MustMatchPrice is passed as the attempted match price. Processing continues at step 912.

In step 912, the contingent order matching system (COMS) must now select from among each such SELLORDER, those orders where the FRC rates for the order BUYORDER and the selected sell orders permit a match to be made. This is done by selecting into ProratedSellOrders only those orders where the sum of BUYORDER's FRCRm value and SELLORDER's FRCRm value is greater than or equal to the minimum matching rate (MMR) for this product. Each sell order in ProratedSellOrders meets all requirements to be matched against the order BUYORDER. Processing continues at step 913.

In step 913, the contingent order matching system (COMS) now determines AggregateSellQty—the aggregate quantity available to match in ProratedSellOrders. Processing continues at step 921. In step 921, if AggregateSellQty is greater than the unexecuted balance of the order BUYORDER which remains to be matched, then a proration of the unexecuted balance of the order BUYORDER among the orders in ProratedSellOrders is required, and processing continues at step 922. Otherwise, every order in ProratedSellOrders will be matched against the order BUYORDER, and processing continues at step 923. In step 922, the function Prorate(BUYORDER, ProratedSellOrders, MustMatchPrice) is called to perform the proration using whatever proration technique the order matching entity (OME) currently uses. The proration method implemented by this function is outside the scope of the present invention. Because the available size to match in ProratedSellOrders exceeds the unexecuted balance of the order BUYORDER, this will complete the matching of the order BUYORDER. Processing is complete.

In step 923, because all orders in ProratedSellOrders will be completed as they are matched with the order BUYORDER, the matching at the current MustMatchPrice can proceed in any sequence without changing the outcome. The function AttemptToMatchTwoOrders(BUYORDER, SELLORDER, MustMatchPrice) is guaranteed to result in a match because the condition tested in at step 1801 in FIG. 18 is assured to be true because of the selection criteria of step 912. When all orders in ProratedSellOrders have been matched, processing continues at step 924.

With reference to step 924, the action in step 923 may have fully matched the unexecuted balance of the order BUYORDER. Alternatively, the order BUYORDER may still have an unexecuted balance to attempt to match. If the order BUYORDER has been fully executed, processing is complete. Otherwise the order BUYORDER continues to have an unexecuted balance, and processing continues at step 925. In step 925, if there are no more unexecuted sell orders in the resting order book, then no additional matching is possible, and processing is complete. Otherwise, additional matching may be possible, and processing continues at step 926. In step 926, if the value BUYORDER's WorkingPrice equals the PricePoint value, then the contingent order matching system (COMS) has already attempted to match the order BUYORDER with all sell orders in the resting order book which have a WorkingPrice value equal to PricePoint. (see step 903) If step 926 is true, then the contingent order matching system (COMS) has attempted to match BUYORDER at the highest price which BUYORDER can currently pay (MustMatchPrice), attempting to match BUYORDER against sell orders with a higher value of WorkingPrice must fail. Therefore, if this is the case, then no additional matches are possible. Otherwise processing continues at step 901 on FIG. 9A linked by MRBOP0.

Figure 10A:
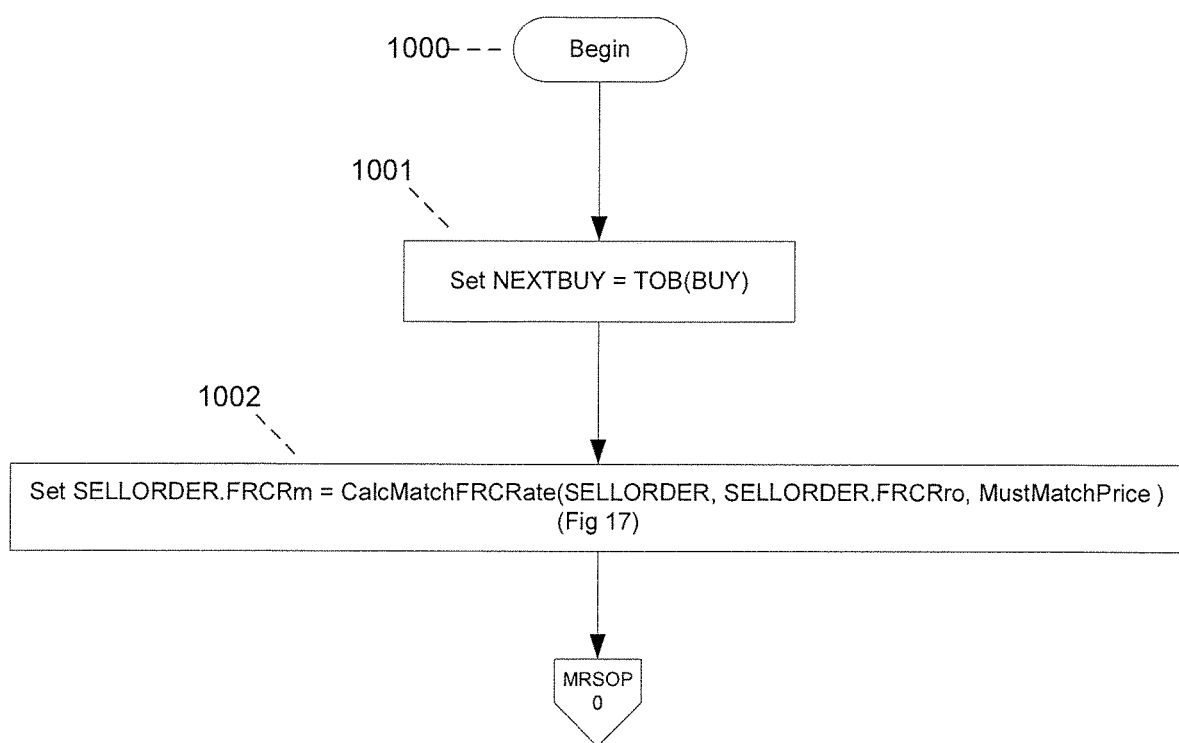
FIGS. 10A and 10B are flowcharts showing attempting to match a resting sell order in a product using a ranked priority system. The associated function is called MatchInboundSellOrderRanked( ).
Figure 10B:
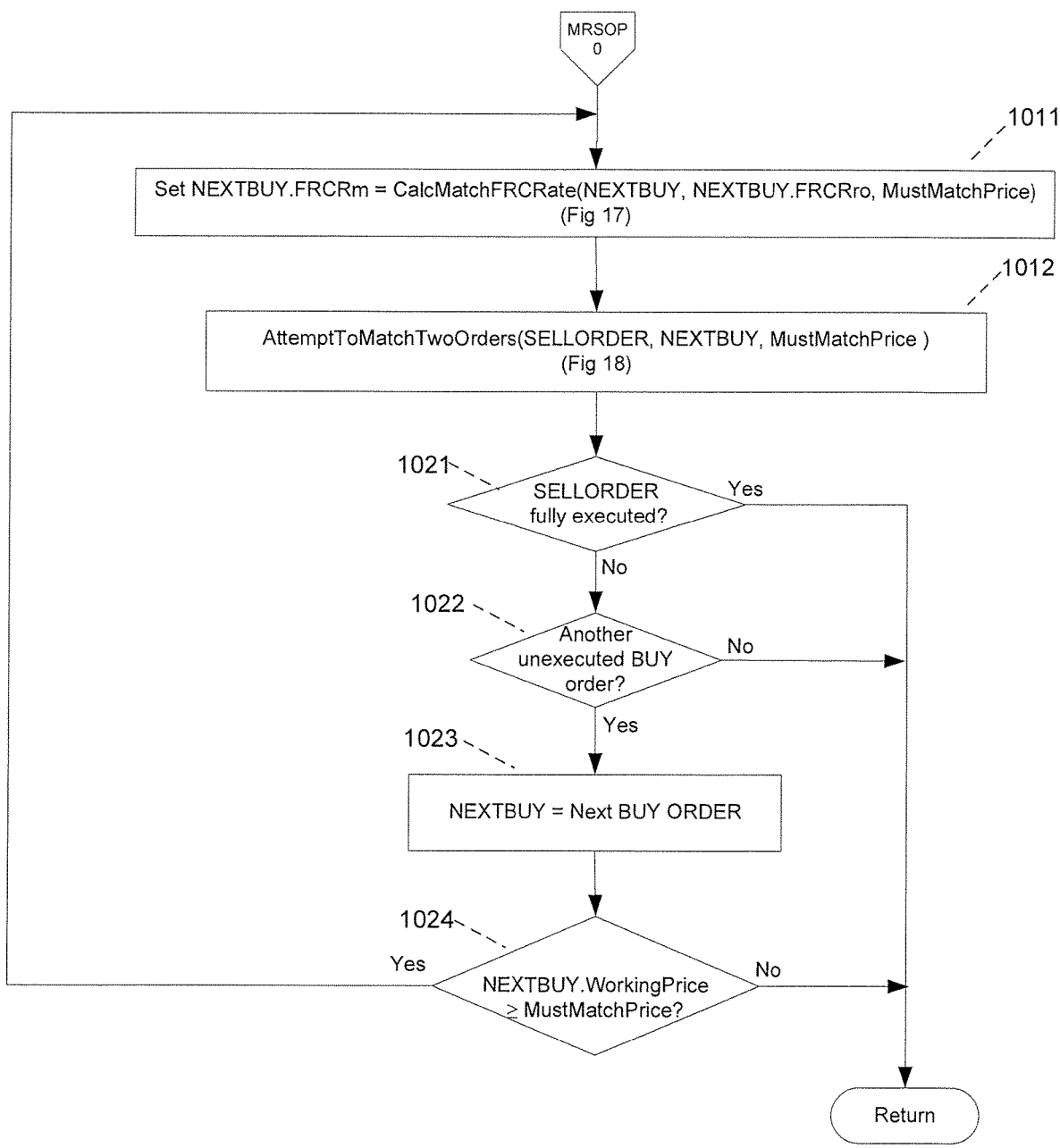

As shown in FIGS. 10A and 10B, a flowchart showing how the matching system attempts to match a resting sell order after a quote change in a product where matching is done using a ranked priority system. In step 1000, processing begins. Two parameters are passed to the function MatchRestingSellOrderRanked( ) the sell order (SELLORDER) and the only price at which a match should be attempted (MustMatchPrice). Processing continues at step 1001. In step 1001, the order NEXTBUY is set to the highest ranked (TOB means "Top of Book") buy order in the resting order book—TOB(BUY), and processing continues at step 1002.

At step 1002 in the matching process, the contingent order matching system (COMS) has already determined that the order SELLORDER and the order NEXTBUY have WorkingPrice values which are compatible for a match at the MustMatchPrice value at step 1303 (see FIG. 13). Now the contingent order matching system (COMS) must determine whether the fee/rebate contingency (FRC) rates of these orders (or possibly SELLORDER and additional buy orders with the same value for WorkingPrice)—if matched at the MustMatchPrice value permit a match to be completed. The match-specific FRC rate (FRCRm) for the order SELLORDER must be determined. The function CalcMatchFRCRate( ) is called to set FRCRm for the order SELLORDER. It is called with three parameters: SELLORDER is passed as the order, SELLORDER.FRCRro is passed as SELLORDER's FRC rate prior to adjustment for this specific match, and MustMatchPrice is passed as the attempted match price. Processing continues at the step 1011 on FIG. 10B linked by MRSOP0.

In step 1011, the match-specific FRC rate (FRCRm) for the order NEXTBUY must be determined. The function CalcMatchFRCRate( ) is called to set the Match FRC rate value for the order NEXTBUY. (see FIG. 17) It is called with the following parameters: NEXTBUY is passed as the order, NEXTBUY.FRCRro is passed as NEXTBUY's FRC rate prior to adjustment for this specific match, and MustMatchPrice is passed as the attempted match price. Processing continues at step 1012.

In step 1012, the function AttemptToMatchTwoOrders( ) is called to determine whether the orders SELLORDER and NEXTBUY can be matched. If they can be matched, the function AttemptToMatchTwoOrders( ) executes the match. (see FIG. 18) The function AttemptToMatchTwoOrders( ) is called with three parameters: The order SELLORDER is passed as the resting sell order to attempt to match, the order NEXTBUY is passed as the resting buy order to attempt to match, and MustMatchPrice is passed as the attempted match price. Since the contingent order matching system (COMS) causes an unmatchable NEXTBUY order in the resting order book to temporarily yield priority if it cannot be matched, the remaining portion of this flowchart does not depend on whether a match takes place. Simply moving on to the next buy order, if any, results in this behavior. Processing continues at step 1021.

In step 1021, if the order SELLORDER has been fully executed, processing is complete. Otherwise the contingent order matching system (COMS) attempts to execute the unexecuted balance of the order SELLORDER as processing continues at step 1022. In step 1022, if there is another unexecuted buy order in the resting order book, processing continues at step 1023; otherwise no match is possible and processing is complete.

In step 1023, there is another buy order in the resting order book to attempt to match with the order SELLORDER. The order NEXTBUY is set to reference that order, and processing continues at step 1024. In step 1024, if the value NEXTBUY's WorkingPrice is greater than or equal to the MustMatchPrice value, then processing continues at step 1011. Otherwise no match is possible at the MustMatchPrice value, and processing is complete.

Figure 11A:
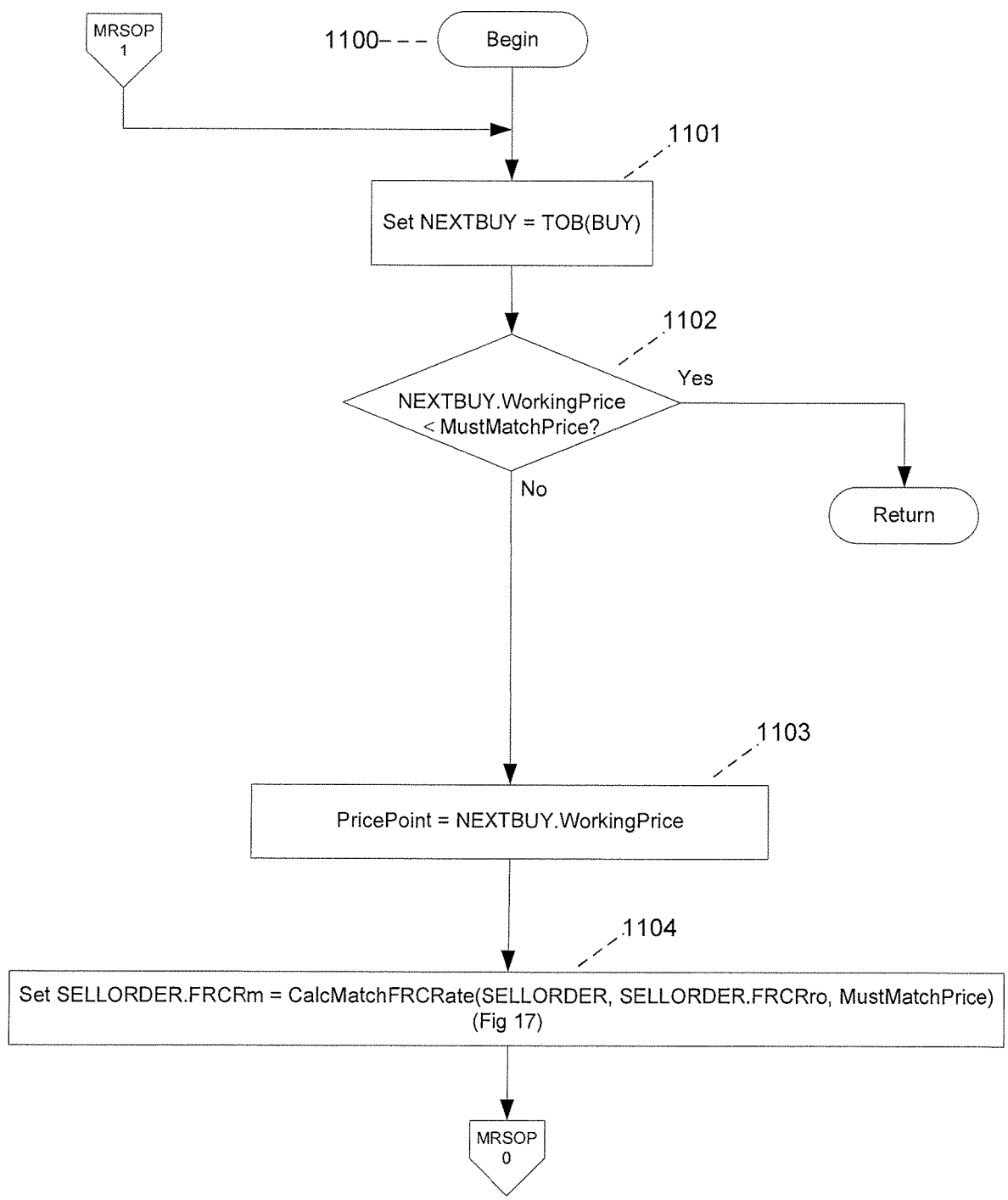
FIGS. 11A and 11B are flowcharts showing attempting to match a resting sell order in a product using a prorated priority system. The associated function is called MatchInboundSellOrderProrate( ).
Figure 11B:
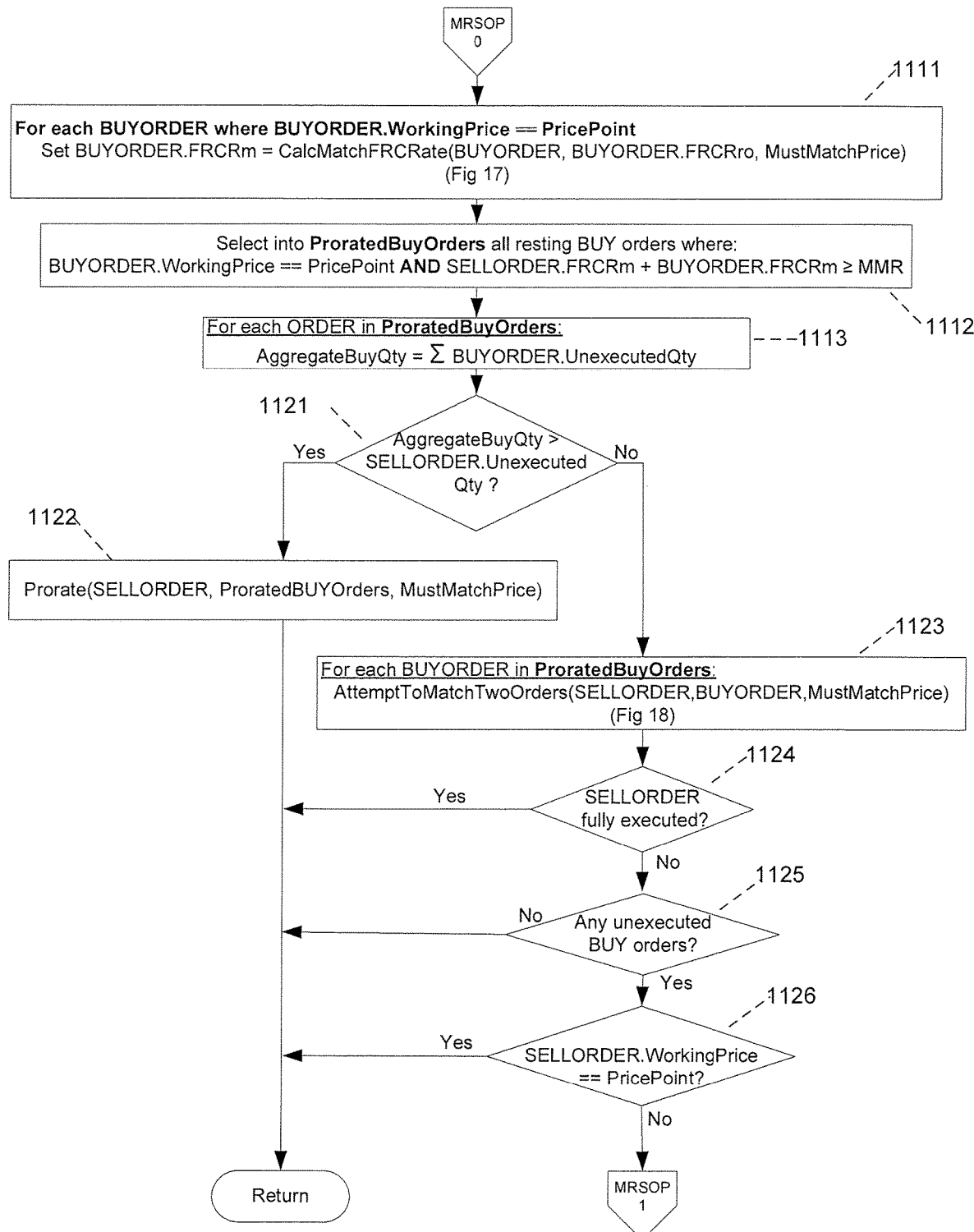

In FIGS. 11A and 11B is a flowchart showing how the matching system attempts to match a resting sell order after a quote change in a product where matching is done using a prorated priority system. In step 1100, processing begins. One parameter is passed to the function MatchRestingSellOrderProrate( ) the sell order (SELLORDER) and the only price at which a match should be attempted (MustMatchPrice). Processing continues at step 1101. In step 1101, the order NEXTBUY is set to the highest ranked (TOB means "Top of Book") buy order in the resting order book—TOB (BUY), and processing continues at step 1102. In step 1102, if the value NEXTBUY's WorkingPrice is less than the MustMatchPrice value, then no match is possible at the MustMatchPrice value, and processing is complete. Otherwise processing continues at step 1103.

In step 1103, the value PricePoint is set to the value NEXTBUY's WorkingPrice, and processing continues at step 1104. At step 1104 in the matching process, the contingent order matching system (COMS) has determined that the orders SELLORDER and NEXTBUY have WorkingPrice values which are compatible for a match. Now COMS must determine whether the fee/rebate contingency (FRC) rates of these orders—if matched at the MatchPrice value—permit a match to be completed. The match-specific FRC rate (FRCRm) for the order SELLORDER must be determined. The function CalcMatchFRCRate( ) is called to set the value FRCRm for the SELLORDER order. (see FIG. 17) It is called with three parameters: SELLORDER is passed as the order, SELLORDER.FRCRro is passed as SELLORDER's FRC rate prior to adjustment for this specific match, and MatchPrice is passed as the attempted match price. Processing continues at step 1111 on FIG. 11B linked by MRSOP0.

In step 1111, the match-specific FRC rate (FRCRm) for each buy order with a WorkingPrice value equal to the PricePoint value must be determined. The function CalcMatchFRCRate( ) is called to set the FRCRm value for each such order. (see FIG. 17) It is called for each such BUYORDER order with the following parameters: BUYORDER is passed as the order, BUYORDER.FRCRo is passed as BUYORDER's FRC rate prior to adjustment for this specific match, and MatchPrice is passed as the attempted match price. Processing continues at step 1112.

In step 1112 COMS must now select from among each such BUYORDER, those orders where the FRC rates for SELLORDER and the selected buy orders permit a match to be made. This is done by selecting into ProratedBuyOrders only those orders where the sum of FRCRm BUYORDER's FRCRm value and SELLORDER's FRCRm value is greater than or equal to MMR for this product. Each buy order in ProratedBuyOrders meets all requirements to be matched against SELLORDER. Processing continues at step 1113.

In step 1113, the contingent order matching system (COMS) now determines the function AggregateBuyQty— the aggregate quantity available to match in ProratedBuyOrder. Processing continues at step 1121. In step 1121, if AggregateBuyQty—the aggregate quantity available to match in ProratedBuyOrder—is greater than the unexecuted balance of the order SELLORDER which remains to be matched, then a proration of the unexecuted balance of the order SELLORDER among the orders in ProratedBuyOrders is required, and processing continues at step 1122. Otherwise, every order in ProratedBuyOrders will be matched against the order SELLORDER, and processing continues at step 1123.

In step 1122, the function Prorate(SELLORDER, ProratedBuyOrders, MatchPrice) is called to perform the proration using whatever proration technique the order matching entity (OME) currently uses. The proration method implemented in this function is outside the scope of the present invention. Because the available size to match in the function ProratedBuyOrders exceeds the unexecuted balance of the order SELLORDER, the function Prorate( ) will complete the matching of the order SELLORDER. Processing is now complete.

At step 1123, because all orders in ProratedBuyOrders will be completed as they are matched with the order SELLORDER, the matching at the current MustMatchPrice value can proceed in any sequence without changing the outcome. The function AttemptToMatchTwoOrders(SELLORDER, BUYORDER, MustMatchPrice) is guaranteed to result in a match because the condition tested at step 1801 in FIG. 18 is assured to be true because of the selection criteria of step 1112. When all orders in ProratedBuyOrders have been matched, processing continues at step 1124.

With reference to step 1124, the action in step 1123 may have fully matched the unexecuted balance of the order SELLORDER. Alternatively, the order SELLORDER may still have an unexecuted balance to attempt to match. If the order SELLORDER has been fully executed, processing is complete. Otherwise the order SELLORDER continues to have an unexecuted balance, and processing continues at step 1125. In step 1125, if there are no more unexecuted buy orders in the resting order book, then no additional matching is possible, and processing is complete. Otherwise, additional matching may be possible, and processing continues at step 1126. In step 1126, if the value SELLORDER's WorkingPrice equals the PricePoint value, then the contingent order matching system (COMS) has already attempted to match the order SELLORDER with all buy orders in the resting order book which have a WorkingPrice value equal to PricePoint. (see step 1103) If step 1126 is true, then the contingent order matching system (COMS) has attempted to match SELLORDER at the lowest price which SELLORDER can currently accept (MustMatchPrice), attempting to match SELLORDER against buy orders with a lower value of WorkingPrice must fail. Therefore, if this is the case, then no additional matches are possible, and processing is complete. Otherwise processing continues at step 1102 on FIG. 11A linked by MRSOP1.

Figure 12A:
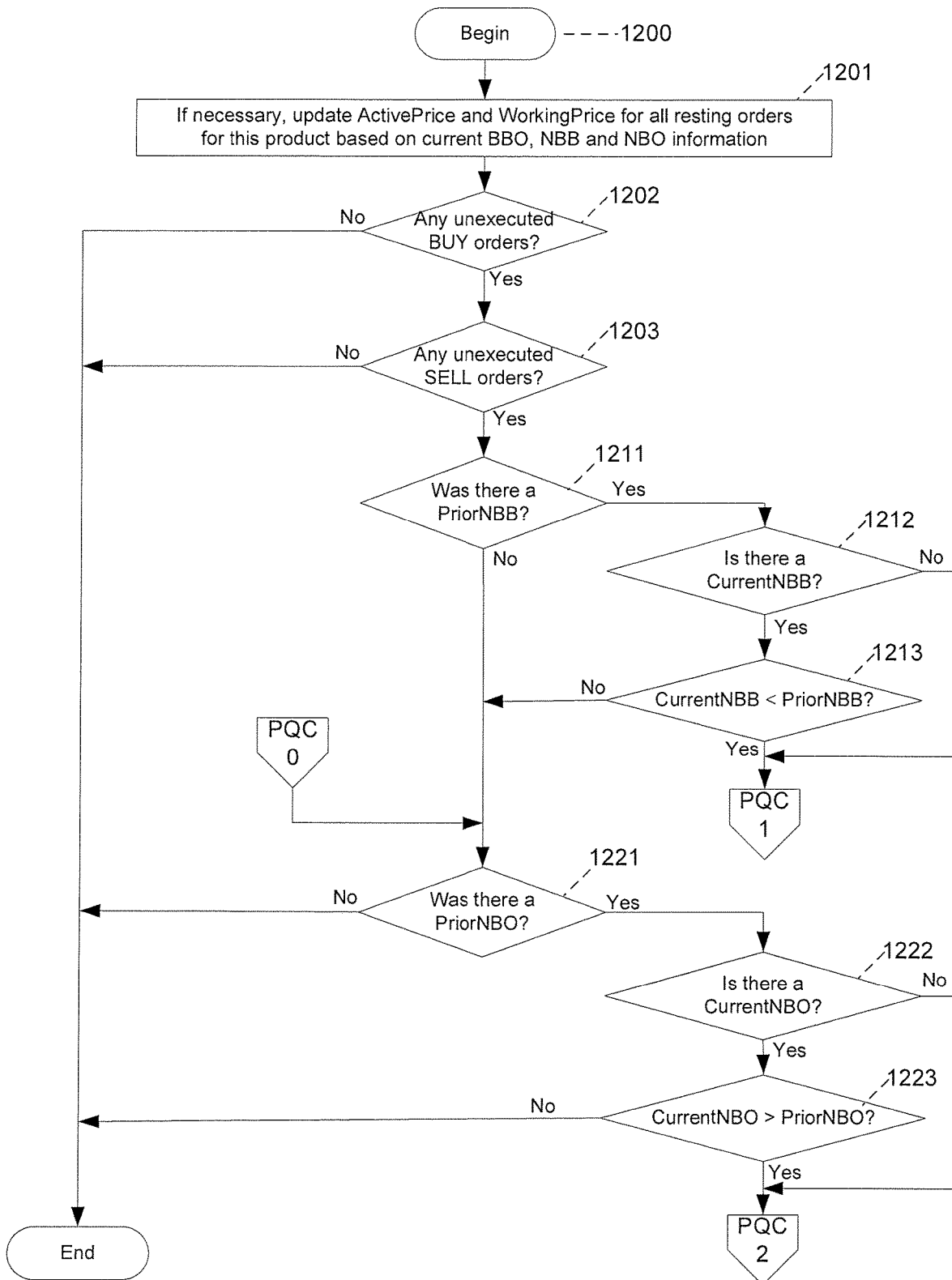
FIGS. 12A, 12B and 12C are flowcharts showing the handling of a change to the national best bid (NBB) or national best offer (NBO). The associated function is called ProcessQuoteChange( ).

Turning to FIG. 12A, a flowchart shows how the matching system handles changes in the BBO, NBB or NBO price. The contingent order matching system (COMS) permits an OME's resting order book to be locked or crossed at a price below the national best bid (NBB) or above the national best offer (NBO). This situation arises when matching a trade at a price that is below the NBB or above the NBO would create a trade-through violation of a protected quotation published by another marketplace. A drop in the national best bid (NBB) price, a rise in the national best offer (NBO) price, or if either the NBB or NBO ceases to exist may make it possible to match orders which were not previously matchable for this reason. Therefore, the contingent order matching system (COMS) must, in a preferred embodiment, look for possible matches each time one of these events occurs.

In step 1200, processing begins. The function ProcessQuoteChange( ) is not passed any parameters. Processing continues at step 1201. In step 1201, many OME's offer order types which are dynamically priced (i.e., the order's ActivePrice value is changed) based on changes in BBO, NBB, or NBO price. Changes in BBO, NBB or NBO price may also affect an order's WorkingPrice value. Order types which are dynamically priced are part of the current state of the art and are not changed by the contingent order matching system (COMS). However, COMS must respond to changes in an order's ActivePrice or WorkingPrice values which result from changes BBO, NBB, or NBO price. At step 1201, all such changes are made to ActivePrice and WorkingPrice values prior to any activities which are specific to the contingent order matching system (COMS). The changes made may not be altered until the function ProcessQuoteChange( ) and all functions called from it are complete. The values of the current and immediately prior (different) values of NBB and NBO (CurrentNBB, PriorNBB, CurrentNBO, and PriorNBO) are used to manage this process. Processing continues at step 1202.

In step 1202, if there are no buy orders in the resting order book, then no match is possible, and processing is complete. Otherwise processing continues at step 1203. In step 1203, if there are no sell orders in the resting order book, then no match is possible, processing is complete. Otherwise processing continues at step 1211.

Many products never have a national best bid (NBB) or national best offer (NBO). This would be the case for products which are not traded in another market (e.g., most futures contracts). Other products may generally have an NBB and NBO, but one or both may not be present at a given time. If a product never has an NBB (or NBO) or if the NBB (or the NBO) is not present at the moment, the value of the NBB (or the NBO) is undefined and should not constrain matching orders. At step 1211, the matching system tests whether a price exists for the immediately prior national best bid NBB (PriorNBB). If a PriorNBB price exists, processing continues at step 1212 to determine whether the NBB has changed in a manner which would require attempting to match orders. Otherwise no PriorNBB value exists, therefore the NBB value cannot have dropped in price permitting additional orders to be matched, and processing continues at step 1221.

In step 1212, a PriorNBB value exists. If there is a price for the current national best bid (CurrentNBB), processing continues at step 1213. Otherwise the lack of a current NBB price may have created the possibility for the contingent order matching system (COMS) to match resting orders, and processing continues at step 1231 on FIG. 12B linked though PQC1.

With respect to step 1213, prices exist for both the current national best bid (CurrentNBB) and the immediately prior national best bid (PriorNBB). If the CurrentNBB is less than the PriorNBB (i.e., the NBB price has dropped), the contingent order matching system (COMS) must check to see if the drop in the NBB price permits two or more resting orders to be matched, and processing continues at step 1231 on FIG. 12B connected by link PCQ1. Otherwise a change in the national best bid (NBB) price does not permit any resting orders to be matched, and processing continues at step 1221.

In step 1221, the contingent order matching system (COMS) now tests whether a price exists for the immediately prior national best offer price (PriorNBO). If a PriorNBO price exists, processing continues at step 1222 to determine whether the NBO has changed in a manner which would require attempting to match orders. Otherwise, no PriorNBO value exists, therefore the NBO value cannot have increased in price permitting additional orders to be matched, and the function ProcessQuoteChange( ) is done.

In step 1222, an immediately prior national best offer (PriorNBO) price exists. If there is price for the current national best offer (CurrentNBO), processing continues at step 1223. Otherwise the lack of a current national best offer (NBO) may have created the possibility for the contingent order matching system (COMS) to match resting orders, and processing continues at step 1261 on FIG. 12C linked though PQC2.

As the process reaches step 1223, prices exist for both the current national best offer (CurrentNBO) and the immediately prior national best offer (PriorNBO). If the CurrentNBO is greater than the PriorNBO (i.e., the NBO price has increased), the contingent order matching system (COMS) must check to see if the increase in the national best offer (NBO) price permits two or more resting orders to be matched, and processing continues at step 1261 on FIG. 12C linked though PQC2. Otherwise a change in the national best offer (NBO) price does not permit any resting orders to be matched, the function ProcessQuoteChange( ) is done.

Figure 12B:
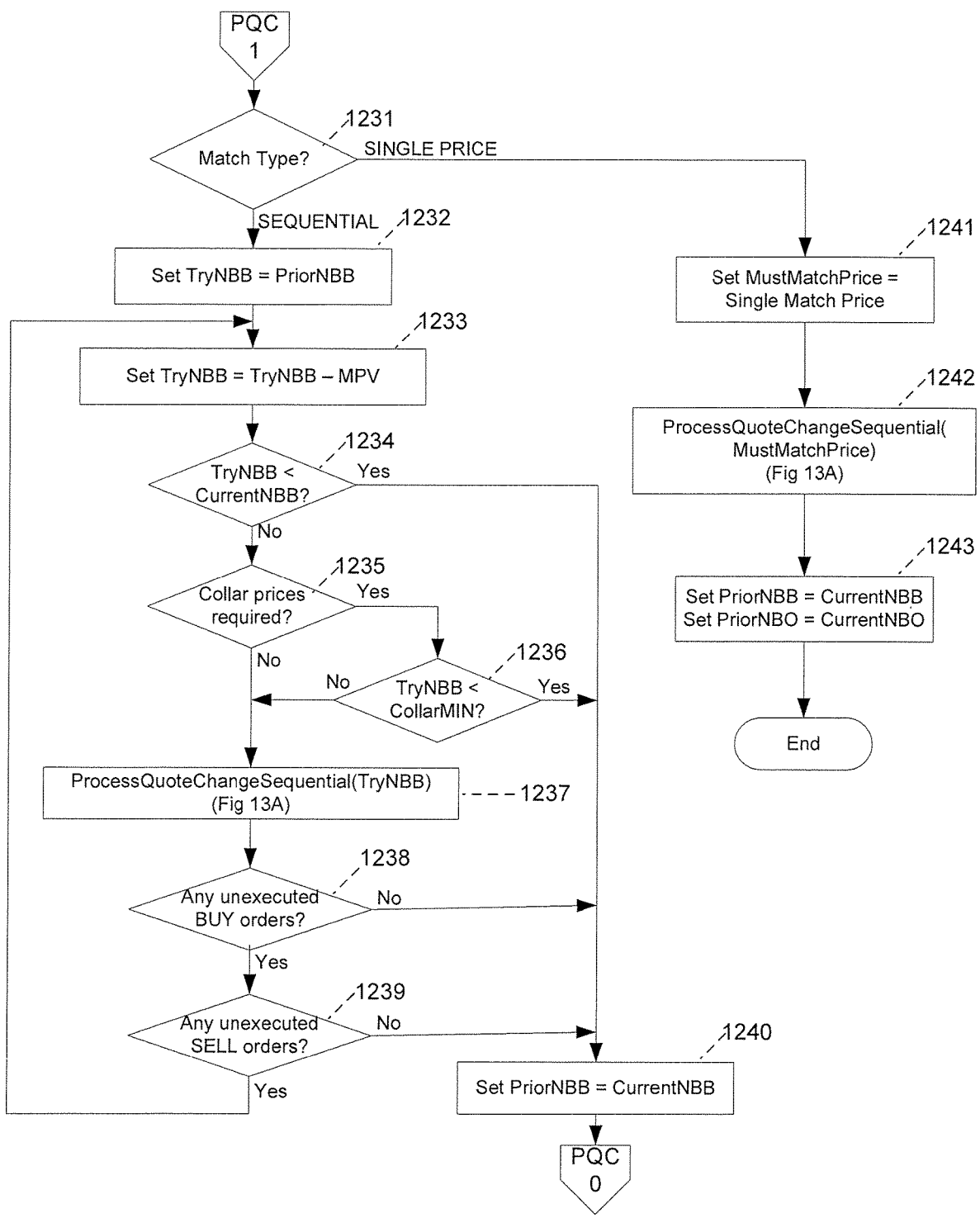

Starting at step 1231, as shown in FIG. 12B, a flowchart shows how the matching system handles a drop in the national best bid (NBB) price. When matching of resting orders may have become possible due solely to a drop in the national best bid (NBB) price, the contingent order matching system (COMS) permits two different ways to look for resting orders to match. Single price match—The single price match method attempts to match resting orders at a single price which is a price which must be greater than or equal to the current national best bid price (CurrentNBB)—if a national best bid (NBB) price currently exists. Sequential price match—The sequential price match method attempts to match resting orders at progressively lower prices (TryNBB) down to and including the current national best bid price (CurrentNBB) or a price collar, if one exists. Initially the variable TryNBB is set equal to the immediately prior national best bid price (PriorNBB) minus one MPV (the minimum price variation permitted for the product). The contingent order matching system (COMS) attempts to match resting orders at a Match Price of the variable TryNBB. Then the contingent order matching system (COMS) decrements the value of the variable TryNBB by the minimum price variation (MPV) and tries again. This process continues until the variable TryNBB is less than the CurrentNBB (the price at which a match would not be permitted) or less than the current minimal collar price, if one exists. This completes attempts at a sequential match resulting from a drop in the national best bid (NBB) price.

If this product uses a single price match method, processing continues at step 1241. Otherwise this product uses a sequential price match and processing continues at step 1232. In step 1232, the variable TryNBB is initialized to the prior national best bid price (PriorNBB). No resting orders can be matched at the PriorNBB. If such a match were possible, it would have already been made. Processing continues at step 1233. In step 1233, the variable TryNBB is decremented by one MPV, the minimum price variation for this product. Processing continues at step 1234. In step 1234, if the variable TryNBB is less than the current national best bid price (CurrentNBB), then no additional matches are possible, and processing continues at step 1240. Otherwise additional matches are possible, and processing continues at step 1235.

In step 1235, if limit prices or collar prices are required, then processing continues at step 1236; otherwise processing continues at step 1237. In step 1236, if the variable TryNBB is less than the lowest permitted matching price (CollarMIN), no remaining resting orders may be matched, and processing continues at step 1240. Otherwise processing continues at step 1237. In step 1237, the function ProcessQuoteChangeSequential(TryNBB) is called to match all matchable resting orders at a MustMatchPrice of the variable TryNBB. (see FIG. 13) When control returns to the function ProcessQuoteChange( ) processing continues at step 1238. In step 1238, if there are no buy orders in the resting order book, processing continues at step 1240. Otherwise processing continues at step 1239. In step 1239, if there are no sell orders in the resting order book, processing continues at step 1240. Otherwise, processing continues at step 1233 to attempt matches at the next value of the variable TryNBB in the sequence.

In step 1240, no additional matches are possible. The price PriorNBB is set to equal the price CurrentNBB. Processing continues at step 1221 as shown on FIG. 12A using link PQC0 to determine whether a change to the national best offer NBO may require matching resting orders. In step 1241, the order matching entity (OME) determines the appropriate price for a single price match using its existing state of the art method. The contingent order matching system (COMS) then sets MustMatchPrice equal to that single match price. Processing continues at step 1242. In step 1242, the function ProcessQuoteChangeSequential(MustMatchPrice) is called to effect all possible matches at the MustMatchPrice value. (see FIG. 13) Processing continues at step 1243.

In step 1243, the immediately prior national best bid (PriorNBB) is set equal to the current national best bid (CurrentNBB). The prior national best offer (PriorNBO) is set equal to the current national best offer (CurrentNBO). Because a single price match process handles changes in both the NBB and NBO prices, any matches resulting from a change to either NBB or NBO have been completed, and processing of any change to either the NBB, the NBO, or both is complete.

Figure 12C:
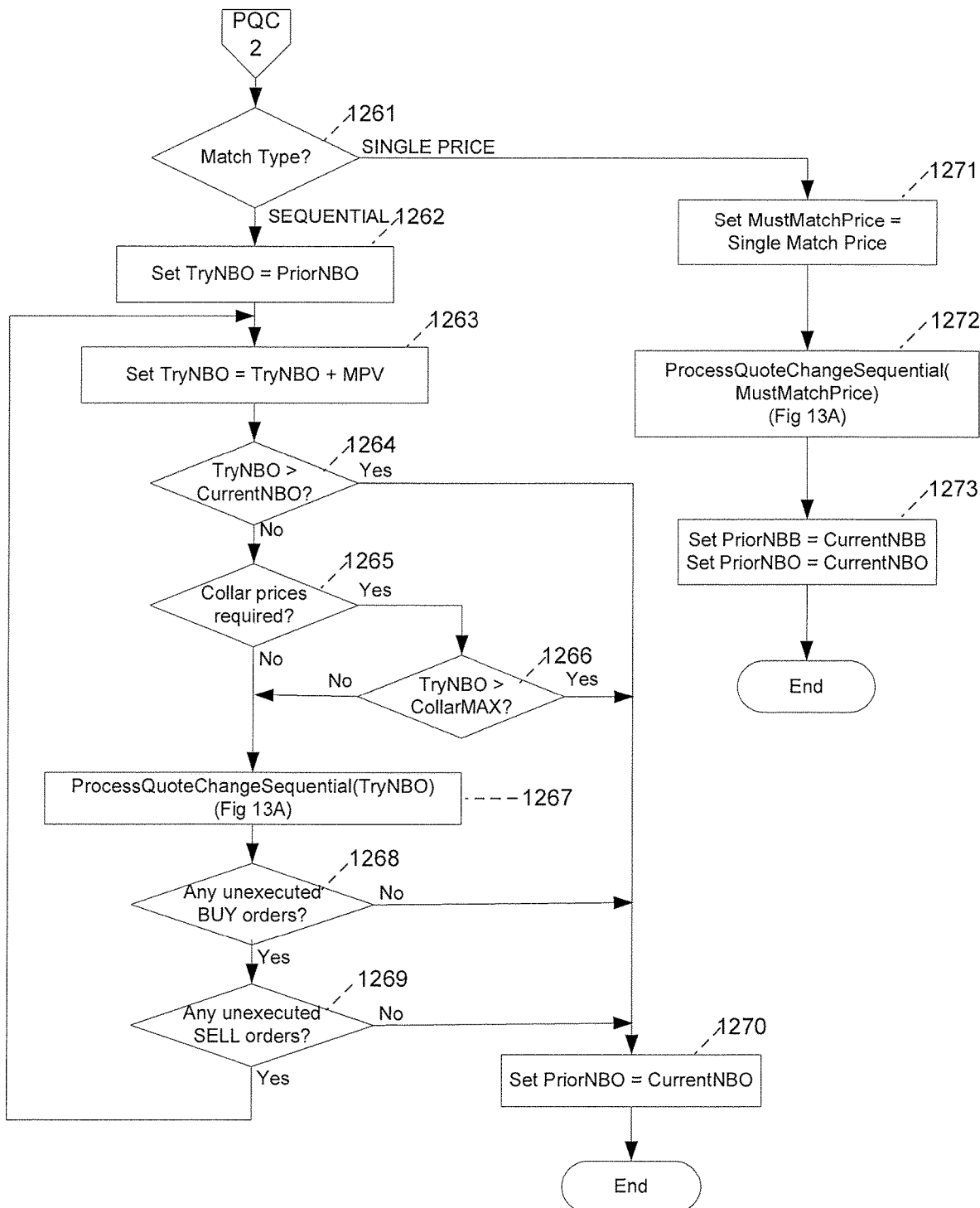

In step 1261 and with reference to FIG. 12C a flowchart showing how the matching system handles an increase in the national best offer (NBO) price. When matching resting orders may have become possible due solely to a change in the NBO price, the contingent order matching system (COMS) permits two different ways to be used to perform the matches. The single price match method and the sequential price match method as discussed above may be used. If this product uses a single price match method, processing continues at step 1271. Otherwise this product uses a sequential price match method and processing continues at step 1262.

In step 1262, the variable TryNBO is initialized to the value PriorNBO. No resting orders can be matched at the value PriorNBO. If such a match were possible, it would have already been made. Processing continues at step 1263. In step 1263, the variable TryNBO is incremented by one MPV, the minimum price variation for this product. Processing continues at step 1264. In step 1264, if the variable TryNBO is greater than the current national best offer price (CurrentNBO), then no additional matches are possible, and processing continues at step 1270. Otherwise additional matches are possible, and processing continues at step 1265.

In step 1265, if limit prices or collar prices are required, then processing continues at step 1266; otherwise processing continues at step 1267. In step 1266, if the variable TryNBO is greater than the highest permitted matching price (CollarMAX), no remaining resting orders may be matched, and processing continues at step 1270. Otherwise processing continues at step 1267. In step 1267, the function ProcessQuoteChangeSequential(TryNBO) is called to match all matchable resting orders at a MustMatchPrice of the variable TryNBO. (see FIG. 13) Processing continues at step 1268.

In step 1268, if there are no more buy orders in the resting order book, processing continues at step 1270. Otherwise processing continues at step 1269. In step 1269, if there are no more sell orders in the resting order book, processing continues at step 1270. Otherwise processing continues at step 1263 to attempt matches at the next value of TRYNBO in the sequence.

In step 1270, no additional matches are possible. The immediately prior national best offer (PriorNBO) is set equal to the current national best offer (CurrentNBO). Processing of any quote change is now complete.

In step 1271, the order matching entity (OME) determines the appropriate price for a single price match using its existing state of the art method. The contingent order matching system (COMS) then sets MustMatchPrice equal to that single match price. Processing continues at step 1272. In step 1272, the function ProcessQuoteChangeSequential (MustMatchPrice) is called to effect all possible matches at MustMatchPrice. (see FIG. 13) Processing continues at step 1273. In step 1273, the immediately prior national best bid (PriorNBB) is set equal to the current national best bid (CurrentNBB). The PriorNBO is set to equal the CurrentNBO. Because a single price match method handles changes in both the NBB and NBO prices, any matches resulting from a change to either NBB or NBO have been completed, and processing of any change to either the NBB, the NBO, or both is complete.

If collar prices which prohibit dissemination of bids (or offers) above (or below) the collar price level, then the flow chart of FIG. 12A will be modified to account for this, which change is within the scope of the present invention.

Figure 13A:
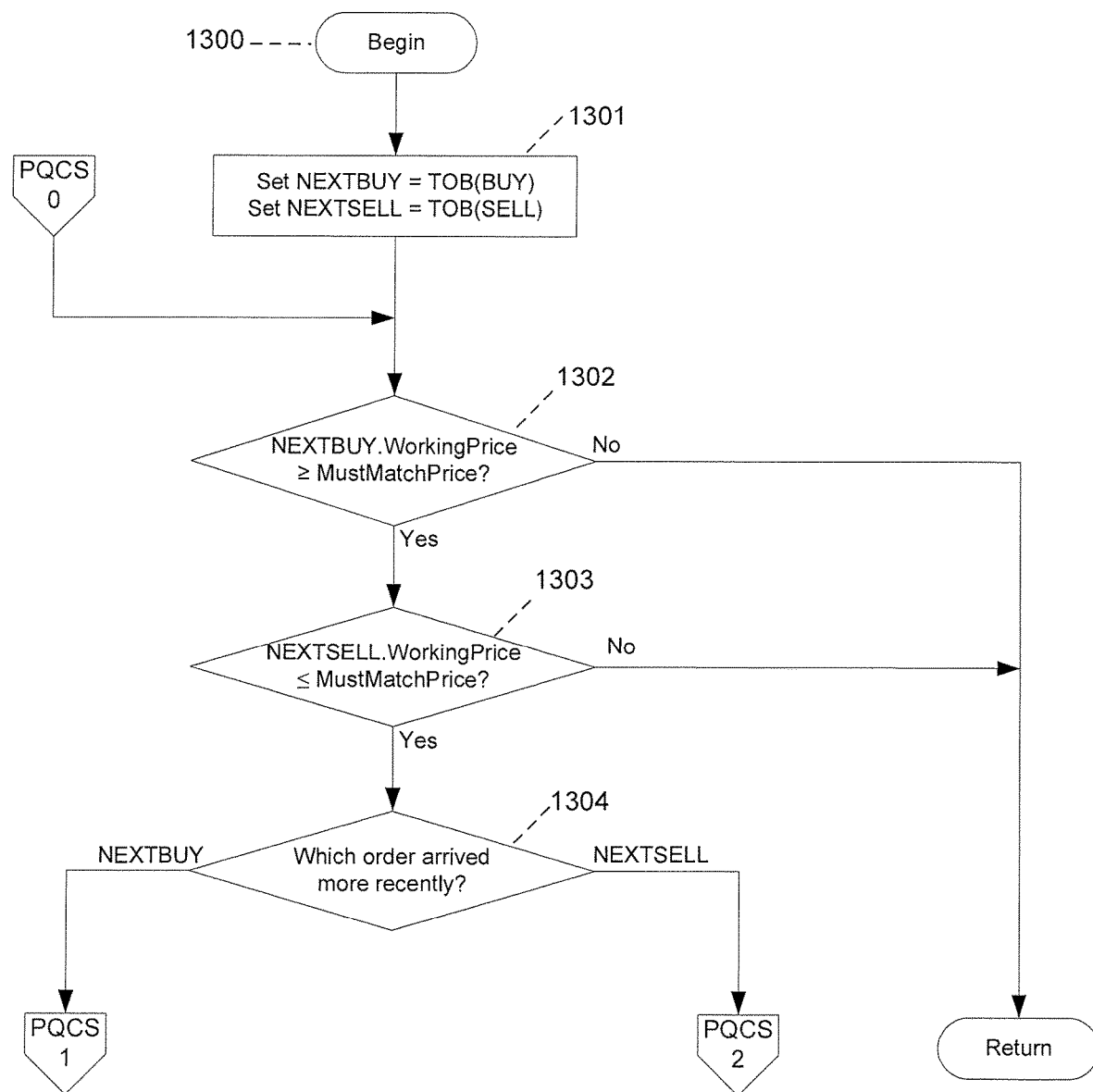
FIGS. 13A, 13B and 13C are flowcharts showing how the sequential processing method of the contingent order matching system (COMS) attempts to match resting orders when the national best bid (NBB) changes. The associated function is called ProcessQuoteChangeSequential( ).

In FIG. 13A is a flowchart showing how the matching system handles the possible matching of resting orders when the national best bid (NBB) has decreased or the national best offer (NBO) has increased—a "quote change"—a using a sequential match. In step 1300, processing begins. One parameter is passed to the function ProcessQuoteChangeSequential( ) the MustMatchPrice. This is the only price at which a match can be attempted. Processing continues at step 1301. In step 1301, the order NEXTBUY is set to the Top of Book buy order. The order NEXTSELL is set to the Top Of Book sell order. Processing continues at step 1302.

In step 1302, if the value NEXTBUY'S WorkingPrice is greater than or equal to the value MustMatchPrice, then it is possible to match the order NEXTBUY at the value MustMatchPrice, and processing continues at step 1303. Otherwise the quote change cannot result in any more matches at the value MustMatchPrice and the function ProcessQuoteChangeSequential( ) is complete. In step 1303, if the value NEXTSELL'S WorkingPrice is less than or equal to the value MustMatchPrice, then it is possible to match the orders NEXTBUY and NEXTSELL at the value MustMatchPrice, and processing continues at step 1304. Otherwise the quote change cannot result in any more matches at the Match Price MustMatchPrice and the function ProcessBidChangeSequential( ) is complete.

Figure 13B:
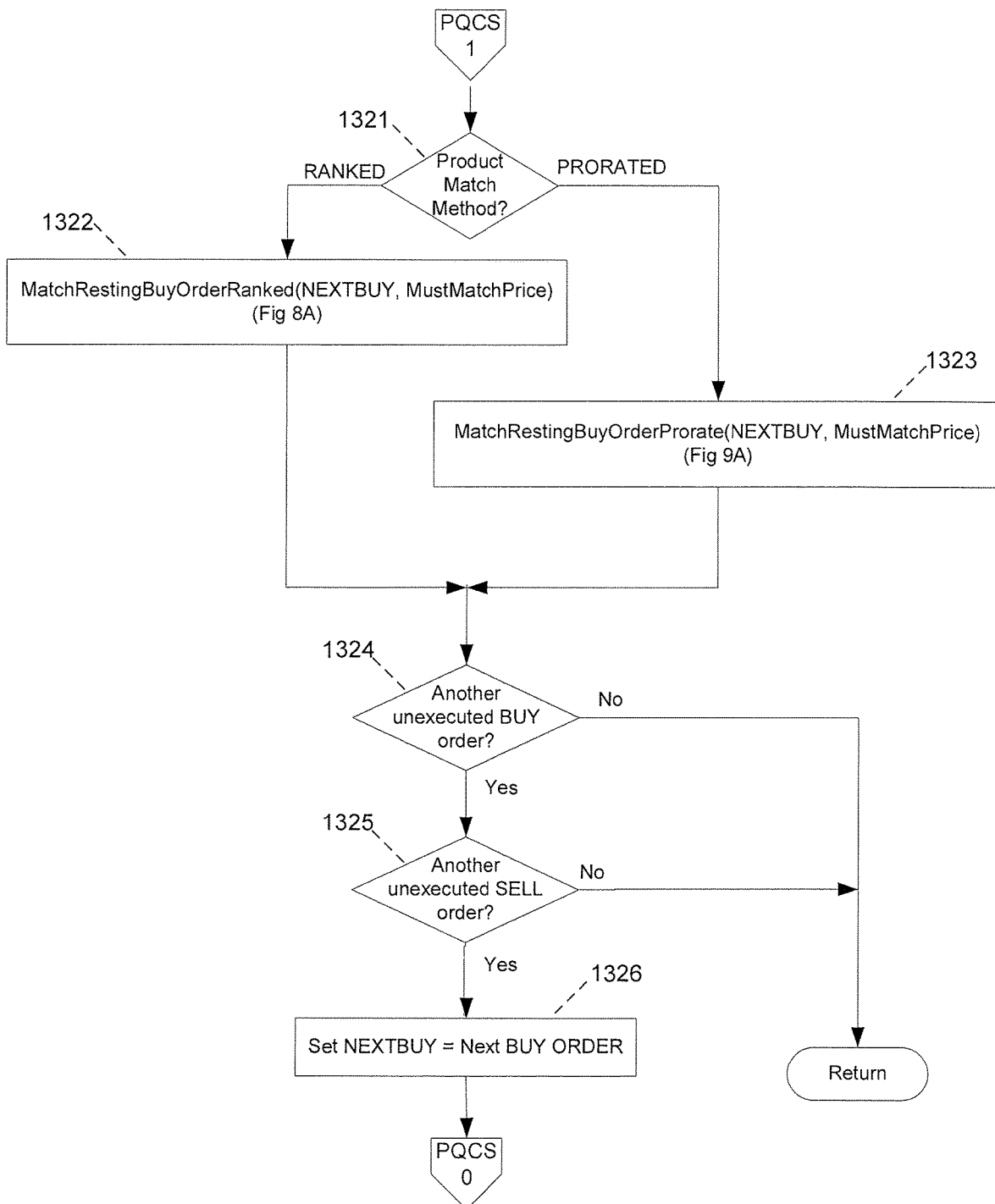
Figure 13C:
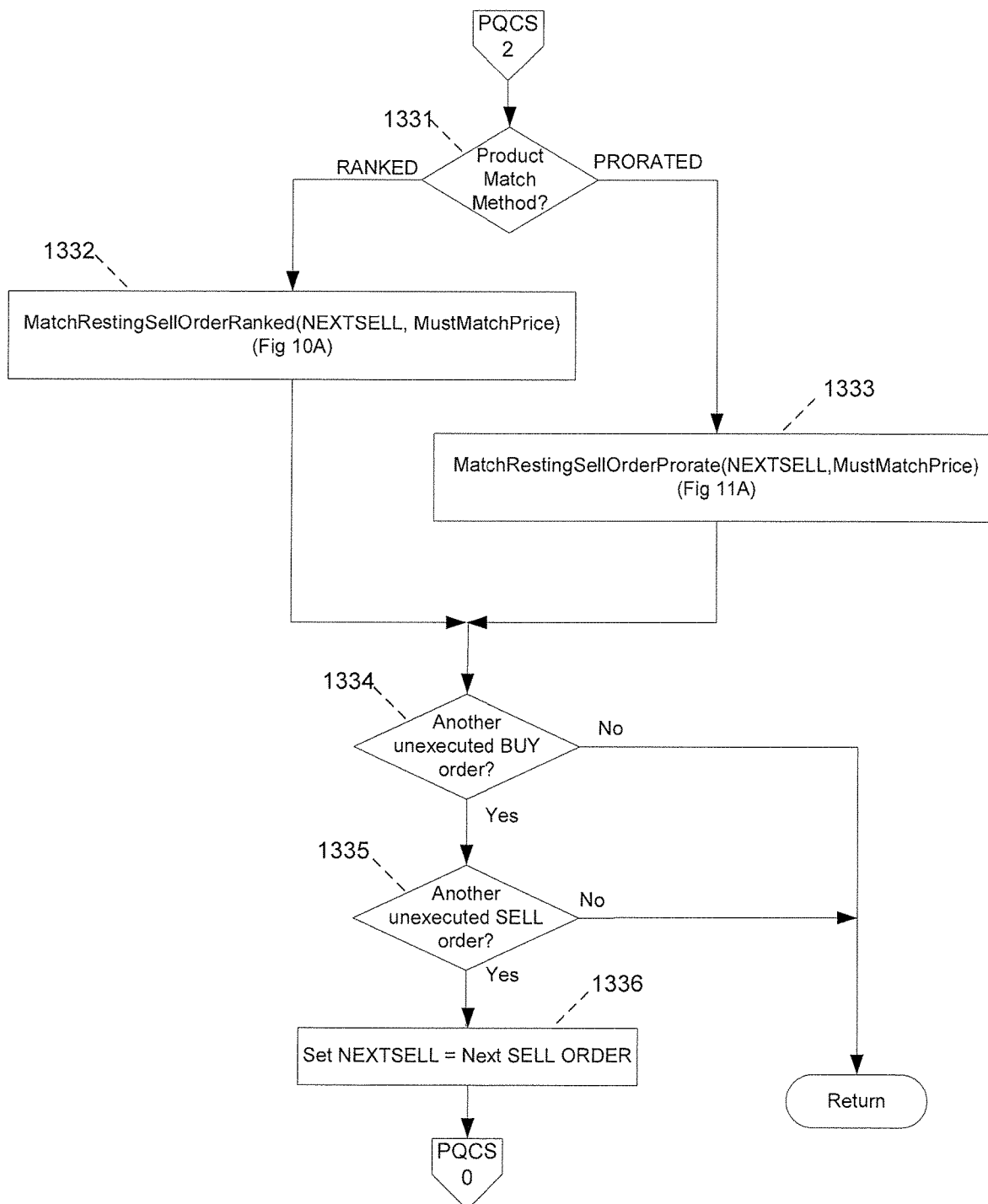

In step 1304, if the order NEXTBUY is time stamped after the order NEXTSELL, then the order NEXTBUY should be treated similarly to an inbound order, and processing continues at step 1311 as shown in FIG. 13B which is linked by PQCS1. Otherwise the order NEXTSELL should be treated similarly to an inbound order, and processing continues at step 1331 as shown in FIG. 13C which is linked by PQCS2. Either way, the order more recently received is treated similarly to an inbound order. In step 1321, if this product is matched using a ranked priority system, processing continues at step 1322. Otherwise this product uses the prorated system, and processing continues at step 1323.

In step 1322, using the ranked priority system, a match of the order NEXTBUY against the resting order book is performed using the function MatchRestingBuyOrderRanked( ) The function MatchRestingBuyOrderRanked( ) is called with two parameters: the order to match against the resting order book (NEXTBUY), and the price at which any matches must be made (MustMatchPrice). (see FIG. 8) Processing continues at step 1324.

In step 1323, using the prorated priority system, a match of the order NEXTBUY against the resting order book is performed using the function MatchRestingBuyOrderProrate( ) The function MatchRestingBuyOrderProrate( ) is called with two parameters: the order to match against the resting order book (NEXTBUY), and the price at which any matches must be made (MustMatchPrice). (see FIG. 9) Processing continues at step 1324.

In step 1324, if there is another unexecuted buy order in the resting order book, processing continues at step 1325. Otherwise, no additional matches are possible. In step 1325, if there is another unexecuted sell order in the resting order book, processing continues at step 1326. Otherwise, no additional matches are possible. In step 1326, the order NEXTBUY is set to be the next-highest-ranked buy order in the resting order book. Processing continues at step 1303 as shown in FIG. 13A using link PQCS0.

In step 1331, if this product is matched using a ranked priority system, processing continues at step 1332. Otherwise this product uses the prorated system, and processing continues at step 1333. In step 1332, using the ranked priority system, a match of the order NEXTSELL against the resting order book is performed using the function MatchRestingSellOrderRanked( ) The function MatchRestingSellOrderRanked ( ) is called with two parameters: the order to match against the resting order book (NEXTSELL), and the price at which any matches must be made (MustMatchPrice). (see FIG. 10) Processing continues at step 1334. In step 1323, using the prorated priority system, a match of the order NEXTSELL against the resting order book is performed using the function MatchRestingSellOrderProrate ( ). The function MatchRestingSellOrderProrate ( ) is called with two parameters: the order to match against the resting order book (NEXTSELL), and the price at which any matches must be made (MustMatchPrice). (see FIG. 11) Processing continues at step 1334.

In step 1334, if there is another unexecuted buy order in the resting order book, processing continues at step 1335. Otherwise, no additional matches are possible. In step 1334, if there is another unexecuted sell order in the resting order book, processing continues at step 1336. Otherwise, no additional matches are possible. In step 1336, the order NEXTSELL is set to be the next-highest-ranked sell order in the resting order book. Processing continues at step 1302 as shown at FIG. 13A using link PQCS0.

Figure 14:
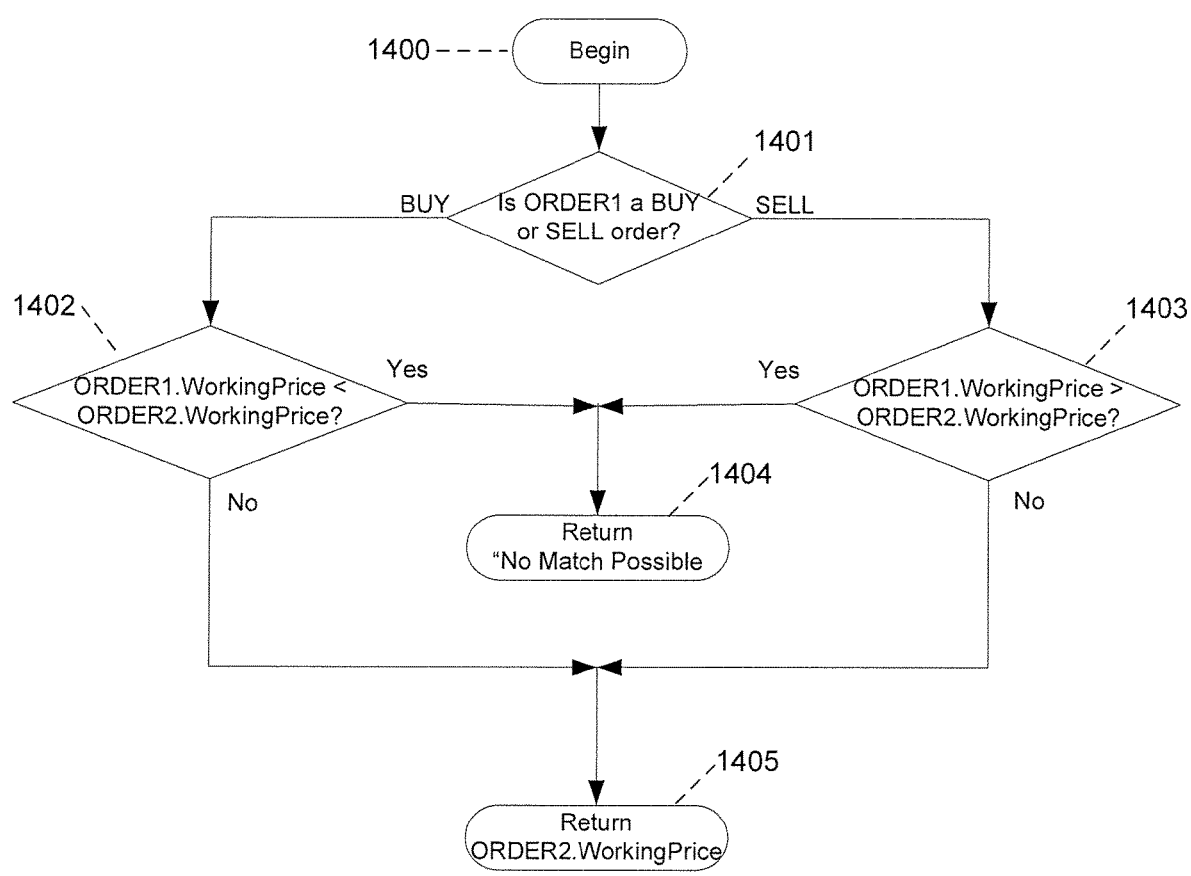
FIG. 14 is a flowchart showing how the matching system determines the price at which to attempt to match two orders—the first of which is an inbound order and the second is a resting order. The associated function is called SetInboundMatchPrice( ).

With reference to FIG. 14 a flowchart shows how the matching system sets the value MatchPrice of two orders the first of which is an inbound order and the second of which is a resting order or, alternatively, determines that there is no price at which the orders can be matched. In step 1400, processing begins. The illustrated defines the function SetInboundMatchPrice(ORDER1, ORDER2). The function SetInboundMatchPrice( ) is passed both orders. ORDER1 is an inbound order; ORDER2 is a resting order. Among the ORDER1 and ORDER2 orders, the order ORDER1 is always the more recently received order. Processing continues at step 1401.

In step 1401, the function SetInboundMatchPrice( )) begins by determining which order is a buy order and which is a sell order. If the order ORDER1 is a buy order, then processing continues at step 1402. If the order ORDER1 is a sell order, then processing continues at step 1403. In step 1402, the order ORDER1 is a buy order and the order ORDER2 is a sell order in the possible match. If the value ORDER1's WorkingPrice is less than value of the ORDER2's WorkingPrice, then no match is possible, and processing continues at step 1404. Otherwise processing continues at step 1405.

In step 1403, the order ORDER1 is a sell order and ORDER2 is a buy order in the possible match. If the value of ORDER1's WorkingPrice is greater than the value of ORDER2's WorkingPrice, then no match is possible, and processing continues at step 1404. Otherwise processing continues at step 1405. In step 1404, the function SetInboundMatchPrice( ) returns a value indicating that no match is possible.

In step 1405, the function SetInboundMatchPrice( ) returns the value of the ORDER2's WorkingPrice as the MatchPrice. This assures that any price improvement benefits the order ORDER1, the order which arrived most recently.

Figure 15:
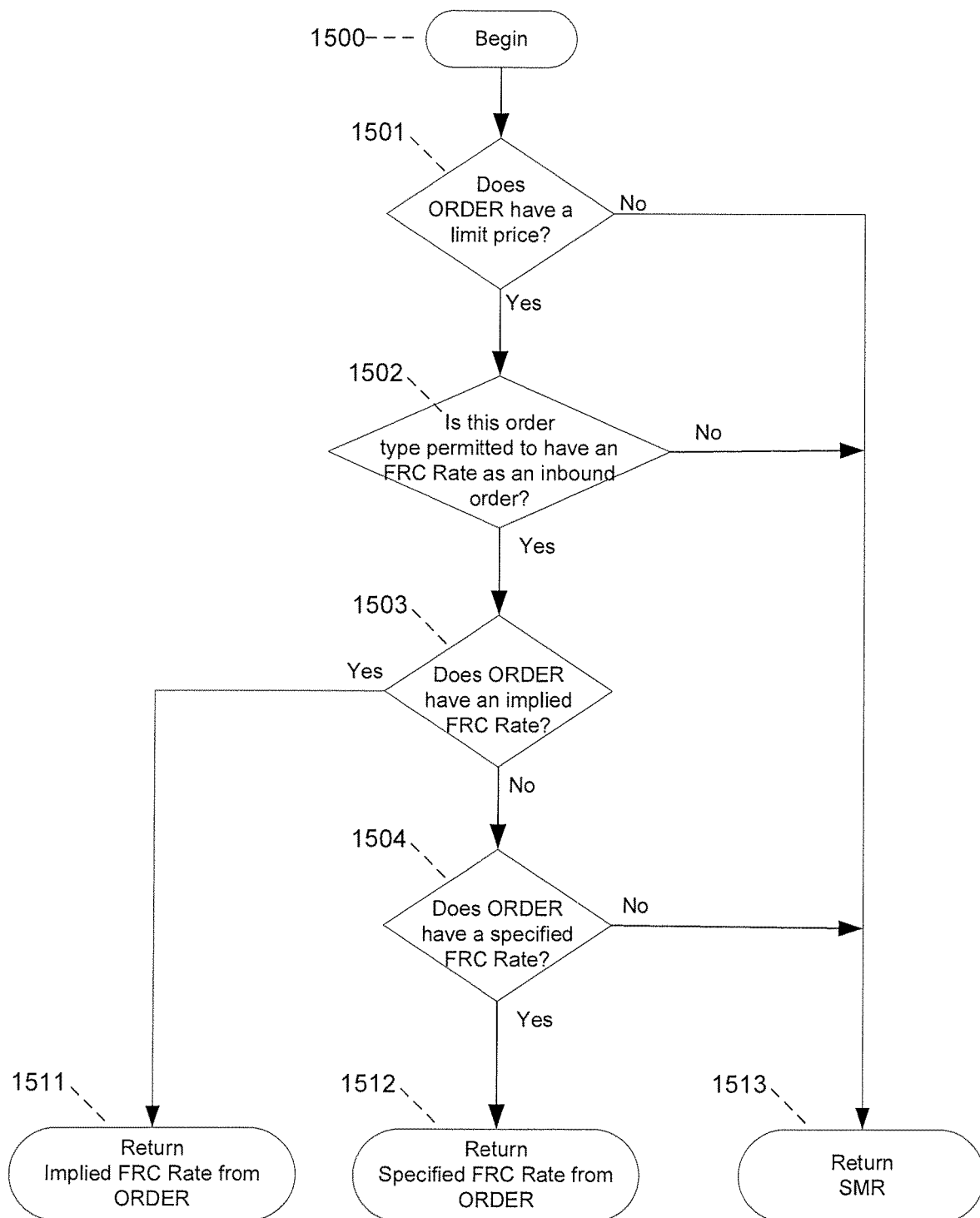
FIG. 15 is a flowchart showing how an order's FRCRin (fee/rebate contingency-in rate) is calculated by defining the function CalcInboundFRCRate( ).

With reference to FIG. 15, a flowchart showing how the matching system sets the inbound fee/rebate contingency (FRC) rate (FRCRin) upon receipt of an inbound order. The function's return value is the value of FRCRin to assign to the inbound order. This function is only used for buy orders and sell orders. Any portion of a cross order that is intended to be matched with buy orders or sell orders has a FRCRin value equal to SMR. In step 1500, processing begins. This flowchart defines the function CalcInboundFRCRate( ) An order ORDER is passed to this function. Processing continues at step 1501. In step 1501, if the order ORDER has a limit price, then processing continues at step 1502. Otherwise, since market orders always have a FRC rate of SMR, processing continues at step 1513.

In step 1502, the order ORDER is a limit order. If the order ORDER is an order type which is permitted to have a fee/rebate contingency while being processed as an inbound order, then processing continues at step 1503; otherwise processing continues at step 1513. An example of an order type which is not permitted to have a fee/rebate contingency as an inbound order is an intermarket sweep order (ISO) in a US equities security operating subject to SEC Regulation NMS. Inbound ISO orders must be able to interact with the resting order book without such a contingency and, therefore, an OME cannot permit such an order to have a fee/rebate contingency which might prevent that interaction. Note that the function CalcRestingFRCRate( )—shown on FIG. 16 and described below—is used to determine the FRC rate assigned to an ISO order if it is subsequently placed in the resting order book. The function CalcRestingFRCRate( ) does not prevent an intermarket sweep order (ISO) order from having an FRC rate other than SMR once processing it as an inbound order is complete if the order is placed in the resting order book.

In step 1503, a fee/rebate contingency (FRC) rate is permitted for this order type. Now the contingent order matching system (COMS) must determine whether the order ORDER calls for an FRC rate other than SMR. The FRC rate may be specified by the order sender in one of two ways.

The order type may have an implied fee/rebate contingency (FRC) rate. For example, the "post only" order type previously discussed implies that the order sender requires that the exchange must pay the maximum allowed rebate for this product by the order matching entity (OME). If the order ORDER has an implied numerical FRC rate, the contingent order matching system (COMS) translates the implied FRC rate to a numerical FRC rate.

The order ORDER may include an explicit, numerical fee/rebate contingency (FRC) rate. Explicit, numerical FRC rates greater than zero commit the order sender to paying an exchange a fee quantified by the FRC rate. Numerical FRC rates less than zero indicate a requirement that the order sender must be paid a rebate quantified by the FRC rate. A numerical FRC rate equal to zero indicates that the order sender is unwilling to pay a fee and does not require receiving a rebate. The order sender's FRC rate may be overridden as described above.

If the order ORDER has an implied FRC rate, then processing continues at step 1511; otherwise processing continues at step 1504. In step 1504, if the order ORDER has an explicit, numerical FRC rate, then processing continues at step 1512; otherwise processing continues at step 1513.

In step 1511, the function CalcInboundFRCRate( ) returns the numerical fee/rebate contingency (FRC) rate which was included as an implied FRC rate by the ORDER. This completes the function CalcInboundFRCRate( ) In step 1512, the function CalcInboundFRCRate( ) returns the explicit, numerical FRC rate which was part of the order ORDER. This completes the function CalcInboundFRCRate( ).

In step 1513, the function CalcInboundFRCRate( ) returns the OME's Standard matching rate (SMR) for the product. This is done for MARKET orders, inbound orders with a non-contingent order type, and orders with neither an implied nor specified FRC rate. These orders default to an inbound FRC rate equal to SMR. This completes the function CalcInboundFRCRate( ).

Figure 16:
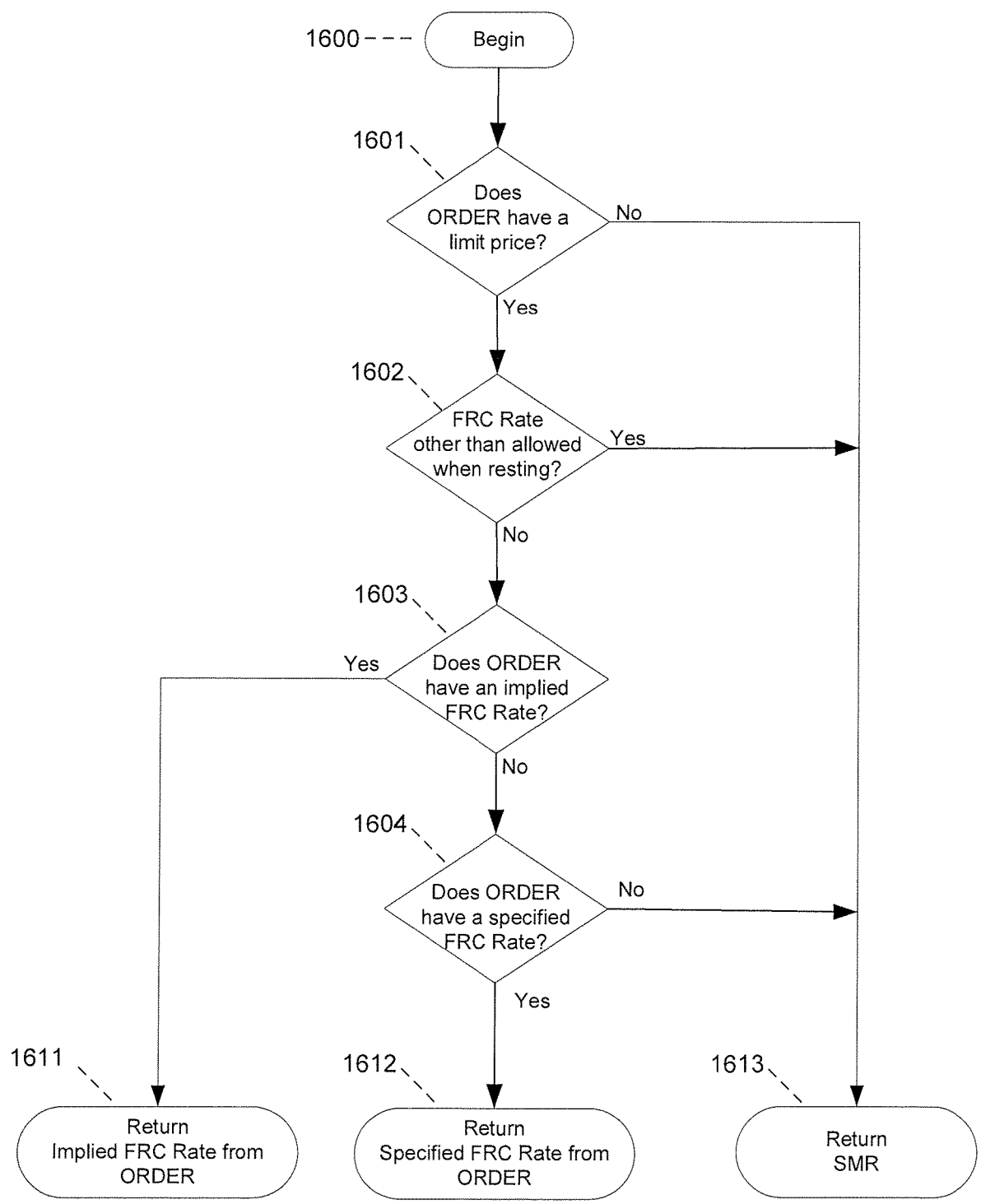
FIG. 16 is a flowchart showing how an order's FRCRro (fee/rebate contingency-resting order rate) is calculated by defining the function CalcRestingFRCRate( ).

The flowchart of FIG. 16 shows how the matching system sets the Resting Order FRC rate (FRCRro) when an order is placed in the resting order book. In step 1600 processing begins. FIG. 16 defines the function CalcRestingFRCRate( ). The order ORDER is passed to this function. The function's return value is the value of FRCRro to assign to the order ORDER. This process is only used for buy orders and sell. Cross orders are never resting orders. Processing continues at step 1601. In step 1601, if the order ORDER has a limit price, then processing continues at step 1602. Otherwise, since market orders always have a fee/rebate contingency (FRC) rate of the standard matching rate (SMR), processing continues at step 1613.

In step 1602, if the order ORDER is an order type which is permitted to have a fee/rebate contingency as a resting order, then processing continues at step 1603. Otherwise processing continues at step 1612. An example of an order type for which an OME may not permit a fee/rebate contingency as a resting order is a midpoint pegged order in a US equities security. A midpoint pegged order must be able to interact with an inbound order without a fee/rebate contingency. Therefore, an order matching entity (OME) may or may not permit such an order to have a fee/rebate contingency which might prevent that interaction. It is important to note that the function CalcInboundFRCRate( )—shown in FIG. 15 and described above—is overused to determine the FRC rate assigned to such an order while it is initially processed as an inbound order. The function CalcRestingFRCRate( ) supports allowing an order to have one FRC rate when processed as an inbound order and a different FRC rate when placed in the resting order book.

In step 1603, an FRC rate is permitted for this order type. Now the contingent order matching system (COMS) must determine whether the order ORDER calls for an FRC rate other than SMR. The FRC rate may be specified by the order sender in one of two ways, as described above. If the order ORDER has an implied FRC rate, then processing continues at step 1611. Otherwise processing continues at step 1604. In step 1604, if the order ORDER has an explicit, numerical fee/rebate contingency (FRC) rate, then processing continues at step 1612. Otherwise processing continues at step 1613.

In step 1611, the function CalcRestingFRCRate( ) returns the numerical FRC rate which was included as an implied FRC rate by the order ORDER. This completes the function CalcRestingFRCRate( ) In step 1612, the function CalcRestingFRCRate( ) returns the explicit, numerical FRC rate which was part of the order ORDER. This completes processing of the function CalcRestingFRCRate( ).

In step 1613, the function CalcRestingFRCRate( ) returns the OME's standard matching rate (SMR) for the product. This is done for market orders, inbound orders with a non-contingent order type, and orders with neither an implied nor specified FRC rate. These orders default to an inbound FRC rate equal to the standard matching rate (SMR). This completes the processing of the function CalcRestingFRCRate( ).

Figure 17:
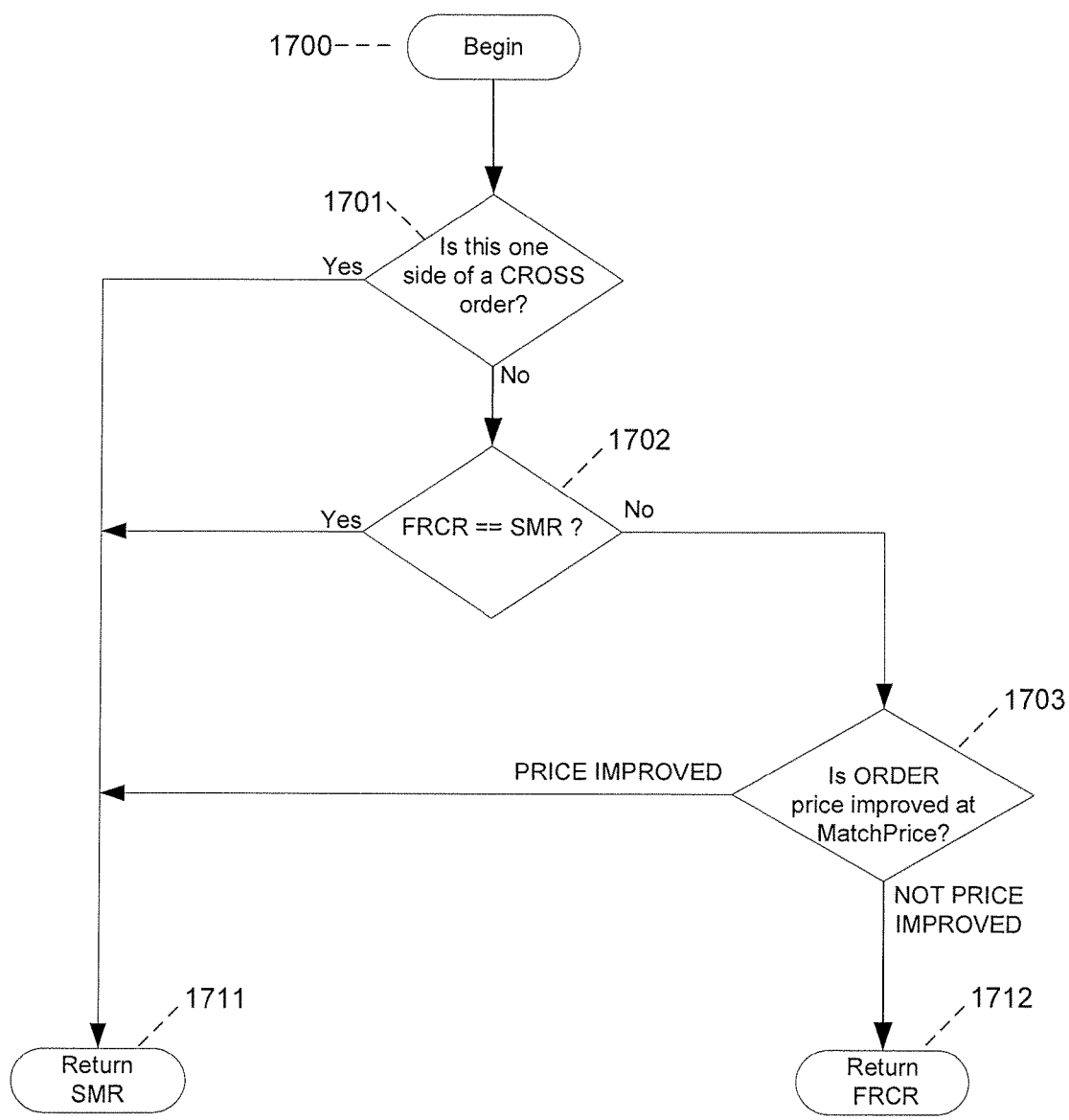
FIG. 17 is a flowchart showing how an order's FRCRm (fee/rebate contingency-match rate) is calculated by defining the function CalcMatchFRCRate( ).

Referring to FIG. 17, a flowchart showing how the matching system calculates the Match FRC rate (FRCRm) of an order based on a specific match is shown. The match fee/rebate contingency rate (FRCRm) may override the default FRC rate of the order for the purpose of a specific match. If this occurs, the rate FRCRm is equal to the standard matching rate (SMR). In step 1700, processing begins. This flowchart defines the function CalcMatchFRCRate( ). This function is passed the order ORDER, the default FRC rate that would be used as the rate FRCRm if it is not overridden, and the MatchPrice being attempted. The function CalcMatchFRCRate( ) returns the rate FRCRm applicable to this specific match rate (FRCRm). Processing continues at step 1701. In step 1701, if the order ORDER is one side of a cross order, then the rate FRCRm must be set to OME's standard matching rate (SMR) for this product, and processing continues at step 1711. Otherwise processing continues at step 1702.

In step 1702, if the default fee/rebate contingency (FRC) rate passed to this function is already equal to the OME's standard matching rate for this product (SMR), then no further tests need be made and processing continues at step 1711. Otherwise processing continues at step 1703. In step 1703, if the MatchPrice value does not equal the ORDER's ActivePrice value, then a match at the MatchPrice value would execute the order ORDER at a price which is better than the execution price that the order ORDER is trying to achieve. For the purpose of this invention, this is referred to as "price improvement." If price improvement is provided, then the value of the FRCRm rate should be set to the standard matching rate for this product (SMR) by continuing processing at step 1711. Otherwise, the value of the matching rate (FRCRm) should be set to the default FRC rate (FRCR) passed to this function by continuing processing at step 1712.

In step 1711, the function CalcMatchFRCRate( ) overrides the default rate FRCR, if necessary, and returns the standard matching rate (SMR). This completes the function CalcMatchFRCRate( ) In step 1712, function CalcMatchFRCRate( ) returns the default rate FRCR passed to it. This completes processing of the function CalcMatchFRCRate( ).

FIG. 18 is a flowchart showing how the matching system attempts to match two orders. This flowchart defines the function AttemptToMatchTwoOrders( ). The function AttemptToMatchTwoOrders( ) is provided both orders (ORDER1 and ORDER2)—which include the applicable matching rate FRCRm for each order for this particular attempt to match, and the value MatchPrice to be attempted (MP). The function AttemptToMatchTwoOrders( ) determines whether matching the orders will satisfy the FRCRm values of both orders and result in the order matching entity (OME) receiving its minimum matching rate (MMR). If the function AttemptToMatchTwoOrders( ) determines that this will occur, it proceeds to perform the match. This function differs from state of the art matching systems for example by the step 1801 which implement's COMS' feature: having a temporarily unmatchable order temporarily yield priority to other orders.

In step 1800, processing begins. Three parameters are passed to the function AttemptToMatchTwoOrders( ) both orders (ORDER1 and ORDER2) and a specific value for MatchPrice. The function AttemptToMatchTwoOrders( ) is only called after COMS has determined that—at most—there is one only remaining potential obstacle to matching ORDER1 and ORDER2—each order's FRCRm value. In step 1801, the values of the match FRC rate (FRCRm) for each order—ORDER1.FRCRm and ORDER2.FRCRm order—previously calculated for this specific match—are summed. The sum is compared with the OME's minimum matching rate (MMR) for this product. If the sum is greater than or equal to MMR, then matching the two orders can be completed. Processing the match occurs by continuing processing at step 1811. Otherwise, the match is not permitted which completes processing of the function AttemptToMatchTwoOrders( ) This comparison is unique to the contingent order matching system (COMS).

In step 1811, the unexecuted quantities of the orders ORDER1 and ORDER2 are compared. The quantity to be matched (MatchQty) is set to the lesser of those values. Processing continues at step 1812. In step 1812, the orders ORDER1 and ORDER2 are then matched for the MatchQty value at the MatchPrice value as processing continues at step 1813. In step 1813, the values ExecutedQty (or UnexecutedQty) quantities of the orders ORDER1 and ORDER2 are increased (or decreased) by the value MatchQty to reflect the match. The match always completes the execution of at least one (and possibly both) of the two orders. If the value ORDER1.UnexecutedQty was equal to the value ORDER2.UnexecutedQty before the match, the match completes the execution of both ORDER1 and ORDER2 orders.

In step 1814, the matching system now performs all other tasks that are part of the current state of the art of matching systems including, but not limited to, reporting the executions to order senders, disseminating new price quotation data, reporting the last sale transaction, logging all activities for audit or regulatory purposes, etc. This completes the function AttemptToMatchTwoOrders( ).

Figure 19:
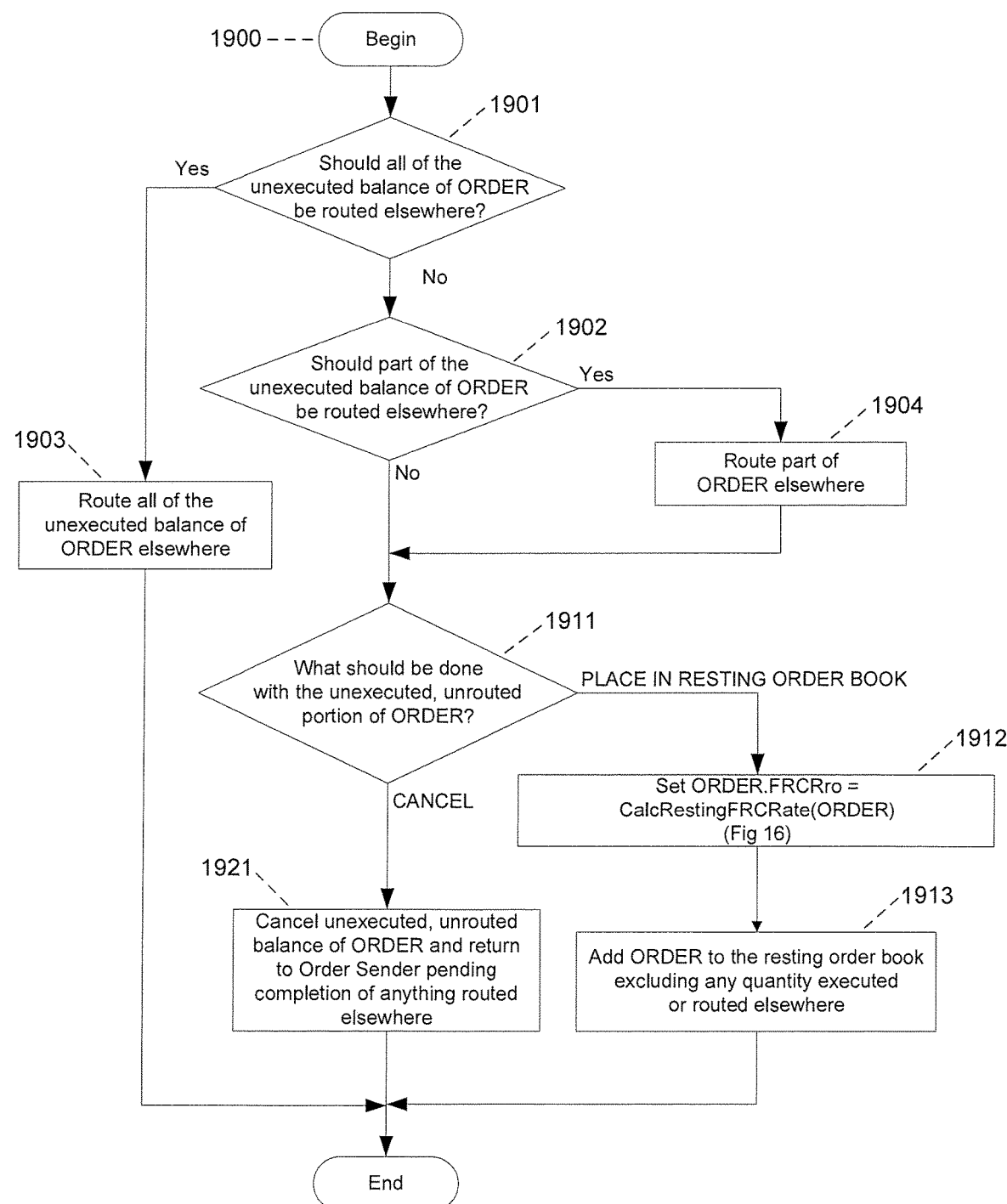
FIG. 19 is a flowchart showing the how the contingent order matching system (COMS) processes an inbound order when no additional matches can be made at the present time. The associated function is called CompleteINBD( ).

FIG. 19 is a flowchart showing the method of how the matching system completes the processing of an inbound order when no additional matching of the order is either required or possible at the present time. In step 1900, processing begins. The method steps of FIG. 19 illustrate the function CompleteInboundOrderHandling( ). This function is passed the order ORDER. Processing continues at step 1901. Some order matching entities (OMEs) offer services which would, in certain circumstances, route some or all of the unexecuted portion of an inbound order to another OME for execution. The algorithms used to determine whether an order should be routed (and to where) are part of the OME's current state of the art. Therefore details are not provided as part of this document.

In step 1901, if this OME offers order routing services, then step 1901 determines whether all of the unexecuted balance of the order ORDER should be routed to one or more places. If this is the case, processing continues at step 1903. Otherwise processing continues at step 1902. In step 1902, if some portion—but not all—of the unexecuted quantity of the order ORDER should be routed elsewhere, processing continues at step 1904. Otherwise, no portion of the order is to be routed elsewhere, and processing continues at step 1911.

In step 1903, the OME's algorithms handle routing of the entire unexecuted balance of the order ORDER elsewhere. This completes the function CompleteInboundOrderHandling( ). Any unexecuted portion of the order which was routed away and is returned to the matching system unexecuted is handled as a returning portion of an order employing the OME's state of the art procedures. In step 1904, some portion—but not all—of the unexecuted balance of the order ORDER is routed elsewhere by the OME's algorithms. The order matching entity (OME) must now handle whatever unexecuted portion of the order remains unrouted. Processing continues at step 1911.

In step 1911, the order ORDER includes instructions which indicate whether the unexecuted, unrouted portion of the order ORDER should be either be placed in the resting order book or be cancelled back to the order sender. Step 1911 tests these parameters of the order ORDER. If the unmatched, unrouted balance of the order ORDER is to be placed on the resting order book, then processing continues at step 1912. Otherwise processing continues at step 1921. In step 1912, before placing the unexecuted, unrouted portion of the order ORDER into the resting order book, the variable ORDER.FRCRro is set to the value returned by calling the function CalcRestingFRCRate( ). (see FIG. 16) In step 1913, the unexecuted, unrouted portion of the order ORDER is added to the OME's resting order book. It is ranked by its ActivePrice value. This completes the function CompleteInboundOrderHandling( ). In step 1921, the portion of the order ORDER which is unexecuted and has not been routed elsewhere is cancelled and returned to the order sender pending completion of action on any portion of the order ORDER which was routed elsewhere. This completes the function CompleteInboundOrderHandling( ).

The drawing FIG. 20 provides examples illustrating the relationship between the OME's standard matching rate (SMR), the maximum rebate rate (MRR), and minimum matching rate (MMR). The SMR and MMR values chosen for a given product define the maximum fee (SMF) that can be charged as well as the maximum rebate (MMR) that can be paid and, thereby, provide upper and lower bounds of the optional FRC rate for that product. The minimum matching rate (MMR) is a threshold which is the predetermined minimum value (a minimum fee charged or a maximum rebate paid) which the OME must have as a prerequisite to matching two orders.

FIG. 20 provides one example where the rates SMR and MMR are calculated based on the number of trading units (shares, contracts, etc.) that are matched. It also provides an example where the rates SMR and MMR are expressed as a percentage of the notional value of the matched trade. Failure to meet both condition number 1 and condition number 2 or to calculate MRR as shown can result in deadly embrace, defeating one of the objectives of the contingent order matching system COMS and making the use of a fee/rebate contingency dysfunctional.

FIG. 21 explains several symbols used elsewhere in this specification and in the associated figures.

The method and system as shown and described here utilizes machines, specifically computer devices and systems that include processors, memory, storage media, interface devices and various additional modules, systems, components and circuits to perform the method steps. The computer devices and systems of a preferred embodiment are connected to one another via network connections such as LAN, WAN, or Internet connections via wired or wireless communications links. The computer devices and systems operate under control of software executed by the processor and which is stored on tangible computer readable media in or accessible to the computer device or system. The computer devices may be servers, personal computers, workstations, desktop, laptop or tablet computers, PDAs, smartphones, or other portable or stationary devices. The computer devices may include interface and input and output devices by which a user may view information, input information or commands and receive information. The software executing on the computer system may be programmed in any computer language, including C++, C #, Java, or other language.

| TERM | DEFINITION |
| --- | --- |
| ActivePrice | An buy (or sell) order's ActivePrice indicates the highest (or lowest) price at which the order can currently be matched without regard to current Rules restrictions on pricing (i.e., NBBO violation, short sale price restrictions, price collars or limits).<br>The ActivePrice of a simple limit order is the order's limit price.<br>The ActivePrice of a pegged order is the order's current (pegged) price.<br>The ActivePrice of a market buy order has no limit; it is therefore considered to be higher than the ActivePrice of any order other than another market buy order.<br>The ActivePrice of a market sell order is the lowest price at which a trade of any sort is permitted (e.g., 0.0001); it is therefore considered to be lower than the ActivePrice of any order other than another market sell order.<br>An order's ActivePrice may vary over time (e.g., a pegged order). Orders are ranked in the resting order book by ActivePrice, not WorkingPrice. |
| At The Market | An order is at the market if the order is a limit buy (or sell) order with a limit price which equals the NBB (or NBO) price. |
| Away From The Market | An order is away from the market if the order is a limit buy (or sell) order with a limit price below (or above) the NBB (or NBO) price. |
| BBO | See Best Bid and Offer. |
| Best Bid and Offer | And Order Matching Entity's best bid price and best offer price - together the Order Matching Entity's best bid and offer (BBO) - are the best (highest priced) bid and the best (lowest priced) offer published by the Order Matching Entity. |
| Book | A computerized inventory of resting (active, unexecuted) orders to buy or sell financial instruments for the purpose of attempting to eventually execute those orders using a specialized computer to match buy orders with sell orders -a matching system - which is specifically programmed for that purpose. |
| COMS | See Contingent Order matching system. |
| Contingent Order | A contingent order is an order which is submitted with one or more contingencies which directs the Order Matching Entity that the order may not be matched unless any such contingencies are met. |
| Contingent Order Matching Mystem | The name of the present invention. |
| Cross or Cross Order | An order to cross a financial instrument provides both the terms of the transaction and the identity of both the buyer and the seller. A cross transaction is submitted to an Order Matching Entity for the purpose of executing the transaction under the oversight of the Order Matching Entity which is required in certain regulatory regimes. |
| Crossed Book | A book is crossed when the book for a financial instrument holds both buy and sell orders and the highest limit price of all buy orders held in the book is greater than the lowest limit price of all sell orders held in the book. A book is also crossed if it holds an unexecuted market order. |
| Crossed Market | A market is crossed when the NBB price for a financial instrument is greater than the NBO price for that financial instrument. |
| Crossed Quotation | A quotation is crossed when the quotation for a financial instrument includes both a bid and an offer price and the bid price is greater than the offer price. |
| Deadlock | See deadly embrace. |
| Deadly Embrace | A situation which can arise in an Order Matching Entity's book in which the book holds a set of orders which make it impossible to match any inbound buy or sell order using the current state of the art. Order Matching Entities current adopt rules which lead to rejection of orders which could lead to deadly embrace. |
| ECN | See Electronic Trading Network |
| Electronic Trading Network | An electronic trading network is a Order Matching Entity which is not registered with a regulatory (e.g., the U.S. Securities and Exchange Commission) as an exchange. |
| Fee/Rebate Contingency | A fee/rebate contingency is an option contingency placed on an order to buy or sell which directs the Order Matching Entity that the order should only be matched if the specified fee or rebate rate contingency can be met. |
| First-In-First-Out | A sequence of handling items in which the item which has been present for the longest period of the ("first-in") is handled before all others ("first-out"). |
| FIFO | See First-In-First-Out. |
| FRC rate | A fee/rebate contingency rate is the fee or rebate rate which the Order Matching Entity must charge or rebate upon execution of some or all of the associated order. |
| FRC | See Fee/Rebate Contingency. |
| FRCR | See FRC Rate. |
| FRCRin | The value of FRC Rate, derived from FRCRorder, used when a given order is being processed as a new, inbound order. |

| TERM | DEFINITION |
|---|---|
| FRCRm | The value of FRC Rate - derived from FRCRin or FRCRro - which is used when attempting a specific match with another order. |
| FRCRorder | The FRC Rate submitted as part of an order. |
| FRCRro | The value of FRC Rate, derived from FRCRorder, used when a given order is being processed as a resting order in the resting order book. |
| FRC Rate | fee/rebate contingency rate. |
| Hypermarketable | An order is hypermarketable if the order is either (1) a market order, or (2) a limit buy (or sell) order with a limit price which is greater (or less) than the NBO (or NBB) price. |
| Inbound Order-Related Message | An inbound order-related message is the order message for a given product that has most recently been received by COMS and is currently being processed by COMS. The inbound order-related message is retrieved from the FIFO queue created by the matching system as order-related messages are received from the OME's electronic network.<br>Four types of inbound order-related messages exist:<br>An inbound new order is a new order to be processed by the matching system. The text below relating to FIGS. 3 through 7 describes how an inbound order is handled by COMS.<br>An inbound order modification request message (sometimes called a Cancel/Replace message request), directs COMS to modify a previously sent order. These messages are handled as they are in state of the art matching systems.<br>An inbound order cancellation request, directs COMS to cancel any portion of a previously sent order which has not been matched. These are handled as they are in state of the art matching systems.<br>An inbound order status request, asks COMS to report the status of a previously sent order. These are handled as they are in state of the art matching systems. |
| Inside the Market | An order is inside the market if the order is a limit buy (or sell) order with a limit price between, but not equal to either the NBO or NBB price. |
| ISO | See Intermarket Sweep Order. |
| Intermarket Sweep Order | A specific order type to buy or sell which is sent from one marketplace to another. |
| Limit Price | The limit price of an order to buy (or sell) is the highest (or lowest) price at which the order may be executed. |
| Locked Book | A book is locked when the book for a financial instrument holds both buy and sell orders and the highest limit price of all buy orders held in the book is equal to the lowest limit price of all sell orders held in the book. |
| Locked Market | A market is locked when the NBB price for a financial instrument equals the NBO price for that financial instrument. |
| Locked Quotation | A quotation is locked when the quotation for a financial instrument includes both a bid and an offer price and the bid price is equals the offer price. |
| Make Liquidity | An order "makes" liquidity if it resides as a resting order in an Order Matching Entity's book, available to be matched against a new, inbound order which would "take" the liquidity which it provides. |
| Marketable | An order is marketable if the order is a limit buy (or sell) order with a limit price which equals the NBO (or NBB) price. |
| Market Order | An order without a limit price. A market order should be executed as soon as possible at the best available price(s). |
| MatchPrice | The price at which a match is attempted or made. |
| Matching System | A specialized computer matching system which is programmed to match orders to buy or sell (or cross transactions in) any financial instrument. |
| Match FRC rate | See FRCRm. |
| Maximum Rebate Rate | The highest rebate rate which an Order Matching Entity is willing to pay for matching trades for a given financial instrument. |
| Minimum Matching Rate | The profit margin which an Order Matching Entity requires to match a buyer with a seller for a given product is the OME's Minimum Matching Rate (MMR) for that product. |
| Minimum Price Variation | The Minimum Price Variation for trading a given financial instrument determines the prices at which trades are permitted. |
| MMR | See Minimum Matching Rate. |
| MMRproduct | The Minimum Matching Rate for a given product. |
| MPV | See Minimum Price Variation. |
| MRR | See Maximum Rebate Rate. |
| MRRproduct | The Maximum Rebate Rate for a given product. |
| MS | See matching system. |
| MustMatchPrice | The only price at which the matching system is currently able to complete a match between one or more buy orders and one or more sell orders. |

-continued

| TERM | DEFINITION |
| --- | --- |
| National Best Bid | The best (highest priced) bid published by any marketplace whose quotes must be protected, excluding the BBO published by the OME using the present invention. |
| National Best Bid and Offer | The best (lowest priced) offer published by any marketplace whose quotes must be protected, excluding the BBO published by the OME using the present invention. |
| National Best Offer | The best (highest priced) bid and the best (lowest priced) offer published by any marketplace whose quotes must be protected, excluding the BBO published by the OME using the present invention. |
| NBB | See National Best Bid. |
| NBBO | See National Best Bid and Offer. |
| NBO | See National Best Offer. |
| Order Matching Entity | An Order Matching Entity is any organization which operates a matching system which matching orders to buy or sell or cross any financial instrument. |
| Order Sender | Anyone who sends an order to an Order Matching Entity for the purpose of matching (executing) that order. |
| Post Only Order | A post only order is an order which can only be accepted by an Order Matching Entity if it would make liquidity. If a post only order would take liquidity, it must be rejected by the Order Matching Entity. |
| PricePoint | A price at which one or more orders are present on one side of the resting order book. |
| Price/Time Priority | Price/time priority is a method of ranking the sequence in which orders are matched. The execution sequence of orders is sorted that buy (or sell) orders with higher (or lower) limit prices are matched ahead of orders on the same side of the market with lower (or higher) limit prices. Among a set of buy or sell orders at the same limit price, orders are further sequenced so that orders which were added to the book first are executed before orders which were added at a later time. |
| Price Improvement | Solely for the purpose of this document, price improvement exists when a limit order is matched at a price which is better that its limit price. |
| Product | The term product is used in this document to refer to either an individual financial instrument or a trading unit. |
| Prorated Priority System | A prorated priority system is a system which prioritizes the matching of resting orders first by price and, within price, prorates matching among resting orders at the same price. |
| Ranked Priority System | A ranked priority system is a system which prioritizes the matching of resting orders first by price, and then sequentially by any number of other hierarchies within price ranking. |
| Resting Order | A resting order is any order which is retained in the matching system's resting order book subject to removal from the resting order book when the order is (1) fully executed, (2) cancelled upon directions from the order sender, or (3) cancelled upon expiration of the lifetime of the order as determined by the order sender. |
| Resting Order Book | See Book. |
| Rules | Order Matching Entities adopt rules to govern their conduct and to explain to order senders - their customers - how they operate their matching systems. Government regulators adopt rules governing their conduct as well as the conduct of Order Matching Entities which they may regulate. |
| SMR | See Standard Matching Rate. |
| SMRproduct | The Standard Matching Rate for a given product. |
| Standard Matching Rate | The Matching Fee rate that an Order Matching Entity charges to match an order in a given financial instrument if an optional FRC rate is not submitted with the order. |
| Trade Ahead or Trading Ahead | Trading ahead occurs when an order with lower priority (lower rank) trades ahead of an order with higher priority. |
| Trading Unit | A trading unit is comprised of two or more financial instruments which trade as a unit according to a formula, e.g., an options spread, a stock/options trade, a futures spread, or a futures "exchange for physical" transaction. |
| Take Liquidity | An order "takes" liquidity if it is matched with an order which previously resided as a resting order in an Order Matching Entity's book which "makes" the liquidity which the order takes. |
| Temporarily Unmatchable Order | An order is temporarily unmatchable if its fee/rebate contingency cannot be met by matching it with the order that the matching system is currently attempting to match. |
| TOB | See Top of Book. |
| Top of Book | The orders with the highest priority on each side of the book is said to be at the top of that book. |

| TERM | DEFINITION |
| --- | --- |
| WorkingPrice | An order's WorkingPrice is the order's ActivePrice further constrained by Rules (i.e., NBBO violation, short sale price restrictions, price collars or limits).
If orders in a given a product cannot be matched through the NBBO price, then a buy (or sell) order's WorkingPrice is the lesser (or greater) of the order's ActivePrice and the NBO (or NBB),
If an order is a non-exempt short sale with a price restriction imposed by Rules, then the order's WorkingPrice is the greater of the order's ActivePrice and the minimum price at which a short sale can be made.
If a product is subject to limit up or down prices (price collars, whether fixed or dynamic), then a buy (or sell) order's WorkingPrice is the lesser (or greater) of the order's ActivePrice and the limit up (or down) price,
When more than one such constraint is applicable, a buy (or sell) order's WorkingPrice reflects the lowest (or highest) price restriction. |

Thus, there is shown and described an order matching algorithm to be used by a specialized computer matching system which is programmed to match orders to buy and sell (and execute cross transactions in) financial instruments of any type; which operates within a framework where orders are matched at a price equal to the best available bid or ask price or within the best available bid and ask prices in the market; where the priority of matching orders is ranked by price; where orders at the same price may be further ranked based on other attributes; where orders may optionally specify that the order sender is willing to pay a fee to (or requires being paid a rebate by) the Order Matching Entity (OME) which operates the matching system (a fee/rebate contingency which may be quantified by a fee/rebate contingency rate (FRC rate); where an order's optional fee/rebate contingency (or conditions are present which permit that contingency to be overridden) must be met in order to match the order; and where an order which cannot be matched solely because its FRC rate prevents it from matching with another order temporarily yields priority—other than price priority—to other orders ranked below the yielding order to permit those orders to be matched, if possible.

The method and system according to embodiments of the present invention advances the state of the art of order matching technology in the context of a highly automated marketplace.

Although other modifications and changes may be suggested by those skilled in the art, it is the intention of the inventor to embody within the patent warranted hereon all changes and modifications as reasonably and properly come within the scope of their contribution to the art.

The invention claimed is:

1. A contingent order matching system (COMS) comprising:
 at least one processor coupled to non-transitory memory, the non-transitory memory configured to store computer-readable instructions including an order handling and matching algorithm; and
 a resting book of orders configured to maintain an inventory of electronic orders of a first type, the electronic orders of the first type having fee/rebate contingency (FRC) information, the COMS configured to rank the electronic orders of the first type in the resting book using a price of each of the electronic orders of the first type as a primary ranking criterion and one or more other attributes as a secondary criterion;
 the at least one processor configured to execute the computer-readable instructions, thereby causing the at least one processor to:
 receive, over a network, one or more electronic orders of a second type, each having differing quantities and prices, wherein the electronic orders of the second type have FRC information that is only compliant for processing by an independent exchange system for which each of the electronic orders of the second type was previously destined; and
 execute the order handling and matching algorithm that converts the one or more electronic orders of the second type to a form compliant with the COMS, thereby obviating a need for multiple exchange systems, including said independent exchange system, execution of the order handling and matching algorithm comprising:
  determining that one or more electronic orders of the first type are potential matches for an electronic order of the second type based on, at least, price,
  successively summing the FRC information of the electronic order of the second type with each of the one or more electronic orders of the first type,
  identifying a highest ranked electronic order of the first type whose FRC sum with the electronic order of the second type satisfies a predetermined threshold,
  matching the highest ranked electronic order of the first type and the electronic order of the second type to create a matched order, and
  executing the matched order in the form compliant with the COMS, the executing comprising charging a fee or paying a rebate according to FRC information of the matched order.

2. The COMS of claim 1, wherein the at least one processor is further configured to:
 maintain any received electronic orders of the second type that are unmatchable to the electronic orders of the first type in the resting book of orders; and
 match additional electronic orders of the second type to the maintained electronic orders of one of the first type and the second type now in the resting book of orders.

3. The COMS of claim 1, wherein a portion of the electronic orders of the second type comprises market orders without a price limit, the at least one processor being further configured to assign a working price to the market orders.

4. The COMS of claim 1, wherein the secondary criterion comprises times when the electronic orders of the first type are received.

5. The COMS of claim 1, wherein the FRC information is a numerical value.

6. The COMS of claim 5, wherein the FRC information has one of a positive value, a negative value, or a zero value.

7. The COMS of claim 1, wherein the FRC information is designated by an order type, the at least one processor being further configured to translate the order type into a numerical value.

8. The COMS of claim 1, wherein the secondary criterion comprises proration based on an order size.

9. The COMS of claim 1, wherein the one or more electronic orders of the second type, as received, cause the resting book of orders to be crossed or locked.

10. The COMS of claim 1, wherein the electronic orders of the first type comprise buy orders and sell orders at differing quantities and prices and at differing FRCs, and wherein the ranking is independent of the FRC information of the electronic orders of the first type.

11. The COMS of claim 1, wherein the highest ranked electronic order of the first type whose FRC sum with the electronic order of the second type satisfies the predetermined threshold has a lower time priority than the one or more electronic orders of the first type with a higher ranking.

12. The COMS of claim 1, wherein the at least one processor is further configured to perform proration on the one or more electronic orders of the first type with a higher ranking than the highest ranked electronic order of the first type whose FRC sum with the electronic order of the second type satisfies the predetermined threshold.

13. The COMS of claim 1, wherein the resting book of orders comprises a buy side book and a sell side book as ranked collections of the electronic orders of the first type.

14. The COMS of claim 1, wherein the at least one processor is further configured to:
- calculate a first FRC rate for an electronic order of the first type when it is received;
- calculate a second FRC rate when the electronic order of the first type is placed in the resting book of orders; and
- calculate an additional FRC rate immediately prior to each attempt to match the electronic order of the first type with the electronic order of the second type.

* * * * *